United States Patent [19]
Van Huben et al.

[11] Patent Number: 5,812,130
[45] Date of Patent: Sep. 22, 1998

[54] DATA MANAGEMENT SYSTEM AND METHOD FOR CONCURRENT ENGINEERING

[75] Inventors: Gary Alan Van Huben; Joseph Lawrence Mueller, both of Poughkeepsie, N.Y.; Michael Steven Siegel, Raleigh, N.C.; Thomas Bernard Warnock, Austin, Tex.

[73] Assignee: International Business Machines Corporation, Armonk, N.Y.

[21] Appl. No.: 761,580

[22] Filed: Dec. 6, 1996

[51] Int. Cl.$^6$ .................................................... G06F 3/00
[52] U.S. Cl. ............................................. 345/339; 399/81
[58] Field of Search .................................... 345/329, 330, 345/331, 339, 348, 349, 356, 357, 968; 399/81

[56] References Cited

U.S. PATENT DOCUMENTS

| | | | |
|---|---|---|---|
| 5,201,047 | 4/1993 | Maki et al. | 707/4 |
| 5,212,771 | 5/1993 | Gane et al. | 345/357 |
| 5,321,605 | 6/1994 | Chapman et al. | 705/7 |
| 5,333,312 | 7/1994 | Wang | 707/10 |
| 5,333,315 | 7/1994 | Saether et al. | 707/1 |
| 5,333,316 | 7/1994 | Champagne et al. | 707/8 |
| 5,418,949 | 5/1995 | Suzuki | 707/205 |
| 5,537,526 | 7/1996 | Anderson et al. | 707/515 |
| 5,671,428 | 9/1997 | Muranaga et al. | 345/329 |

OTHER PUBLICATIONS

Oliver Tegel, "Integrating Human Knowledge Into The Product Development Process" published in Proceedings of ASME Database Symposium Eng–Data Mgmt, Integrating the Engineering Enterprise ASME Database Symposium 1994, ASCE NY USA, pp. 93–100.

"Beyond EDA" published in Electronic Business, vol. 19, No. 6, Jun. 1993 pp. 42–46, 48.

*Primary Examiner*—A. Katbab
*Attorney, Agent, or Firm*—Lynn L. Augspurger

[57] ABSTRACT

A design control system suitable for use in connection with the design of integrated circuits and other elements of manufacture having many parts which need to be developed in a concurrent engineering environment with inputs provided by users and or systems which may be located anywhere in the world providing a set of control information for coordinating movement of the design information through development and to release while providing dynamic tracking of the status of elements of the bills of materials in an integrated and coordinated activity control system utilizing a repository which can be implemented in the form of a database (relational, object oriented, etc.) or using a flat file system. Once a model is created and/or identified by control information design libraries hold the actual pieces of the design under control of the system without limit to the number of libraries, and providing for tracking and hierarchical designs which are allowed to traverse through multiple libraries. Data Managers become part of the design team, and libraries are programmable to meet the needs of the design group they service.

22 Claims, 88 Drawing Sheets

FIGURE 2

| File | Return | Filter | Owner | Status | | | Help |
|------|--------|--------|-------|--------|--|--|------|

- NAME — 235
- LIBRARY — 236
- TYPE — 237
- VERSION — 238
- LEVEL — 239

MODEL STATUS: VALID     MODEL OWNER: FORD

240

| NAME | TYPE | LIB | VERS | LEVEL | STATUS |
|------|------|-----|------|-------|--------|
| 0001 A ALU | SCHEM | CP_LIB | BASE | ENGIN | VALID |
| 0002 I ALU | VHDL | CP_LIB | BASE | ENGIN | VALID |
| 0003 O ALU | SYNTHES | CP_LIB | BASE | ENGIN | VALID |
| 0004 I ADDER | LAYOUT | TECH | HIPWR | QUAL | INVAL |
| 0005 A MULT_DIV | LAYOUT | TECH | LOPWR | QUAL | VALID |
| 0006 I MULT1 | GATE | TECH | LOPWR | QUAL | VALID |
| 0007 I DIV1 | GATE | TECH | LOPWR | QUAL | VALID |
| 0008 | | | | | |
| 0009 | | | | | |

FIGURE 5a
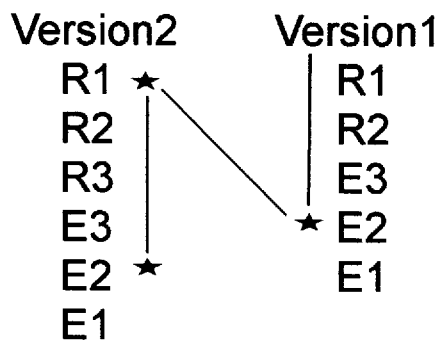
Starting at Version 2
Level E2
Search resumes at same
level in Version 1
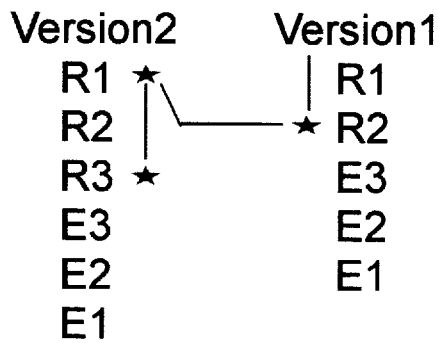
Starting at Version 2
Release Level R3
Search resumes at most
recent release level
in Version 1
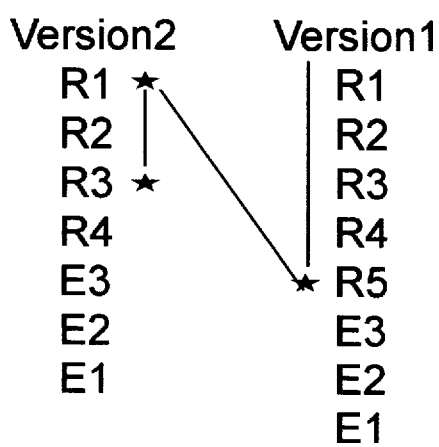
Starting at Version 2
Release Level R3
Search resumes at most
recent release level
in Version 1

11a

11b

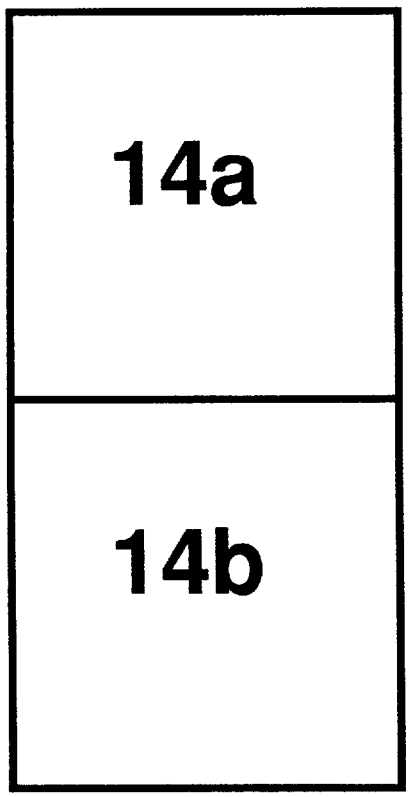

Figure 17

| 17a | 17c |
|-----|-----|
| 17b | 17d |

Figure 19c
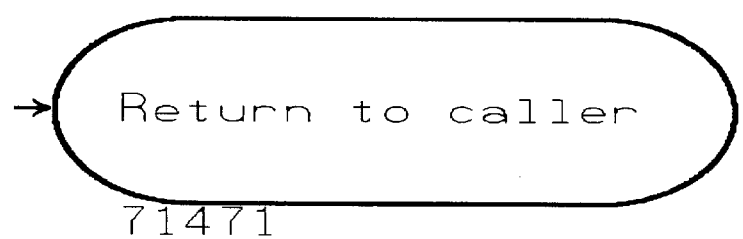
71471
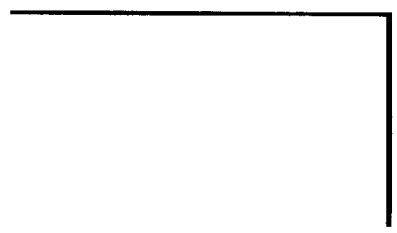

Figure 21

| 21a |
|---|
| 21b |

Figure 23c
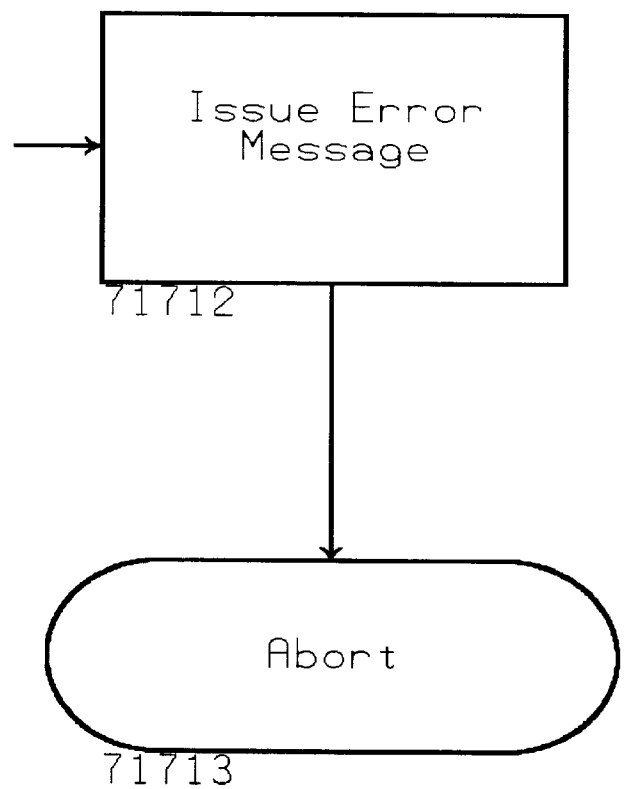
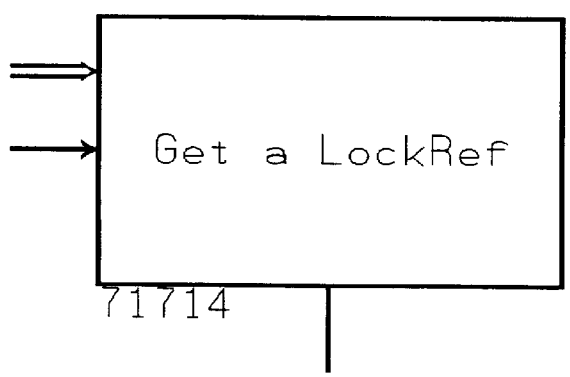

Figure 27

| 27a | 27d |
|-----|-----|
| 27b | 27e |
| 27c |     |

FIGURE 31

| | | | | | | |
|---|---|---|---|---|---|---|
| File Return Filter Owner Status | | | | | | Help |

MODEL STATUS      INVALID
MODEL OWNER      FORD

| | NAME | TYPE | LIB | VERS | LEVEL | STATUS |
|---|---|---|---|---|---|---|
| 0001 A | ALU | SCHEM | CP_LIB | BASE | ENGIN | VALID |
| 0002 I | ALU | VHDL | CP_LIB | BASE | ENGIN | VALID |
| 0003 O | ALU | SYNTHES | CP_LIB | BASE | ENGIN | VALID |
| 0004 I | ADDER | LAYOUT | TECH | HIPWR | QUAL | INVAL |
| 0005 A | MULT_DIV | LAYOUT | TECH | LOPWR | QUAL | VALID |
| 0006 I | MULT1 | GATE | TECH | LOPWR | QUAL | VALID |
| 0007 I | DIV1 | GATE | TECH | LOPWR | QUAL | VALID |
| 0008 | | | | | | |
| 0009 | | | | | | |
| 0010 | | | | | | |
| 0011 | | | | | | |
| 0012 | | | | | | |

DATA MANAGEMENT SYSTEM AND METHOD FOR CONCURRENT ENGINEERING

FIELD OF THE INVENTION

This invention is related to a Computer Integrated Design Control System and Method for concurrent engineering, and particularly to methods useful in connection with the design, development and manufacturing of complex electronic machines such as computer systems and their complex electronic parts.

RELATED APPLICATIONS

The preferred embodiment of our claimed invention is described in detail herein. Our preferred embodiment may desirably interact with other inventions which may be considered related applications filed concurrently herewith, having inventors in common with this our preferred embodiment of this invention.

For convenience of understanding, this application and other other applications are listed below which are related and describe various systems, methods and processes for data management particularly suited for use with this invention. The related applications are:

"Data Management System for Concurrent Engineering", filed Dec. 6, 1996 under U.S. Ser. No. 08/847,393, "Data Management System and Method for Concurrent Engineering" filed Dec. 6, 1996 under U.S. Ser. No. 08/761,580, which provides greater detail about our Aggregation Manager for a Data Management system, and "Data Management System for Problems, Releases and Parts", filed Dec. 6, 1996 under U.S. Ser. No. 08/761,474, which is for computer integrated design control and which describes a method for managing problems, releases and multiple releases, and "Data Management System and Process", filed Dec. 6, 1996 under U.S. Ser. No. 08/761,253, describing how various processes and utilities interact, and "Data Management System having Shared Libraries", filed Dec. 6, 1996 under U.S. Ser. No. 08/761,320, "Data Management Control System for CDA Applications", filed Dec. 6, 1996 under U.S. Ser. No. 08/759,692.

All of these related applications are filed concurrently herewith, and their disclosures are incorporated herein by this reference. All are commonly assigned to International Business Machines Corporation, Armonk, N.Y.

GLOSSARY OF TERMS

While dictionary meanings are also implied by certain terms used here, the following glossary of some terms may be useful.

| | |
|---|---|
| AFS | Andrew File System - File Management System developed by Transarc Inc. and used on Unix/AIX Networks. |
| API | Application Program(ming) Interface. |
| ASC | Accredited Standards Committee (ANSI) |
| BOM | Bill of Materials |
| CIM | Computer Integrated Manufacturing |
| CR | Control Repository |
| CRC | Cyclic Redundancy Check |
| CLSI Compiler | VHDL Analyzer developed by Compass Design Systems |
| DCS | Design Control System. Our Design Control System incorporates Data Management System processes, including interactive data management systems which supply processes which may be applicable in general data management systems, such as a process manager, a promotion manager, a lock manager, a release manager, and aggregation manager and the other processes we describe herein as part of a Computer Integrated Design Control System and, where the context applies, Data Management System, is a Data Management System functioning within an overall integrated design control system. |
| DILP | Designer Initiated Library Process |
| DM | Data Manager or Data Management |
| DMCU | Data Management Control Utilities |
| DMS | Data Management System |
| DR | Data Repository |
| EC | Engineering Change |
| EDA | Electronic Design Automation |
| GUI | Graphical User Interface |
| PDM | Product Data Management |
| PIM | Product Information Management |
| PN | Part Number |
| RAS | Random Access Storage |
| sim | static inline memory |
| tape-out | Delivery of a coherent set of design data to manufacturing. Also known as Release Internal Tape (RIT) within IBM. |
| TDM | the Cadence Team Design Manager (most currently Version 4.4) |
| VHDL | Very High-level Design Language - A high level language comprised of standards supported by IEEE and the EDA industry. The language is widely used in the electronics and computer industry and by the military as an alternative to Verilog and ADA, other high level computer coding languages. |

BACKGROUND OF THE INVENTION

In the article entitled "Beyond EDA (electronic design automation)", published in Electronic Business Vol.19, No.6 June 1993 P42–46, 48, it was noted that while billions of dollars have been spent over the past (then and still last) five years for electronic design automation systems (EDA) and software to help companies cut their design cycle, a huge gulf remains between design and manufacturing. To eliminate the gulf and thus truly comply with the commandments, companies are extending the concept of concurrent engineering to enterprise wide computing. The concept, which calls for integrating all the disciplines from design to manufacturing is becoming the business model of the 1990s. Achieving an enterprise wide vision requires tying together existing systems and programs and managing the data that flows among them. Software that makes that linkage possible is largely in the class known by two names: product data management (PDM) or product information management (PIM). Mr. Robinson, the author, described the experiences of several companies with PIM and PDM. in particular Sherpa and Cadence.

The design of complex parts, such as integrated circuits, computers, or other complex machines in. a complete manufacturing operation like IBM's requires computer capability, with computers capable of processing multiple tasks, and allowing concurrent data access by multiple users. The IBM System 390 operating system known as Multiple Virtual Storage (MVS) allows such things as relational database management methods, such as the TIME system described by U.S. Pat. No. 5,333,316, to be used to reduce design time. The TIME system is used within IBM for the purposes described in the patent during circuit design. However, these prior efforts treated design as directed to an entity and did not achieve the efficiencies provided by the system detailed in our description of our invention, which also can run under MVS, but also under other operating systems. Our detailed description of our invention will illustrate that we have furthered the objects of the invention of U.S. Pat. No. 5,333,316 by increasing the flexibility of a number of circuit designers who may concurrently work on designing the same integrated circuit chip and reducing the interference between chip designers. With the prior system, a user (a person, processor or program capable of using data in a relational database) was given a private copy of the master table. Alteration of a row in the user table was not automatically updated in the master table, because a lock mechanism prevented the row update, but that was an great improvement at the time, because no longer did multiple users have to wait for copying of a table, each time data from a user needed to be updated. This row locking and treatment of data has become widespread in the relational database field, and it has been enabled for use with multiple instances of a platform even on Unix machines today. We should note that also in the MVS art, there have been proposed various library systems, e.g. those represented by U.S. Pat. Nos. 5,333,312 and 5,333,315 and others which relate to IBM's Image Object Distribution Manager in the ImagePlus product line of IBM, and IBM's Office Vision are examples of systems enabling control of a source document while allowing access by multiple users. Implementation of these patented ideas enable synchronous and asynchronous copying of a document into a folder in a target library. These methods provide for check out of a document and its placement in a target library while locking the document in the source library to prevent changes while the checked out document is out. But these steps are only some of the many things that are needed to bring a product to a release state. Bringing a product to a release state is an object of the current developments relating to design control in a manufacturing setting.

Concurrent engineering is required among many engineers working in parallel and at different locations worldwide. Furthermore, as noted by Oliver Tegel in "Integrating human knowledge into the product development process" as published in the Proceedings of the ASME Database Symposium, Engineering Data Management: Integrating the Engineering Enterprise ASME Database Symposium 1994. ASCE, New York, N.Y., USA. p 93–100, specialists who are not working directly together are often needed for solving the demanding tasks that arise during the development of today's advanced products. During product development, assistance is required from other departments such as manufacturing, operations scheduling, etc. Even the vendors and customers should be integrated into the product development process to guarantee the product developed will be accepted in the market.

There is a need for integrators/coordinators/model builders and the designers to work together to create a next release. Information from different people in different forms must be collected aiming at a final good design. A problem occurring during product development is, how to know which people to contact for what kind of information, but that is only one. During all of the process concurrent engineering, particularly for the needs of complex very large scaled integrated system design, needs to keep everything in order and on track, while allowing people to work on many different aspects of the project at the same time with differing authorizations of control from anywhere at anytime.

For the purpose of the following discussion, need to say that we call our system a "Computer Integrated Design Control System and Method" because it encompasses the ability to integrate CIM, EDA, PDM and PIM and because it has the modularity making it possible to fulfill these needs in a concurrent engineering environment particularly useful to the design of complex very large scaled integrated systems as employed in a computer system itself. The making of these systems is a worldwide task requiring the work of many engineers, whether they be employed by the manufacturer or by a vendor, working in parallel on many complete parts or circuits which are sub-parts of these parts. So as part of our development, we reviewed the situation and found that no-one that we have found is able to approach the creation of "Computer Integrated Design Control System" like ours or employ the methods needed for our environment. Our methods are modular and fulfill specific functions, and yet make it possible to integrate them within a complete "Computer Integrated Design Control System".

A patent literature review, especially one done with retrospective hindsight after understanding our own system and method of using our "Computer Integrated Design Control System" will show, among certainly others, aspects of DMS systems which somewhat approach some aspect of our own design, but are lacking in important respects. For instance, after review of our detailed description, one will come to appreciate that in modern data processing systems the need often arises (as we provide) to aggregate disparate data objects into a cohesive collection. These data objects may reside at various levels of completion, spanning multiple versions and/or repositories in a hierarchical, multi-tiered data management system. Additionally, these data aggregations may need to be hierarchical themselves, in order to enable the creation of large groupings of data with varying levels of granularity for the data included therein. In such a data management system, the end-users of the data aggregates are not necessarily the "owners" of all or any of the data objects comprising the data aggregate, but they have a need to manage the particular collection. Management of a data aggregation may include creating the aggregation, adding or deleting data objects, moving the aggregation through a hierarchical, multi-tiered data management system and tracking the status of the data aggregation in real-time while maintaining the coherence of the data aggregation. Creation of a data aggregation or the addition of a data object to an existing data aggregate may need to be accomplished within the data management system or via data objects imported into the data management system through application program interfaces for the data management system.

With such a focus, when one reviews the art, one will certainly find, currently, data management systems which provide means for grouping components of a data system to facilitate the retrieval thereof. However, these data management systems are insufficient and lacking because they fail to address the above-referenced need for grouping disparate data items, just to mention one aspect of our own developments.

Another example, U.S. Pat. No. 5,201,047 to Maki et al. (issued Apr. 6, 1993) teaches an attribute based classification and retrieval system wherein it is unnecessary to implement an artificial code for indexing classifications. The patent teaches a method for defining unique, user-determined attributes for storing data which are capable of being readily augmented without necessitating the modification of the underlying query used for retrieval thereof. However, the Maki et al. patent requires that the data items being grouped share at least one common attribute to enable the grouping, and therefore fails to address the problems of managing data aggregates formed from disparate and unrelated data objects.

Other data management systems address the creation of data aggregates coupled to particular processes implemented in the data system. For example, U.S. Pat. No. 5,321,605 to Chapman et al. (issued Jun. 14, 1994) teaches the creation of a Bill of Resources table which represents the resources consumed in the performance of a given process. Attribute tables for the given resources are utilized to determine whether additional processes which will consume some or all of the resources of a given process can be initiated. The patent to Chapman et al., requires that each process to be initiated have a particular Bill of Resources aggregate associated therewith. This tightly coupled construct does not permit the creation of data aggregates not related to a particular process implemented in the data management system. Furthermore, since a process must be contemplated in order to create a Bill of Resources table, Chapman et al. do not permit the creation of aggregates without foreknowledge of the process that requires the resource. Thus, in a manner similar to that described for Maki et al., Chapman et al. require that a relationship between the elements exist prior to the formation of the Bill of Resources grouping.

Also, unrelated DMS systems are known which are used for hardware implementations which enable related data in a computer memory, storage or I/O subsystem to be physically grouped in proximity to other such data so as to improve hardware performance, application performance, and/or to solve memory management issues are known. For example, U.S. Pat. No. 5,418,949 to Suzuki (issued May 23, 1995) teaches a file storage management system for a database which achieves a high level of clustering on a given page and teaches loading related data from a secondary storage unit at high speed. The patent uses map files including a metamap file for defining page to page relations of data. These hardware implementations are not related to the present invention, as they involve the management of the physical contents of a data object rather than the management of aggregations of data objects as we perform the methods of our present invention. It is contemplated, however, that such known hardware techniques may be implemented in a system comprising the aggregation management features disclosed herein, thereby further augmenting the overall system efficiency.

During our development process we have viewed the development of others. Even the best of the EDA (electronic design automation) design houses don't have an integrated approach like we have developed.

For the purposes of this background, we will discuss some of the various approaches already used specifically viewing them in light of our own separate developments which we will further elaborate in our detailed description of our invention which follows later in this specification.

In the field of EDA, there are today two preeminent vendors of development software, Cadence Design Systems, Inc. and ViewLogic, Inc. Of course there are others, but these two companies may have a greater range of capability than the others. Also, there are in house systems, such as IBM's ProFrame which we think is unsuitable for use. It will not function well as a stand-alone DM point tool for integration into a foreign framework. But even the largest microelectronic systems are customers of the two named vendors which we will compare. Today, a DCS, it will be seen, without our invention, would require fitting together pieces of disparate systems which don't interact, and even such a combination would not achieve our desirable results.

For the purposes of comparison, after our own description of our environment, our "Computer Integrated Design Control System", we will discuss the features of the Cadence Team Design Manager Version 4.4 and ViewLogic's ViewData in Sections which compare with and refer to the Sections of our own preferred "Computer Integrated Design Control System" as set forth at the beginning of our detailed description of our invention. This comparison will show the shortcomings of these prior systems, as well as some changes which could be made to these prior systems to allow them to improve performance in our concurrent engineering environment by taking advantage of aspects of our own development as alternative embodiments of our invention.

Historically many attempts have been made to collect or group objects together in order to solve typical data management problems. These problems may include identifying all of the files used to create a model, or grouping files together to facilitate transport through a medium. The intent is usually to ensure the group remains together for a specified period of time.

The most common method in use today is to create a listing of files commonly referred to as a Bill of Materials. Many commercial products permit creation of such a BOM, but these BOM are static list BOM. For example, is one of the members of the BOM disappears or gets changed, the user is unaware that the original data set used to create the BOM is no longer valid.

We have created a new process which we call an Aggregation Manager which can be used in Bill of Materials applications but which overcomes prior disadvantages and also one which can be used in our Computer Integrated Design Control System.

SUMMARY OF THE INVENTION

Our invention provides a design control system usable in a concurrent engineering process which can cooperate in a distributed environment worldwide to enable a design to be processed with many concurrent engineering people and processes. The system we employ uses a data management control program tangibly embodying a program of instructions executable by a supporting machine environment for performing method steps by an aggregation manager of a data management system having a library organization which receives a request of a user initiated from said displayed client screen and fulfills the request by a providing result via our data management system's aggregation manager.

Our invention provides an improved way to make or import a model, and provides a dynamic way to track the model during its course through its design phase. We provide a way to track the BOM.

In order to make a common model, we display for creation of a model one or more control screen sections as part of a control panel input screen allowing creation of a model by interactive user activity, by importing a file listing, by searching of a library of files in said data management system and importing a located file, or by use of an application program interface with a collection of model management utilities. Our sections of said control screen panel include:

(a) a display screen section displaying a first field representing the name of an anchor name field of a model which is identical to the name of a data object which is serving as a named anchor;

(b) a display screen section displaying a second field representing a library where said named anchor resides;

(c) a display screen section displaying a third field representing the type of data object identified by said anchor name;

(d) a display screen section displaying a fourth field representing user entries for the version of said named anchor;

(e) a display screen section displaying a fifth field representing user entries for the level of said named anchor for use by a user or a third party tool for creating, modifying or deleting an aggregate collection of data objects, encompassing those used for items that are identified, tabulated, tracked, validated and invalidated, and promoted, as are bills of materials, by said data management system; and (f) a display screen section displaying a sixth field representing user entries for the status of said named anchor.

Our model thus consists of one anchor and one or more associated components, each of which is a data object in said data management system. This means that our components can belong to any level and version of any library in said data management system and said components are not restricted to the same library, level and version as the anchor, and our components can and do comprise multiple data types, including data generated by tools of said data management system and third party tools. Thus we further provide that each component is labeled as an input or an output of its associated anchor. Thus we provide that each one component may be an anchor to another different model, and when such a component is an anchor to another different model, said different model consists of said such component acting as one anchor and further consisting of one or more associated components each of which is a data object in said data management system. In accordance with our invention our components can belong to any level and version of any library in said data management system and our components are not restricted to the same library, level and version as the anchor, and our components can comprise multiple data types, including data generated by tools of said data management system and third party tools.

Each of our components has field identifiers like those of our anchor and each component is also labeled as an input or an output of its associated anchor. Each one component may be an anchor to still another different model, with each component being labeled as an input or output in relation to its anchor file.

All components of a model are either static (and thus does not move through said data management system but is tracked by the system) or dynamic (and moves through said data management system with its Associated model as part of an action of promoting a model when a model as promoted, a dynamic member being labeled as an input or an output with respect to its associated anchor).

Anchors are always dynamic and they themselves can be dynamic members (input or output of another anchor) or a hierarchical BOM.

Components may be dynamic or static. If they are dynamic they are classified as input or output files and they move with the BOM during a promote. If they are static, they are called "support" objects and they don't move. All components (dynamic or static) cause BOM invalidation if they are modified or deleted.

With these facilities, concurrent engineering is enhanced, and after creation of a model, thereafter, our system provides continuously tracking the created model while allowing a user to modify it by adding components, deleting components, changing the status or deleting said created model, and allowing promotion of a model in our data processing system through the libraries of our data processing system.

This, along with many other changes have been made as detailed in the description of our invention which follows.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings. We note that where a particular FIGURE requires more than one sheet to illustrate the FIGURE with required character size, there is included in the FIGURES an overview FIGURE illustrating the layout of the sub-figures, which are numbered as alphabetical extensions of the FIGURE number, e.g. as 11a, 11b, 11c, 11d, etc.

FIG. 2 illustrates our preferred embodiment's data entry.

FIGS. 5a and 5b illustrates our preferred Design Control System Library Search Examples;

FIGS. 14 and 14a–14b describe the QRMDLINV Process.

Figure 17:
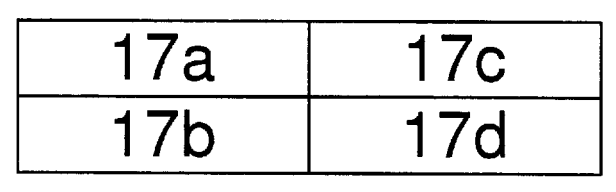

FIGS. 17 and 17a–17d describe the QRMDLDA0 Process.

FIGS. 19 and 19a–19d describe the QRMDLGNM Process.

FIGS. 21 and 21a–21b describe the QRMDLMOD Process.

FIGS. 23 and 23a–23d describe the QRMDLSET Process.

FIGS. 27 and 27a–27e describe the QRMFIMOD Process.

FIG. 31 shows the main screen for editing and viewing existing Models.

DETAILED DESCRIPTION OF THE INVENTION

Overview (Section 1.0)

In order to introduce our Design Control System we will describe it as it can be applied to development of complex circuit design and development projects such as microprocessor design projects. The implementation of our Design Control System can be implemented in a variety of ways using many computing platforms as is suitable for a concurrent engineering project. While we will describe our preferred embodiment, it should be recognized that with this teaching all or part of our exact implementation of user interfaces, methods, features, properties, characteristics and attributes may vary depending on the platform chosen and the surrounding design system. All of these variances will nevertheless employ those routines which implement our processes and which meet our requirements.

Platform (Section 1.1)

The Design Control System (DCS) in our preferred embodiment, even though it can be implemented with other platforms, runs on a network of RS/6000's (workstation class "personal" computers) with an AIX operating system arranged in a Client-Server fashion. Each client and server in our preferred embodiment, is able to implement cross platform code via interpretation, and thus can implement programs written in cross platform languages like Java and VRML. In such situations, Java can interact with VRML by describing extension modes, acting as scripts, and describing the actions and interactions of VRML objects.

Figure 1:
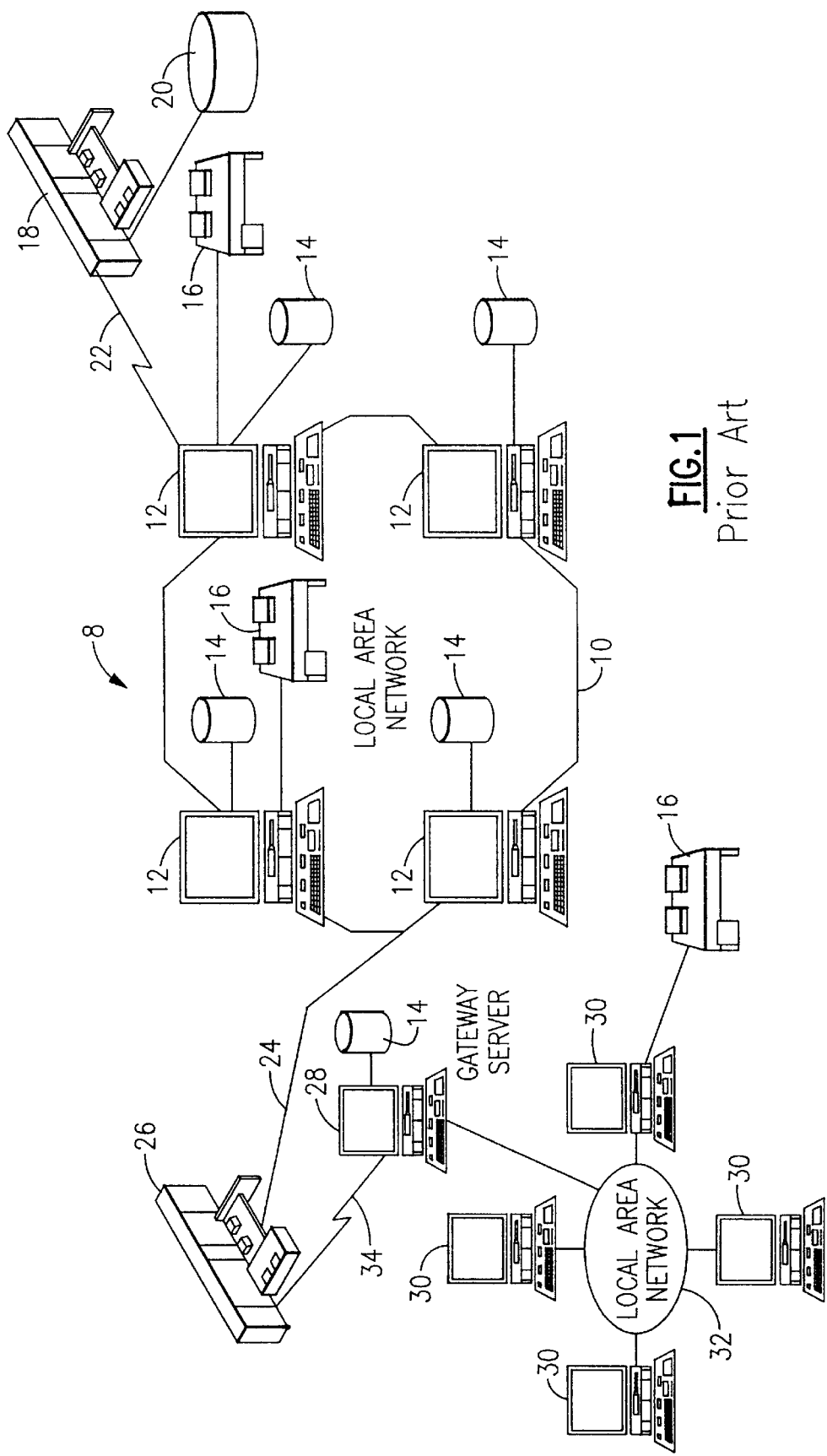
FIG. 1 illustrates a prior art system in which our present system can operate by changes made to the database and design control system, in accordance with our detailed description.

While more powerful situations are contemplated, the system can be installed in a prior art system, like that described in U.S. Pat. No. 5,333,312. Thus, as we show in FIG. 1, the prior art system of the earlier patent, can be employed in this application, by providing the system with new programs. However, such a system, as illustrated by FIG. 1 will be a data processing system 8, which may include a plurality of networks, such as Local Area Networks (LAN), 10 and 32, each of which preferably includes a plurality of individual computers 12 and 30 (which may be RS/6000 workstations or powerful PCs such as the IBM Aptiva's. As common in such data processing systems, each computer may be coupled to a storage device 14 and/or a printer/output device 16. One or more such storage devices 14 may be utilized, to store applications or resource objects which may be periodically accessed by a user within the data processing system 8. As we have said the system is provides with a repository, illustrated by main frame/server computer 18, which may be coupled to the Local Area Network 10 by means of communications links 22, and also to storage devices 20 which serve as remote storage for the LAN 10. Similarly, the LAN 10 may be coupled via communications links 24 supporting TCP/IP through a subsystem control unit/communications controller 26 and communications link 34 to a gateway server 28. Gateway server 28 is preferably an individual computer which serves to link the LAN 32 to LAN 10. The main system can be located anywhere in the world, and remotely from the various servers and clients coupled to it over communications links. The main system can accommodate hundreds of users making requests to the centralized repository (a large server 18, such as one of IBM's S/390 platforms or IBM's RISC System/6000 Scalable POWERparallel Systems (SP) platform for design control information. (AIX, S/390, RS/6000, RISC System/6000 and Scalable POWERparallel Systems are trademarks of International Business Machines Corporation, Armonk, N.Y.)

Since this repository 18 (a large server and its associated storage) is critical to the entire design team, it has the ability to remain available if a single server fails. In addition, the data is secured via a backup or archiving mechanism performed on a regular basis. Our DCS has important performance characteristics. It can handle a distributed computing environment with data being transmitted over LANs and telephone lines linking distant locations in real time. Users at one site experience no noticeable delays accessing data physically located at another site. Due to the complexity of the design, maximum throughput is attained by transferring only the control data necessary to carry out the specific task. For large projects design control information can be physically segregated by library, version and level to minimize the bottleneck caused by too many users accessing the same physical server. In the case of the design data, the physical data is tracked via pointers whenever possible, so as to minimize the amount of file movement between servers. Although, the "official" control information is centralized in one place, the DCS permits certain data to be cached locally on the users machine to improve performance by reducing traffic to the Design Control Repository. For example, much of the control information for private libraries can be cached locally in order to maximize performance for private library accesses. For public libraries, the DCS allows the user to take "snapshots" of a library in which the image of the library is refreshed locally. The user continues to work with his local image of the library until he deems it necessary to refresh the image. The amount of control data that is actually cached is dependant on the environment and the actual implementation. Many of the performance issues are discussed further in the Sections to which they pertain.

Libraries and Design Control Repository (Section 1.2)

The Design Control System has two important components. The Design Control Repository contains the control information for all components of the design. This includes such things as the names of all the pieces, the type of data, the level, the version, the owner, and any results which are deemed quality control records. These results indicate the "degree of goodness" of the design component and they are used by the DCS to make decisions regarding the type of actions which can be performed on a piece of data. This repository can be and is preferably implemented in the form of a database (relational, object oriented, etc.) or using a flat-file system. The actual implementation is usually based on the environment.

As we have said, and as illustrated by the machine to person interface depicted by FIG. 2, our program of instructions executable by a supporting machine environment for or performing method steps by an aggregation manager of a data management system having a library organization which receives a request of a user initiated from said displayed client screen as illustrated by FIG. 2 and fulfills the request by a providing a result which provides a dynamic way to track a model during its course through its design phase via our data management system's aggregation manager.

In order to make a common model, we display for creation of a model one or more control screen sections which provide our control information components 235, 236, 237, 238, and 239 as part of a control panel input screen allowing creation of a model by interactive user activity, by importing a file listing providing the data of screen sections 235, 236, 237, 238, and 239, by searching of a library of files in said data management system and importing a located file containing the data of screen sections 235, 236, 237, 238, and 239, or by use of an application program interface with a collection of model management utilities which provides the data of screen sections 235, 236, 237, 238, and 239. These data fields of our control screen which when created by a user comprise data entered in the form boxes (a form is a screen section entry field for representing a model) illustrated in FIG. 2, and when retrieved or otherwise obtained by the system by importing a file listing providing the data of screen sections, by searching of a library of files in said data management system and importing a located file containing the data of screen sections, or by use of an application program interface with a collection of model management utilities, all provide the data of a control screen panel sections which include:

(a) a display screen section displaying a first field representing the name (235) of an anchor name field of a model which is identical to the name of a data object which is serving as a named anchor;

(b) a display screen section displaying a second field representing a library (236) where said named anchor resides;

(c) a display screen section displaying a third field representing the type (237) of data object identified by said anchor name;

(d) a display screen section displaying a fourth field representing user entries for the version (238) of said named anchor;

(e) a display screen section displaying a fifth field representing user entries for the level (239) of said named anchor for use by a user or a third party tool for creating, modifying or deleting an aggregate collection of data objects, encompassing those used for items that are identified, tabulated, tracked, validated and invalidated, and promoted, as $a_1e$ bills of materials, by said data management system.

Furthermore, while, as in the other cases for entry section fields, the same screen does not have to, but can, display an additional field which displays status information. Thus, as illustrated by FIG. 2, the system provides a display screen section displaying a sixth field representing user entries for the status of said named anchor. Now each field can be display separately and various combinations can be made, but all fields are provided by and used by our system. At any time, the entire model schema can be displayed, as it is in the field 240, which displays several models names, as well as their anchor, type, library, version, level and status (which is dynamically tracked by our system).

Our model thus consists of one anchor (with a name 235) and one or more associated components, each of which is a data object in said data management system. This means that our components can belong to any level and version of any library in said data management system and said components are not restricted to the same library, level and version as the anchor, and our components can and do comprise multiple data types, including data generated by tools of said data management system and third party tools.

Now once a model is created or otherwise identified, it becomes part of our system. Indeed the second component is our Design Libraries. They hold the actual pieces of design under the control of the system. There is no limit to the number of libraries under the management of the Design Control Repository, and hierarchical designs are allowed to traverse through multiple libraries. The libraries are managed by Data Managers (Librarians) who are members of the design team. All major facets of the libraries are programmable so they can be tailored to-the needs of the design group they service. Certain design groups require more data control than others, so the flexibility exists to widely vary the degree of data control. Libraries are categorized as Public or Private. Both can be shared, but the main difference is that a private library is managed by the actual designer. It's used to hold his daily updates and often will have no formal control. The DCS achieves this by defaulting all control information to a simple non-restrictive form. For example, any designer can create private libraries on their own. They automatically become the owner and have the right to make additional designers "backup" owners. As the owner they can edit, save, modify, or delete any data in their library. The DCS automatically establishes all the proper AFS and AIX permissions. Owners of private libraries control who can access their data with the system accommodating the use of default "access groups" (such as AFS groups) so the designer doesn't have to enter the userids of all his team members each time he creates a new library. Since Private Libraries are considered working areas, data control checks are minimized in order to maximize performance. For example, when a new data element is created, the DCS does not check the Control Repository to make sure the owner has the proper authorities, locks, etc. Instead, a designer is permitted to work in a completely unrestricted fashion in his own work space. All controls are placed on public libraries. The only control checking required is to ensure there are no data conflicts within the Private Library. It is acceptable for two Private Libraries to contain the same design data, so no checks across libraries are done. Public Libraries are the official project data repositories. All data delivered to external customers comes from Public Libraries. Public Libraries are overseen by Data Managers who configure the libraries with varying degrees of control. Typically the libraries are organized with a level structure whereby the lowest levels have the least amount control. Control gets more stringent as the levels increase, and the highest level denotes data released to manufacturing. Almost every attribute concerning data integrity is programmable by the Data Manager. Through a Data Manager Utility, they configure the structure (the number of levels and versions, including the connections between them), the various authorities, the required criteria to enter each level, and the types of Library Controlled Processes required at each level. The system can handle numerous public libraries, and each public library can service unlimited users. In accordance with our preferred embodiment of our DCS architecture we provide an Automated Library Machine (ALM). More than merely a repository for data, the ALM is a userid capable of accepting, executing and dispatching tasks without any human intervention. This enables the designers to make requests of the ALM to promote data or run library processes without the need for a Data Manager to process it.

In order to improve throughput, the ALM can dispatch parallel tasks if the operating system (i.e. AFS) supports it and the situation allows it.

This concepts improves efficiency, and increases security, since the ALM is the only user that requires writable permissions to the data repositories. The physical location of the data residing in Public Libraries is determined by the Data Manager. The DCS along with the Data Manager (and his alternates) are the only means of writing data into or removing data from these physical locations. As a means of safety, the Data Manager does have the ability to access and overwrite data in these physical locations without using the DCS (i.e. thru the OS). This is necessary in the unlikely event the control information gets out of sync with the physical data, and the Data Manager has to manually complete a transaction. Physical locations are defined through the Data Manager Utility for setting up Public Libraries. More details on this are available in the Data Manager User Interface Section 15.

Data Types (Section 1.3)

Data may be identified by a filename (anchor name 235) and a filetype (236). The DCS automatically segregates all data by "type". Types are very useful to associate a piece of data with a tool or process. For example, UNIX/AIX uses extensions to qualify data such as using a ".ps" extension to denote a postscript file. The Cadence Design Management System uses Cell Views to segregate the various types of data within a particular Cell (design component). This segregation is a fundamental building block to Design Control Systems since certain types of data require more design control than other types. Our DCS allows each individual type to be controlled on a level and version basis within a library. The DCS is capable of tracking any data type from any point tool, even third party vendors.

Levels (Section 1.4)

Each Public Library consists of n levels which are established by the Data Manager. The naming of the levels (239) are arbitrary, but each denotes a degree of quality of the design. Data moves into and out of levels via a "promotion" mechanism. There are two types of levels in the DCS, Engineering (or working) and Release Levels.

Figure 3:
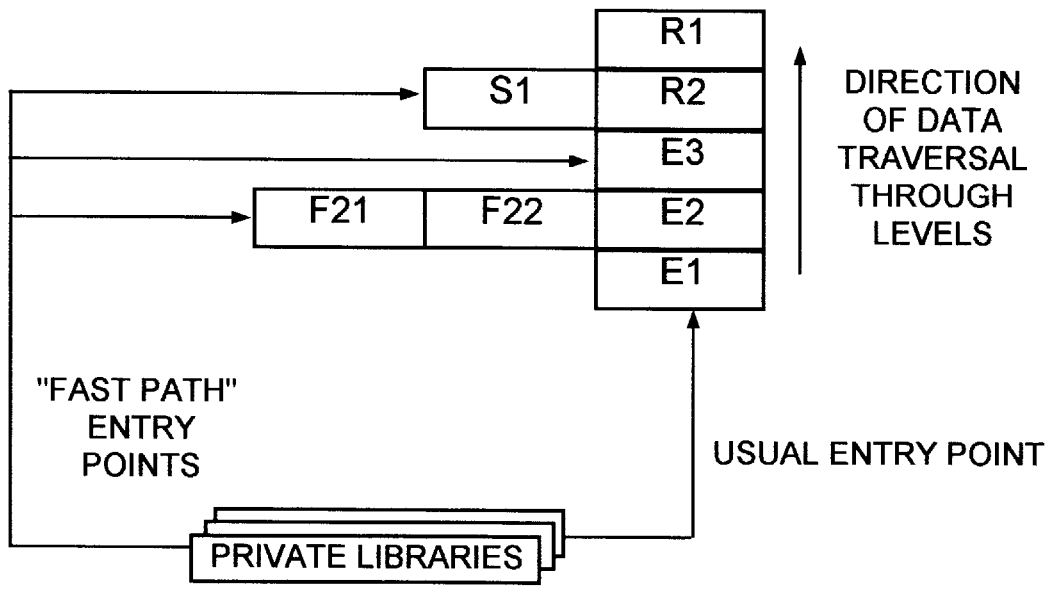
FIG. 3 illustrates our preferred Design Control System Level Structure.

FIG. 3 shows a typical level structure with 3 Engineering Levels denoted E1, E2 and E3, two main Release Levels denoted R1 and R2, a Sideways Release Level S1, and a Fast Path Stream consisting of F21 and F22. Data can be promoted into E1, F21, E3 and S1 from outside of the library, but it can only enter R2 from E3. E1, E2 and E3 are arranged in a serial fashion. The normal promotion path is for data to enter E1 (the least controlled level) and migrate up through E2, E3 and finally into R2 (the most tightly controlled level). The external paths into F21 and E3 are known as "fast paths" and exist to accommodate emergency updates to pieces of design residing at the higher levels. There are two different types of fast path arrangements:

Fast Path Entry means there is no fast path level associated with the Engineering level, just a "doorway" through which data can enter. Level E3 is an example of this where the user simply promotes data from the private library into E3. The DCS will run any pre-processes defined at E3, but any criteria that would normally be necessary to traverse through E1 and E2 is bypassed.

Fast Path Levels are staging areas where data is promoted into, and promoted through, in order to reach the target Engineering Level. There can be any number of Fast Path levels for any given Engineering Level. If there's more than 1, it's known as a Fast Path Stream since the data must migrate through all the Fast Path Levels before reaching the Engineering Level. F21 and F22 constitute a stream, which could've contained more than 2 levels. We have provided at least one level to provide an area where all the processing normally run at the E1 and E2 levels can be run to ensure that the fast path data meets all the same criteria.

Release Levels are handled in a different manner. R1 is the oldest release level and it's frozen, which means its contents can't be updated any longer. It contains a static snapshot of a design delivered to an external customer. R2 is now the active Release Level which is the destination of any data promoted from E3. The Data Manager programs the connection of E1 to E2 to E3 to Rn. The DCS automatically freezes the previous Release Level and connects E3 to the new Release Level whenever the Data Manager creates a new one. Unlike main Release Levels, Sideways Release Levels are always active and there can be n Sideways Levels for each Release Level. The purpose of the Sideways Levels is to hold post tape-out updates such as microcode patches to hardware under test. Since the Release Level corresponding to that level of hardware is probably frozen, and a new iteration of design is propagating through the Engineering Levels, the only path into a Sideways level is directly from a Private Library. The Data Manager has the ability to reconfigure the Engineering Levels at any time based on these rules:

The connections between levels can be changed at any time. (i.e. E1→E2→E3 can be changed to E1→E3→E2.)

A level can be removed as long as no data resides in that level.

A level can be added at any time.

The Data Manager can create a new Release Level at any time. Existing frozen Release Levels can be removed as long as no data resides in that level. A frozen level can become an active level again if no data resides in the current active Release Level. The DCS performs a "thaw", a step which removes the current Release Level (R2) and connects the previous level (R1) to E3. As shown in FIG. 3, the DCS supports the normal promotion path to E1 as well as "fast paths" into E2 and E3. The following minimum checks are performed at all entry points:

The owner attempting to send data to a Public Library must possess the update lock. If no lock exists, the sender obtains the lock by default. If another user has the lock and the sender is a surrogate, he can obtain the lock (the system immediately notifies the original owner). If the sender is not a surrogate, the action is halted, until ownership is properly transferred.

If the level to which the data is being promoted to has any entry criteria, it is checked to ensure the data passes the criteria.

Versions (Section 1.5)

Figure 4:
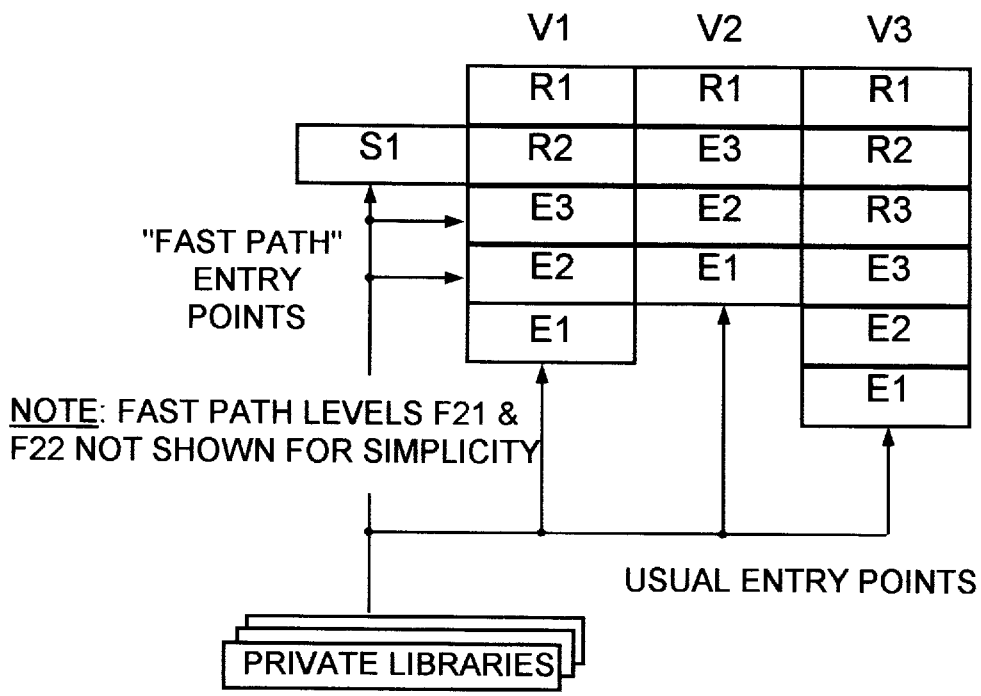
FIG. 4 illustrates our preferred Design Control System Level Structure with Versions.

Each public library consists of n versions (238) which are defined by the Data Manager. The concept of versions exist to support parallel design efforts. All versions have the same Engineering (Working) Levels, but have different Release Levels depending on the frequency of tape-outs for that version. Data in separate versions is permitted to traverse the levels at independent rates. For example, if a piece of design has 2 versions, 1 version may exist at E1 while the other version exists at E3. FIG. 4 is an extension of FIG. 3 in which library structure has been expanded to show 3 versions, V1, V2 and V3. In theory there's no limit to the number of versions just as there's no limit to the number of levels. Versions can be independent or dependent. Independent versions are isolated and must ultimately contain the entire set of design components. Dependent versions are based on previous versions (which the Data Manager specifies when creating a new version). By supporting the concept of dependent versions, only the incremental data necessary for a new design variation needs to be libraried in the new version. The Library Search mechanism will be able to construct a complete design Bill of Materials by picking up data from both versions.

Library Search (Section 1.6)

Our preferred embodiment of the DCS provides support for "Library Searches". This allows data, which is used in multiple iterations of the design, to exist in only one place. In other words, if a design component is changed, only that component needs to be re-libraried at a lower level. A full model can still be constructed by starting the search at the lowest level where the component is known to exist. The library search mechanism will pick up the latest pieces at the lowest level, then search through the next highest level to pick up more pieces, and so on until it reaches the highest level where all components reside. In addition to searching through levels, the mechanism also searches through versions. The user provides a starting library level, version and either a single type or a list of types. If the version is based on a previous version, and all the necessary design components can't be located in the starting version, the mechanism searches the previous version based on the following two rules:

1. If the search begins at an Engineering Level in one version, it resumes at the same Engineering Level (not the lowest level) in the previous version.
2. If the search begins at a Release Level (including a Sideways Level) in one version, it resumes at the latest Release Level in the previous version. This may be older or more recent in time than the released data in the current version.

Figure 5B:
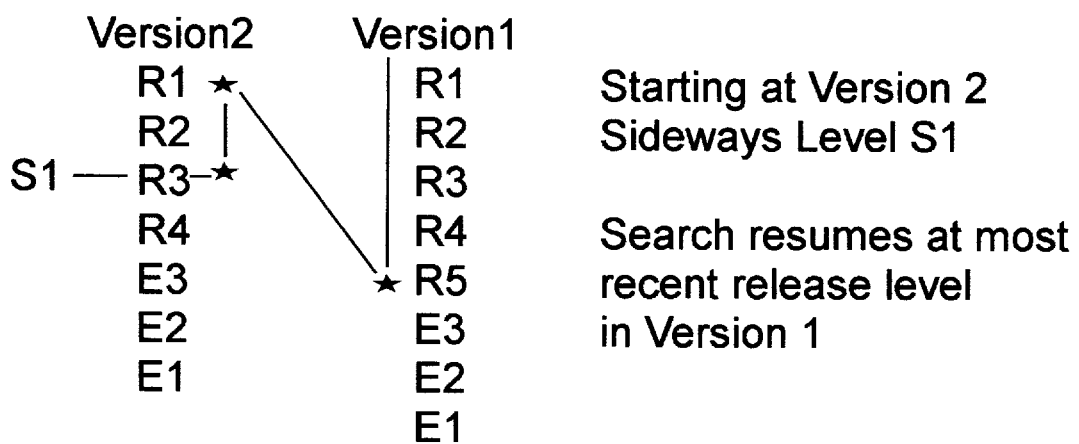

FIG. 5 shows examples of the Library Search Mechanism. The library search utility is available to designers, Data Managers and third party tools. The interface is both command-line and menu driven to accommodate any environment. In addition to the required parameters of type, level and version, the user has the option of specifying the name of a data object. These additional options exist:

Noacc
  This allows the utility to use a temporary cached copy of the search order information for performance reasons. Since this information may be obsolete, the absence of the option results in the actual Design Control Repository being accessed and the search performed from within it.
File
  Write the results into an external file.
Various Sorts
  They control the way the output is sorted and displayed.
Nosearch
  Only list data found at the starting level.
First/All
  Indicates whether to include all existences of a particular design component or only the first one in the search order.
Select
  Presents a selection list of all candidates so the user can choose those of interest.
Noversion
  Prevents the search from tracing back across version boundaries.
Levels
  Displays the search order based on the existing level structure.
Versions
  Displays the search order based on the existing version structure.

Locks (Section 1.7)

In order to properly control shared data, the DCS supports several types of locking mechanisms. Two of the locks exist to control groupings of files that may comprise a model build. These are known as move and overlay locks. The user can set one of these locks using a utility which allows him to control the scope of the lock based on certain fields. The user can enter specific data or a wildcard, indicating "ALL", for Name of Design Components
Type of Design Components
Level of Design Components
Version of Design Components
Library Name By specifying only a library name and four wildcards, the user is requesting that all data in the library be locked. By filling in all five entries, a specific design component will be locked. Various degree of locking exist in between those extremes.

If the information corresponds to a Bill of Materials (BOM) and the user wants to set the lock on the entire BOM, a BOM Flag will exist allowing him to specify this action. Regardless of how these fields are filled in, all locks will be set individually so they may be removed individually. A lock does not have to be removed the same way it was set. The user will also specify the type of lock, Move, Overlay, or Update (Ownership). The following definitions exist:

Move Locks mean the data can't be overlaid by the same data at lower levels, nor can it be promoted to a higher level. This provides a method for completely freezing an Engineering Level while a model build or large scale checking run is in progress.

Overlay Locks are a subset of move locks. The data can't be overlaid by the same data from lower levels, but it can be promoted to higher levels.

Update (Ownership) Locks are the means by which a designer takes ownership of a piece of data. Update locks are designed to prevent multiple designers from updating the same design component in an uncontrolled way, thus resulting in data corruption or lost information. There are two types of Update locks, permanent and temporary.

A permanent Update lock exists when the designer specifically requests to own a piece of data. This is done through a utility, and the DCS keeps track of this ownership. Other designers may copy and modify the data in their private libraries, but any attempt to promote that data into the public library will fail, unless the designer is a designated surrogate of the owner. The only way these locks are removed are by the owner resigning the lock or a surrogate assuming the ownership of the data, and the corresponding lock. A temporary Update lock exists to facilitate sharing a piece of data among multiple designers. The user can either request a temporary Update lock in advance (i.e. when he begins editing the data), or he can wait until he initiates the promote into the public library. The DCS will first check to see if anyone has a permanent Update lock, and if so, it will only allow the promotion to continue if the user is a designated surrogate. If nobody has a permanent Update lock, then the DCS will issue a temporary Update lock for the time the data remains "en route" to the final promote destination. Once it arrives safely, the temporary Update lock is removed and the data can be claimed for ownership by someone else. Surrogates are "alternate" owners of data. For example, a project may be arranged such that each piece of design is owned by a primary designer, but also has a backup owner (designer) to take over the design during vacations, emergencies, etc. In this case, the owner can tell the DCS that the backup designer should be a surrogate, thus giving him the right to take ownership of a design component. The surrogate can either use the locking utility to specifically take ownership prior to making any updates, or he can wait until he initiates a promotion. The DCS will check to see if the design component is currently owned, and if so, check to see if the user is a defined surrogate. If both are true, it will give the user the chance to "take ownership" and allow the promote to continue. The original owner would be notified that his surrogate has taken ownership.

Figure 6:
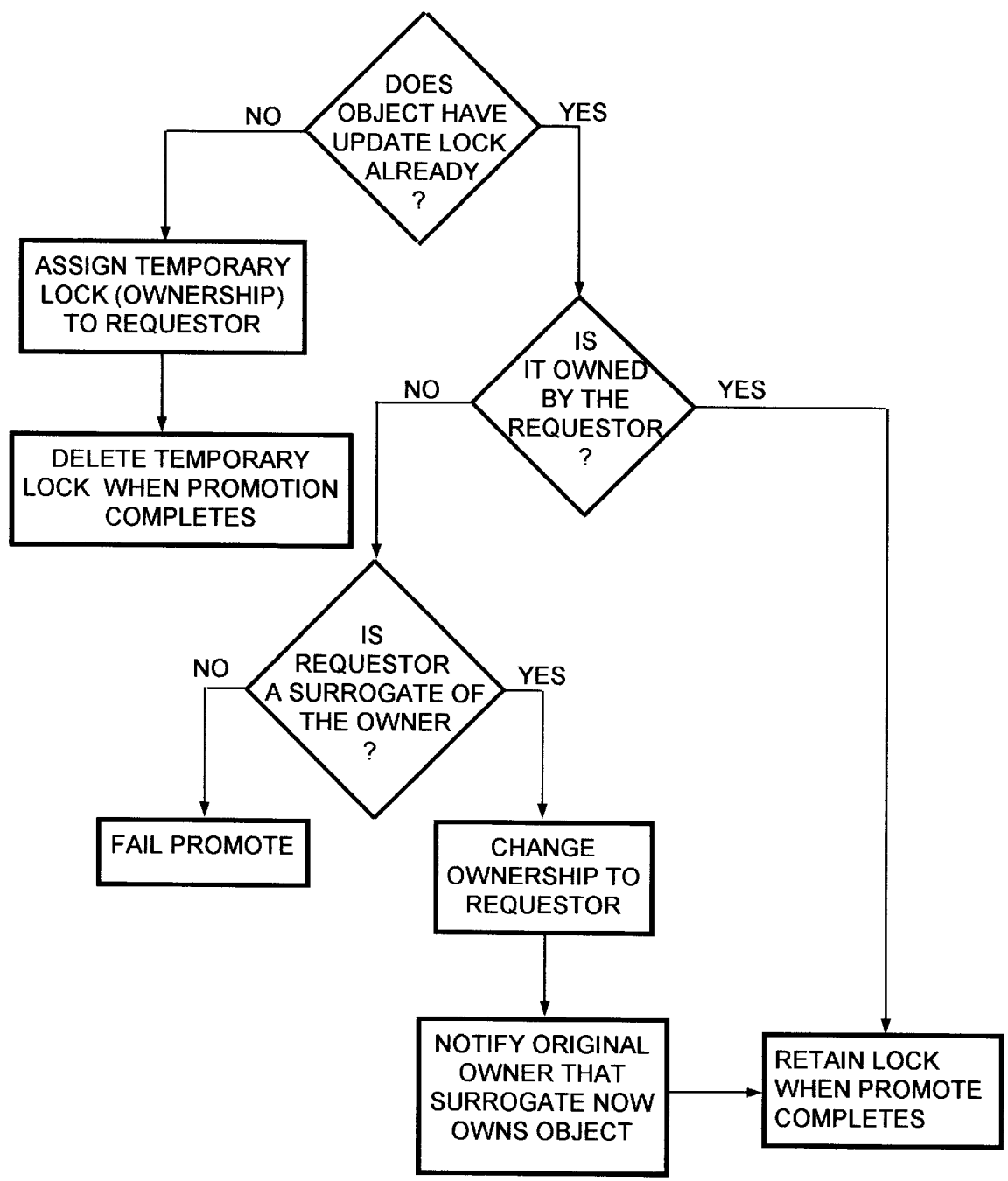
FIG. 6 illustrates our preferred Mechanism for Update Locks.

FIG. 6 illustrates the lock mechanisms for Update locks.

Bill of Materials Tracker (Section 1.8)

The DCS has a built-in Bill of Materials (BOM) Tracker to facilitate tracking many design components in large projects. The main objective of the BOM Tracker is to group certain design components to make it easier to promote them through the library and track their synchronization. This is crucial for data sets that contain some source and some derived files from that source. The following features exist in the BOM Tracker:

It supports automatic data grouping, based on the design component name, with the notion of required and optional data types. One example might be a grouping which consists of a graphical symbol denoting the I/O of a design component, the corresponding piece of entity VHDL and the architectural VHDL. Any changes made to the symbol should be reflected in the entity, so the entity would be required. A change may also be made to the architecture, but it's not always necessary, so the architectural VHDL would be optional. When a promote is initiated to a public library, or between levels of a public library, the DCS checks to see whether a data grouping is defined for the data type being promoted. If so, then all required data types are checked to ensure they exist. In addition, any optional data types are checked for existence and they are also picked up. The entire grouping is promoted to the target level. If a required data type does not exist, the promotion fails. Automatic data groups are programmed into the DCS by the Data Manager. Since they are BOMs, all rules of BOM tracking, invalidation and promotion exist for the members of the grouping.

BOMs are used for two main reasons. First they are used to group many smaller pieces of data into larger more manageable chunks to facilitate movement through the library and increase data integrity by reducing the risk of data getting out of sync. The other main reason is to track the components of a model (i.e. simulation, timing, noise analysis, etc.). The DCS offers a very flexible user interface for creating BOMs in order to satisfy the various scenarios. The user can manually create BOMs by selecting pieces of design interactively, filling in search criteria and initiating a library search, or importing a simple text list. In addition, an API exists for point tools to create a BOM listing and pass it into the DCS.

The power of the BOM Tracker is augmented with our automatic invalidation routine. Once a BOM is created, the DCS constantly monitors for a change to the BOM. If any member is overlaid or deleted, a notification is sent to the owner of the BOM indicating that the BOM is no longer valid. The owner can continue to work with his model, but he is aware that he's no longer using valid data. Even though a BOM is invalid, it can still be moved through the library. This accommodates the occasion where a piece of a model had a relatively insignificant change. If the model builder deems it unnecessary to re-build the model, this feature allows him to continue his work and even move the BOM through the library.

Status on BOMs is and should be accessible in two ways. The first is by automatic notification (e.g. e-mail) to the owner as soon as a BOM is invalidated. The second is by means of displaying the BOM either interactively or in report form. This listing shows the overall status of the BOM, and all members of the BOM with their individual status.

The BOM Tracker also supports the concept of a "support" object. This can be a design component, a piece of information, documentation, etc., that can be tracked with a BOM, but are never promoted or moved with a BOM. An example might entail using a BOM to track various modules of a large software application. The source and object code of the module move through the various levels as a BOM. In this case a support file may be a C++ class (or object) which resides in the class to be included as part of the BOM, thus rendering the BOM invalid if the class were modified or deleted, but it prevents the DMS from moving the class object as the application modules are promoted.

BOMs are hierarchical in nature and a BOM can be nested within a larger BOM. Whenever a piece of data is overlaid or deleted, the DCS looks to see if that piece belonged to a BOM. If so, it immediately checks to see if the BOM belongs to other BOMs. It recursively checks all BOMs it encounters until it's at the top of the hierarchy. All BOMs found will be invalidated (if they are currently valid) and the owners notified.

BOMs support move and overlay locks. The user can set a move or overlay lock on a BOM, and the DCS will set individual locks on all the members. If a member is a BOM, all of its members will receive individual locks. These locks can be removed by using the main lock utility and specifying the top-level BOM or filling in the desired fields to individually resetlocks.

The DCS supports the concept of a IBOM promote, which means the user can request that all the contents of the BOM be promoted simultaneously. This increases data integrity by helping to ensure a matching set of design data traverse through the library in sync.

BOMs can contain members who reside at different levels, different versions and even different libraries. The DCS will only promote those members which exist in the current library, and reside in an Engineering Level below the target level. If a member exists in a different version and is also below the target level, it will also be promoted.

There is separate authorizations for creating and promoting BOMs. This is set up by the Data Manager, so they can have complete flexibility in controlling who can create and move BOMs.

Promotion Criteria and Promotion Mechanism (Section 1.9)

Figure 7A:
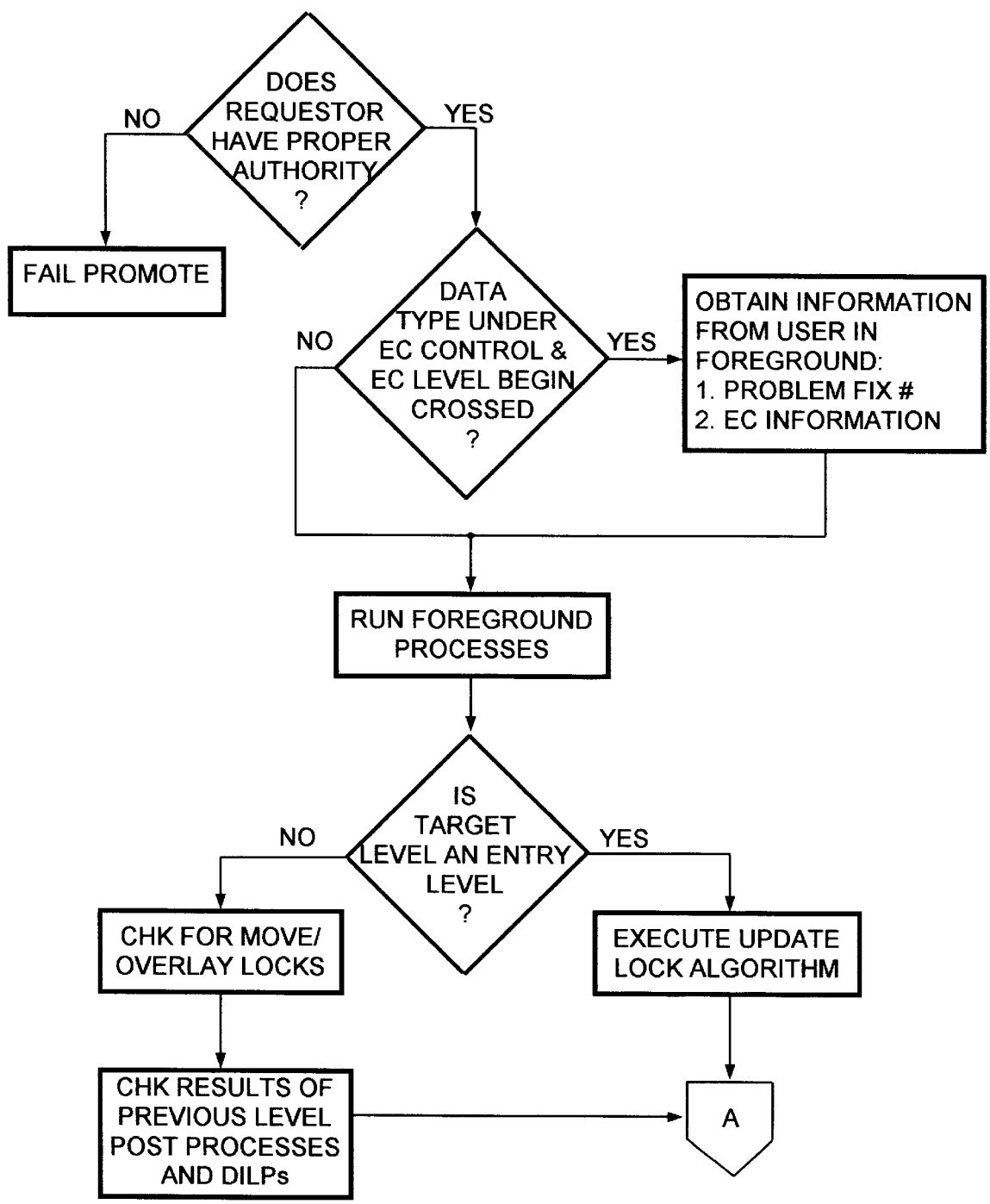
FIGS. 7a and 7b illustrates our preferred Promotion Mechanism.
Figure 7B:
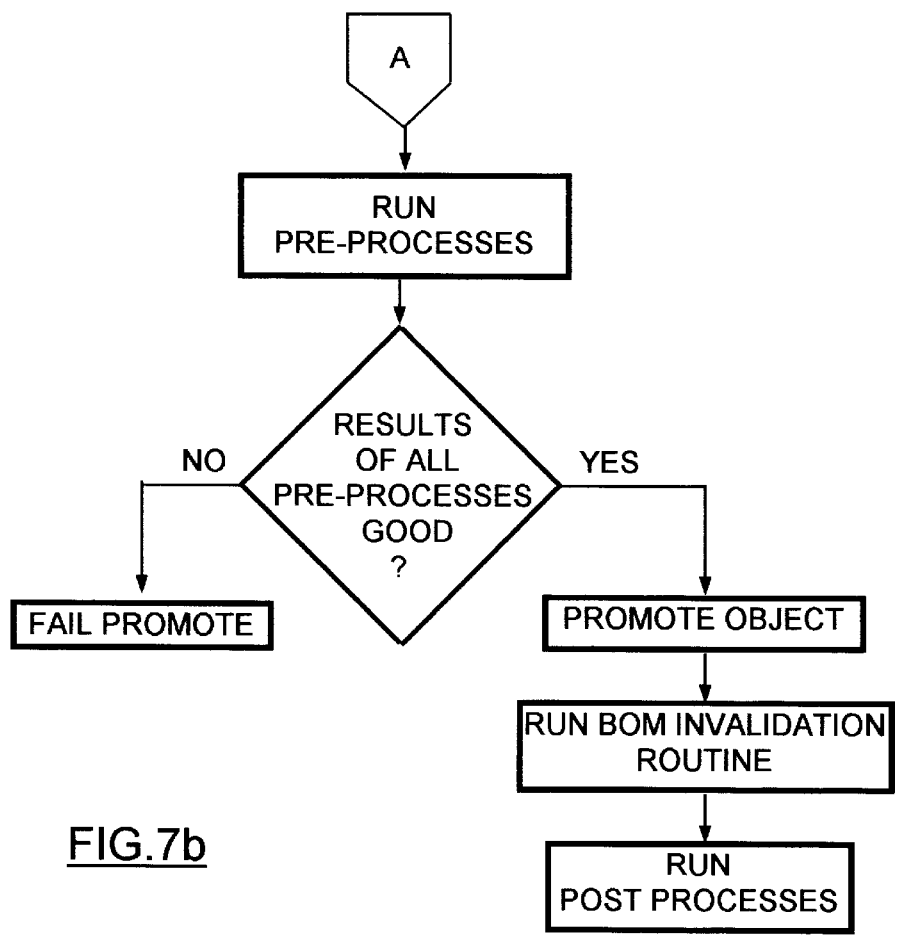

An important aspect of the DCS is that it provides a method for the design to traverse to different levels of goodness. As the design stabilizes at the higher levels, the number of pieces which need to be moved and tracked can be very large. The DCS uses the concept of promotion criteria and robust mechanisms to first determine what data can be promoted, then carry out the task in an expedient manner. The DCS supports two variations, "move" and "copy", promotes. In a "move" promote, data appears to the user like it only exists at the target level once the promote completes. The user is unable to access the copy that existed at the previous level. For example, if a design component is at level E2 and the user promotes it to E3, when the promote is finished and the user refreshes his image of the library, he sees the data at E3 only. In a "copy" promote, the data still appears at the previous level. The user can access it at either location. As new iterations of the same design component are promoted into a level, the old component is not truly overlaid. It is moved off to the side so it can be restored in an emergency. Promotion criteria usually exists in the form of library process or pseudo-process results, but in general it can be any condition that must be met by the the object(s) being promoted. It is defined by the Data Manager and can exist for any design component at any level and version. Certain design components don't undergo any formal checking or evaluation in the design process, so they may never have any promotion criteria. Other pieces may undergo the majority of checking so they may have lots of criteria. The objective of the DCS is to track actual results for each design component and use the promotion criteria to determine if the design can attain the next level of goodness. When a design component is overlaid or deleted, all corresponding results are deleted too. The DCS supports an emergency override mechanism which allows the Data Manager to promote data which does not meet the criteria. Invoking an emergency override cause a log entry to be written indicating criteria has been bypassed. The Data Manager determines which results are necessary for which types of design at each Engineering and Release Level. These results may get recorded through "library controlled" or "external" processing. At the time the promote is initiated (whether it be against individual design components or BOMs), the mechanism illustrated by FIG. 7a and FIG. 7b is invoked to determine what pieces should be promoted. There are three types of promote transactions:

1. Promotion of an Individual Design Component
2. Promotion of a Group of loosely-coupled Design Components
3. Promotion of a Group of tightly-coupled Design Components (i.e. BOMs)

Basically, the same mechanism is employed in all three cases, but cases 2 and 3 require additional optimization for high performance. In case 1, each step in the mechanism is executed once and the promotion either succeeds or fails. Case 2 is initiated by a user selecting a group of objects to be promoted. They may or may not have any relation to each other. In this case some optimization is done, but each object is basically treated as if it were initiated as an individual promote. For example, the authority check only needs to be done once since the same user is requesting the promotion for all the objects. However, since each object can have unique locks, criteria, processes defined, etc., most of the steps need to be repeated for each object. Case 3 is the most complicated because the DCS offers a great deal of flexibility. The actual implementation is dependant on the platform of the DCS and the type of control mechanism in place (file-based, object oriented database, relational database, etc.). If the user community wants to eliminate flexibility in return for increased performance, the DCS can enforce rules such as no library processing allowed for members of a BOM. In this scenario, the entire algorithm would be executed on the BOM itself to ensure the proper authority is in place, it meets the promotion criteria, and any processing that's defined is executed. However, each member could bypass some of the checks thus saving a significant amount of time. If the user community opts for flexibility, some optimization can still be performed. For example, if a BOM contains 10 members and the mechanism calls for five checks on each member, there doesn't need to be 50 requests for information. Depending on the platform, it may be optimal to either make one large request for each member (ten total requests) and obtain all five pieces of information in the request. In other cases it may be optimal to initiate a request for a piece of information, but solicit it on behalf of all ten members (five total requests). Since these BOMs can be extremely large, the various kinds of optimizations and trade-offs between flexibility and performance determine the exact implementation. As a convenience feature the DCS supports a multiple promote feature which allows the user to request a promote through multiple levels. For each level the promotion mechanism is followed as stated above. For example, when initiating a promote, the user can specify to move data from E1 to E3 with a single invocation. However, the DCS will internally break it into two separate promotes with the full mechanism being run for the E1 to E2 promote, then again for the E2 to E3 promote.

Library Controlled Processing (Section 1.10)

The concept of Library Controlled Processing allows tasks to be launched from a public library, against one or more design components, with the results being recorded against the components. This is an automated method to ensure that tasks, and checks deemed critical to the level of design are run and not overlooked. Since some of these tasks could be third party tools, the actual implementation can vary in sophistication. In its simplest form, Library Controlled Processing consists of the following constituent parts:

Foreground Processing:
  This is the conduit by which the user enters any information required to run the tool. Menus may be presented or the user may interact in some other way.

Pre-Processing:
  This refers to a library controlled process that is launched prior to the data being promoted to the target level. The process must finish and complete successfully, based on the promotion criteria of that process, if the promote is to continue. For example, if a pre-process is defined at level E2, then when the promote to E2 initiates, the process is launched and the promote "suspends" until the process completes. Once it finishes, the result is compared against the criteria to ensure it's satisfactory. The promote then resumes.

Post-Processing:
  This refers to a library controlled process that is launched after the data arrives at the target level. The results of the process are used as promotion criteria to the next level.

Designer Initiated Library Processes (DILP):

This is very similar to a post process, but instead of the DCS launching the process, it's manually launched by the designer. DILPs usually exist to retry Post-Processes which failed. This eliminates the need for the user to re-promote the data just to initiate the processing. If a DILP is used to recover a failing Post-Process, and the DILP is successful, the good result will overwrite the bad result from the Post-Process. Just because DILPs are primarily used to recover failing Post-Processes, the DCS doesn't make this a restriction. The Data Manager can set up DILPs as stand-alone processes with no corresponding Post-Process. DILPs that exist to recover failed Post-Processes are optional in that they are not counted as required promotion criteria. Stand-alone DILPs can be optional or mandatory, with mandatory DILPs being required to run successfully in order for the data to promote to the next level. The DCS allows the Data Manager to designate which DILPs are mandatory and which are optional.

Level Independent Pseudo Processes:

These are special types of process which are more like process results than actual processes. They exist as a means to record information outside of the scope of results from Library Controlled Processes or External Data Processing. For example, suppose a Library Process exists to run a layout checking program which checks for wiring and ground rule violations. Ultimately the program will return some pass/fail result, such as a return code, which the DCS uses as the process result. The tool may also return other useful information which the designer wants to save, such as the number of wires or cells in the design. Pseudo processes provide a repository for this kind of data. Like DILPs, these can be used as mandatory criteria for promotion, or they can be optional and used solely for information. They can even serve as status indicators for design components progressing through a lengthy process at a particular level. The concept of level independence means the checking program could be run at the E2 level, but the pseudo process results can be stored at E3. In short, the DCS allows a pseudo process to be defined at any level, and it can be set by a process running at the same level, any other level or completely outside of the library. The DCS provides an API for setting level independent pseudo processes. The API can be used by designers, Data Managers or third party tools, and employs a "process search" similar to a library search. This means the API allows the user to specify the name of the process, the data type, level and version. The DCS will use this as a starting level and search for all matching pseudo processes defined at or above this level by following the same library search mechanism as in FIG. 5. A flag also exists to disable the search and set the result for the process specified at that level and version.

Any number of any type of processes can be defined by the Data Manager for a given data type at a particular level and version. In addition, processes can be chained together in independent or dependent sequences. In a dependent sequence, each process must complete successfully before the next process in the chain can initiate. For example, when compiling VHDL, the entity must always be compiled prior to the architecture. Thus two compiles could exist as a dependent sequence where the entity is compiled, the result checked, and if successful, the architecture is compiled. In an independent chain, the first process initiates, and when it completes, the next process runs regardless of the outcome of the first process. Processes can also execute using input data other than the object used to initiate the promotion. Using the VHDL compile example, the actual object being promoted could be a simulation BOM which contains that entity and architecture VHDL. The DCS provides a robust system for the Data Manager to define the processes which should be run, and the type of data they should run on. Certain library controlled processes require special resources such as large machines, extra memory capacity, etc. Therefore, the DCS allows the Data Manager to specify a particular machine or pool of batch machines where the tasks can execute. Either the task is transferred to the specific machine or a request is queued up in the batch submission system. In the event that a task must run on a completely different platform, the DCS provides hooks to launch a library controlled process from one platform which initiates a task on a different platform (i.e. a mainframe). The results are returned back to the original Automated Library Machine and processed. This Cross-Platform capability allows the DCS to encompass a broad and sophisticated methodology utilizing tools on many platforms. Regardless of how the process is launched, the results must ultimately get recorded within the DCS. To accomplish this, the DCS provides an Application Program Interface (API) through which third party tools can communicate. When the task completes, the API is used to convey the results and the pedigree information back to the DCS. The DCS provides both an interactive means and a report generator to view process results. FIG. 7a and FIG. 7b illustrate the method by which promotions and library controlled processing interact.

External Data Processing (Section 1.11)

External Data Control is very similar to the Designer Initiated Library Process in that the user launches a task against some design component(s). However, unlike DILPs which require that the design components be under the control of a Public Library, this type of processing is done on data in Private Libraries and designer's work spaces. External processing is the mechanism whereby the DCS captures the results of the process along with pedigree information concerning the input data, output data and any necessary software support or execution code. This pedigree information is stored along with the design component for which the designer initiated the process. When the designer promotes that component at a later time, the DCS checks the pedigree information to ensure nothing has changed. It then checks to see if the external processing matches any of the defined library processes which are required for the promote. If so, and the external processing results meet the criteria, the library process results are set (as if the library process just ran automatically) and the promote proceeds. If no matching process can be found, the external results continue to be saved with the design component as they process may match that at a later level. The concept of External Data Processing exists to increase productivity by allowing the designer to save, and later apply, results obtained during the normal course of design rules checking to the "official" results the DCS uses to determine the level of goodness. Overall data integrity can easily be breached if a proper mechanism for calculating pedigree information is not implemented. For this reason it's imperative for the DCS to ensure that all the proper input, output and software data are included in the pedigree information. External Data Processing occurs in two phases. In the first phase, the designer runs some tool or process and if the results are acceptable, he runs a utility to designate the data for external processing.

The role of the utility is to create the Pedigree information which contains a listing of the input and output data, the results, and some type of data identification code for each member of the Pedigree and the Pedigree itself. A simple identification code is a cyclic redundancy check. The utility can be independent of or incorporated into the actual third party tool. The second phase consists of librarying the data and the results. The designer invokes a special form of a promote which first does the following:

1. Check the data identification code (i.e. CRC) of all members in the Pedigree
2. Check the data identification code of the Pedigree itself.

These 2 steps are designed to ensure the same data used to generate the result is indeed being libraried. The identification code of the Pedigree ensures that the contents of the Pedigree weren't manually altered. From this point on, the normal promotion mechanism in FIG. 7a and FIG. 7b is followed with one exception. The boxes where Foreground, Pre and Post Processing occur are all bypassed. Rather than simply checking existing results to see if they meet criteria, the DCS makes a list of all Pre-processes for the target level and Post processes for the previous level. It then checks the Pedigree information for evidence that equivalent processes were run and achieved acceptable results. If any processes exist in the DCS for which no corresponding Pedigree results exist, or any Pedigree result does not meet the prescribed criteria, the promote fails.

Authorities (Section 1.12)

The DCS permits the Data Manager to establish a wide variety of authorities which gives him great flexibility in managing the library. Each type of authority can be defined very loosely (the user is authorized for all design components, at all levels, in all versions) to very tightly (the user is authorized on an individual design component basis). The utility for granting authorities works in one of two modes:

In one mode the Data Manager is offered a screen in which he can fill in the design component name, type, level, version, user ids, and the type of authority. For any field, except for the user ids, he can default it to "ALL".

In the other mode an authority profile can be called up and executed. An authority profile allows the Data Manager to pre-define the types of authorities for a given type of job. For example, profiles may exist for Designer, Technical Leader, Model Builder, etc. This information is contained in an editable ASC file in which the Data Manager defines the kinds of authority to varying degrees of restriction. Once the profiles are created, the Data Manager uses this mode to either add/delete users to/from the profile and process the changes within the DCS.

Authorities exist for the following tasks:

Setting Locks (Move, Overlay, Update, ALL)

Promoting design components and/or BOMs into levels (Engineering

Levels, Release Level.

Creating BOMs

Initiating Library Processes

Setting Pseudo Process Results

Data Manager GUI User Interface (Section 1.13)

The DCS contains a robust Data Manager interface which is used to "program" the library. It's configured as a series of sub-menus arranged under higher level menus. Each sub-menu has fields to fill in and may employ Predefined Function (PF) keys for additional features. Graphical elements such as cyclic fields, radio buttons, scrollable windows, etc. may be used to further enhance usability. Utilities exist to:

Define the library properties

The user is afforded a means to enter the path of the repository where the data resides, the userid of the Data Manager and any alternates, the userids of any Automated Library Machines, and whether the library is under Design Fix or Part Number and EC control. If the library is under any type of control, additional entries are made for the data types which should be tracked by Part Number, the data types which should be tracked by Design Fix number, the EC control level, and a field for a generic problem fix number. For any ALMs, the DCS will automatically add the proper authorities (including operating system authorities) to permit the ALM to store data and record results.

Define the structure (levels, versions and their interconnections).

This is the means by which the Data Manager adds and deletes levels and versions. It also enables him to defined the interconnections of the levels, and the dependance of versions on other versions. A minimum interface consists of one screen for level structure and one for version structure. The level structure screen displays the current structure.

Define the types of data which will be under library control.

For all data types known to the DCS, this enables the Data Manager to select those managed in this particular library. The screen displays all known data types in the system with a flag indicating whether it's being tracked by this library. Each data type also has a field for an alternate storage location. This solves the problem caused by certain data types that can be very large. Therefore, problems may arise in trying to store these data types along with the all the other types in a particular level. By specifying an alternate storage location, these large data types can be further segregated.

Manage Library Controlled Processes

For each level, the Data Manager can add, modify or delete processes. For each process information is required about the type of machine it can run on, any necessary arguments, the result criteria, disposition instructions for the output, whether it's dependent on another process, and whether it should be deferred. The DCS provides Process Specific Boilerplates which can be used to manage process configurations for an entire project. Necessary and required information for each process can be programmed into the DCS, so when a Data Manager attempts to define that process to his library, some of the fields appear with default data already filled in. He can override any of the data.

The information for each process can be entered/edited individually on a menu containing all the above fields or a utility exists to load "process groups" which are pre-defined library controlled processes. The Data Manager simply selects a process group and attaches it to the appropriate data type, level and version. The process groups are ASC based files which contain the necessary process information in a prescribed format. They can be created using any ASC editor.

Set up authorities.

See the previous Section 1.12 for details.

Define automatic data groupings (Subset of BOM Tracking)

This enables the Data Manager to define a data group which consists of a master object and member objects. Each member object can be required or optional. For each master object entered, the user must enter a list of member objects with their required/optional flag. In addition, an Erase-To-Level flag exists which determines the outcome of the following scenario: a data group, comprised of optional members, exists at a level. The same data group, without some of the optional members, exists at the next lowest level. Upon promotion of the lower level data group, the DCS will either erase the members of the upper level data group or leave them, depending on the Erase-To-Level flag. By leaving them in place, it allows members of newer data groups to join with members of older data groups.

Design Fix Tracking (Section 1.14)

One of the most powerful aspects of our DCS is provided by the process used to track fixes to design problems. This is accomplished by tightly or loosely coupling the DCS to a problem management database. Typically, a problem is found and entered in the problem tracking database. Once the design components are identified which require updating, the DCS is used to attach the problem number to those design components. Ideally this should be done prior to the design components entering the library, but it can be done as part of the promote. It's often redundant to track all design components with problem numbers, so the DCS can be programmed to only enforce Design Fix Tracking on certain data types. Whenever a promote is initiated, the DCS checks to see if the library is in Design Fix Tracking mode (which means some data types require Fix problem numbers to enter the library), and looks to see if any of the data types included in the promotion are being tracked. For those that are, a screen displays all known problem fix numbers for that design component. The user can select an existing one or add a new one to the list. At this time, the DCS will check to see if the EC control level is being crossed (or bypassed via a fast path promote). If so, it will attempt to associate the problem fix number to an EC identifier. If it can't automatically determine this association, the user is prompted to enter the EC identifier for the selected problem fix number.

If the designer chooses to do the association in advance, a utility exists which allows him to enter a problem fix number or choose a default number.

The status is immediately reflected as "working". Once the promotion is initiated the status will switch to "libraried". The DCS offers utilities to view or print reports showing which design components exist for a problem or which problems are fixed by a design component. The report generator allows the user to enter the problem number and see which design components are associated to it. Or the design component can be specified to see which problems it fixes. Finally, and EC identifier can be specified and all problem numbers and design components associated with the EC can be displayed.

Part Number/EC Control (Section 1.15)

In addition to tracking design fixes, the DCS can track the design by part number and/or EC. For projects which assign part numbers to various design components, the DCS provides utilities to generate and associate these part numbers to the design components. In addition, the DCS supports Engineering Changes where successive tape-outs are assigned an EC identifier. All design components participating in an EC are associated with the EC identifier. Since part numbers are assigned to specific design components, the DCS uses the links between components design fixes and EC's to track the association of part numbers to ECs. The DCS uses the concept of a PN/EC control level to permit the Data Manager to determine at which level PNs and Design Problem numbers get associated with EC numbers. As design components cross this level, the DCS checks to see whether a problem number or PN exists for the component. If so, and the system is able to determine which EC that number is associated with, it automatically connects the component to the EC. Otherwise, if no EC information can be found, the user is asked to enter it. The rules for Design Fix and EC control are as follows:

One EC can contain multiple Design Fixes;

Any single Design Fix # (number) can only be associated with a single EC;

One design component can have many Design Fix numbers, but they must all belong to the same EC; and Variations of a design component can exist in multiple ECs, but each must have a unique set of Design Fixes.

Figure 8A:
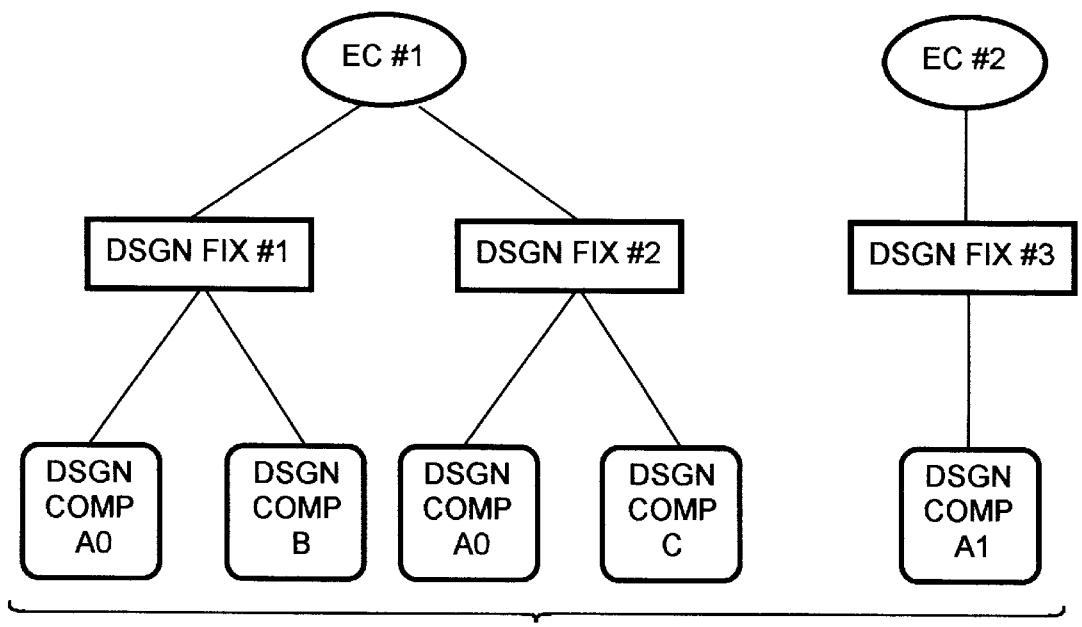
FIGS. 8a and 8b illustrates our preferred Design Fix Management and EC Control.
Figure 8B:
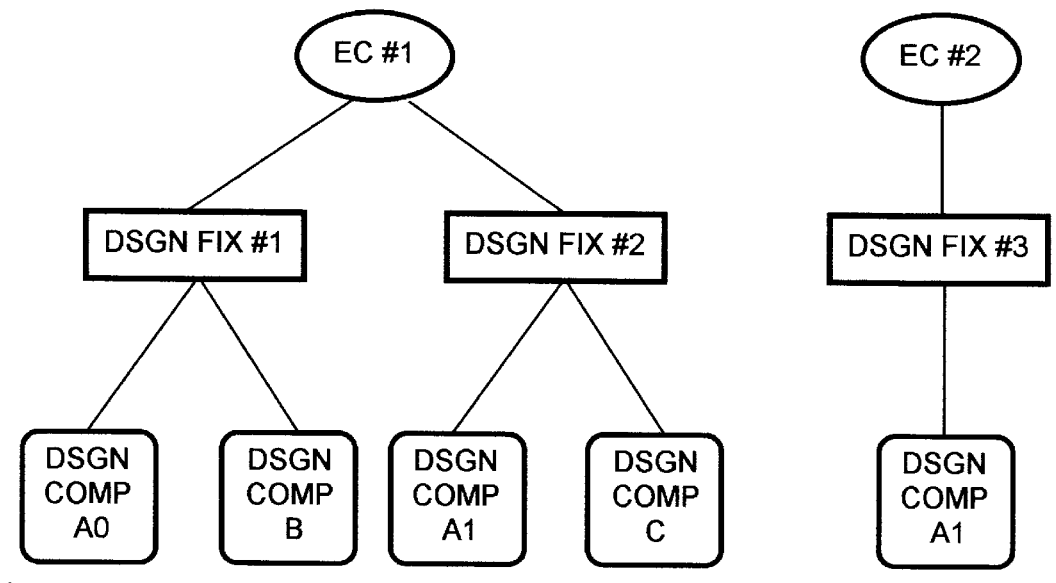

FIG. 8a illustrates a legal example. It shows two EC's where the first contains two design fixes and the second contains a single design fix. There are three design components, of which the one denoted A0 is associated with Design Fix #1 and Design Fix #2. Design component A1 is a different variation of design component A0 The example shows how the two versions of design component A must belong to separate ECs. In FIG. 8b the rules have been violated since design component A1 is associated with Design Fix #2 which belongs to EC #1. The DCS detects this condition and alerts the user to either move Design Fix #2 over to EC #2, or detach design component A1 from Design Fix #2. In addition to tracking all the part number and EC information the DCS is capable of generating a variety of reports including one listing all the part numbers for a given EC. This report can be sent to manufacturing in advance so the foundry can manage their resources.

RAS and Security (Section 1.16)

The DCS is designed in such a manner that provides maximum security for the control data. None of this data is present in simple ASC files residing in a writable repository. All updates to this information must be made through the proper utilities by authorized people. Libraried data only exists in repositories where the Data Managers or owners of the data have write permission. This prevents other users from modifying another designer's data outside of the DCS. Nearly continuous availability is achieved by implementing the DCS in the following manner:

If the primary DCS server fails, the system can be brought up on another server with minimal human intervention. The physical locations of all libraries are determined by the Data Manager which permits the data to be strategically located throughout the network to improve availability.

Multiple paths exist to request information from the Control Repository. They provide alternate routes in the event of network or router problems.

Archiving and backing up data is accomplished with the following features:

The Design Control Repository can be archived onto tape or backed up to another repository by the Data Manager as often as deemed necessary. In the event of corruption, this back up copy can be restored into the primary repository.

All libraries can be archived to tape or backed up to alternate repositories defined by the Data Manager as often as deemed appropriate.

The DCS provides a utility which checks to see if a backed-up or archived copy of the Design Control Repository is in sync with a backed up or archived copy of a library. During the archiving procedure, the system assigns unique identification codes (i.e. CRC codes) to each data object. These codes are used during the recovery to ensure the data was not tampered with while dormant on the back-up repository.

The system provides a method for restoring individual data objects from backed-up or archived repositories in the event the data object is deleted from the active library.

GUI User Interface (Section 1.17)

The User Interface consists of all the menus, dialog boxes, and screens by which the designers interact with the DCS. They all have the following characteristics in common:

They are user friendly with convenient on-line help.

They share a common look and feel to make it easy for the user to find common features.

When something fails or the user makes an entry error, the system clearly indicates the error with an English description of the problem, and suggestions on how to fix it.

A command line interface exists to perform any operation that can be done through the graphical user interface.

Various designer utilities exist to:

Initiate promote requests. The minimum interface requires the user to enter the name of a design component or select from a list, enter the level from which to begin the promote, the target level where the promote should terminate, a flag indicating whether it's a BOM promote, and the version.

Send results from External Data processes to a library. This utility allows the user to enter the name of a Pedigree and the target level and version to which the Pedigree information should go.

Set up and manage a private library. The utility has fields where the user can specify the name of the library (if one is to be created), the library path where the repository will reside, the userids of the owners, and either the userids or authorization groups of those who can access it. These properties can be called up for modification at any time. Whenever the owner or access fields are altered, the DCS automatically updates the authority records within the Design Control Repository as well as the operating system (i.e. AFS) permissions of the directory where the library resides.

Create and monitor a Bill of Materials. The utility offers two modes of operation. In the first, the user identifies the Bill of Materials, and enters the names of all design components to be added as members. This same utility will display any existing information for a BOM, so members can be modified or deleted. For each member, the user must indicate whether it's an input, output or support member. For an existing BOM, a function exists to revalidate all members, but this can only be done by the BOM owner. The second mode builds the BOM by reading all the information from an ASO text file written in a prescribed format. This mode can be used by designers, Data Managers, and third party tools. Regardless of how the BOM is created, a newly created BOM will result in the valid flags being set for all members. The user who creates the BOM using the first mode is automatically the owner, whereas the input file used for the second mode contains the owner information.

View process and pseudo process results. The user specifies the design component, data type, level and version. He can specify the exact process or obtain a list of all processes. For each process, the display shows the result (if it exists), the date and time it was set, how it was set (library controlled process, external process, or manually) and the criteria. These results can only be changed by the Data Manager.

Associate design problem numbers to design components. The designer uses this to pre-associate problem fix numbers to design components before they are promoted into the library. This way technical leaders and other designers can determine if a particular problem is being worked on. The interface requires the user to identify the component by name and type. Since it's not in the public library yet, it has no level or version. The user must also supply the problem fix number. The DCS automatically assigns the "working" status to it. Later, when the designer wants to promote the component, the problem fix number will appear on the selection list, and after the promote completes, the status will change to "libraried". The DCS allows the Data Manager to define a generic problem number which designers may select to associate with miscellaneous design changes that have no corresponding design problem.

WWW/Internet Access (Section 1.18)

The DCS provides a mechanism which permits access to all process and pseudo process results through the World Wide Web. Key quality control indicators can be exported out of the DCS into an accessible format by users on the WWW. Usually these results would exist in a secure repository which could only be accessed by WWW users who are working on the project. In addition to accessing information, the ALMs can receive special e-mail requests from users to perform these tasks:

Generate various status reports on topics such as PN-EC and Design Fix Tracking, Process & Pseudo Process Results, or BOM information. The DCS would generate the report on the fly and return it to the user's Internet or e-mail address.

If the user has the proper authority, he can submit e-mail requests to add pseudo-process information into the DCS. The contents of the mail would contain a specifically formatted command which the DCS can interpret to set the appropriate results. This could be used by people remotely connected to a project (such as the chip foundry) to send status information directly to the DCS.

The DCS permits an authorized user to send commands through the Internet Common Gateway Interface (CGI) to query information from the DCS or invoke Designer Initiated Library Processes (DILPs).

Actors & Objects (Section 1.19)

Figure 9:
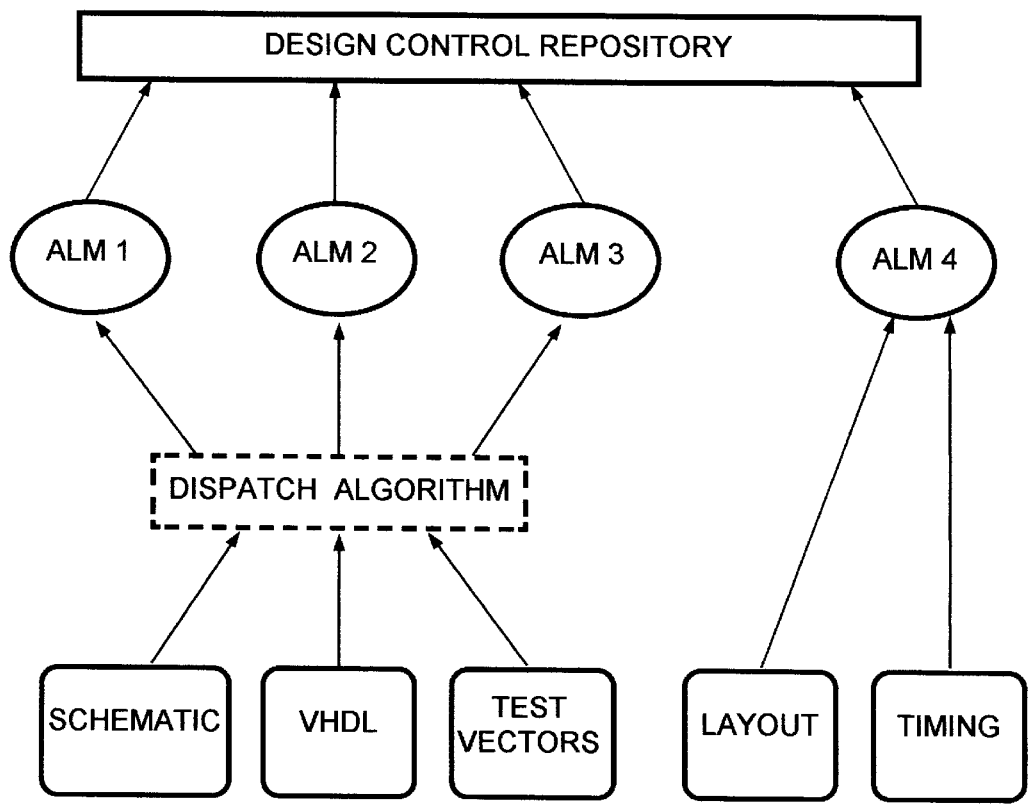
FIG. 9 illustrates our preferred DCS Using an Actor/Object Environment.

In the event of a project where a single large design team or multiple smaller ones, require their data to reside in a single repository, the potential exists for a performance bottleneck in the Automated Library Machine. The DCS offers a feature called Actors & Objects to combat this. Actors & Objects allow the Data Manager to define an alternate structure in which designers tasks are dispatched to a pool of Automated Library Machines (Actors). No design data is stored on any of them; they merely execute the tasks then store the results and data into the Design Control Repository (Object). The Data Manager can control the types of jobs each Actor is allowed to perform by creating Actor Lists. These lists contain information which the DCS uses to determine which ALM to route a particular job to. FIG. 9 shows an Actor/Object environment with four Actors. Jobs involving the data type of layout and timing are segregated to ALM4. All remaining work is sent to ALMs 1 through 3. The DCS determines which to use based on an mechanism which tries to find either a free ALM or choose one that may be able to spawn a parallel process (assuming the operating system supports it).

Importing and Tracking Data (Section 1.20)

Internally the DCS tracks all data by component name, data type, level, version, library and most importantly a file reference (file ref) number. These six attributes give every piece of data in the system a unique identity. In a private library, all data is tagged with a DCS identifier as part of the filename, but the identifier may or may not be unique. This is because private libraries don't have a concept of levels, versions or file references. They are merely working areas for the designer, and only require the data to be identified by name and type. The system permits the designers to have multiple copies of a design component by using iteration numbers to distinguish between recent and older data. However, even though the concepts don't apply, the DCS still assembles an identifier and tags the data. There are two methods by which a piece of data can appear into a private library.

1. The designer creates the data from within the private library using some tool (Schematic editor, text editor, circuit simulator).
2. The data is created by some tool completely outside of the private library, but the designer wishes to import it into the library.

In either case, the tool (or user) chooses the filename. By default, this is the design component name. In the first case, the designer will be asked to specify the data type either prior to, or during invocation of the tool. In the second case, the user will be prompted for the data type during the import. In both cases of a data type entry requirement the DCS will automatically default the version, level and file reference number in order to assemble a uniform identifier code. This code will be appended to the design component name and will become the new name of the object. Upon promotion from a private library into a public library, the DCS will automatically assign a real file reference number to the object. Based on the destination version, and level, the DCS will assemble a new identifier and rename the object accordingly. The file reference number remains the same for the life of the object. As the object traverses through the levels of the library, the level is the only piece of the identifier that changes. In addition, the DCS maintains the same identifier information internally. This is considered the official tracking information and is always updated first during a promotion or installation of a new object into a public library. The object renaming is done afterwards. Appending the identifier to the object name serves two purposes:

It increases data security by providing a way for the DCS to check data integrity during promotions. The information contained internally must match the external identifier at the start of a promote. A mismatch signifies possible tampering of the data outside of the DCS, and the Data Manager is alerted to the mismatch.

It provides an alternate way for a user or another tool (such as the library search mechanism) to ascertain the version, level, and data type of an object simply by looking at it. This contributes to the availability by providing a means to locate and access data even if the Design Control Repository is unavailable (i.e. server down).

Figure 10:
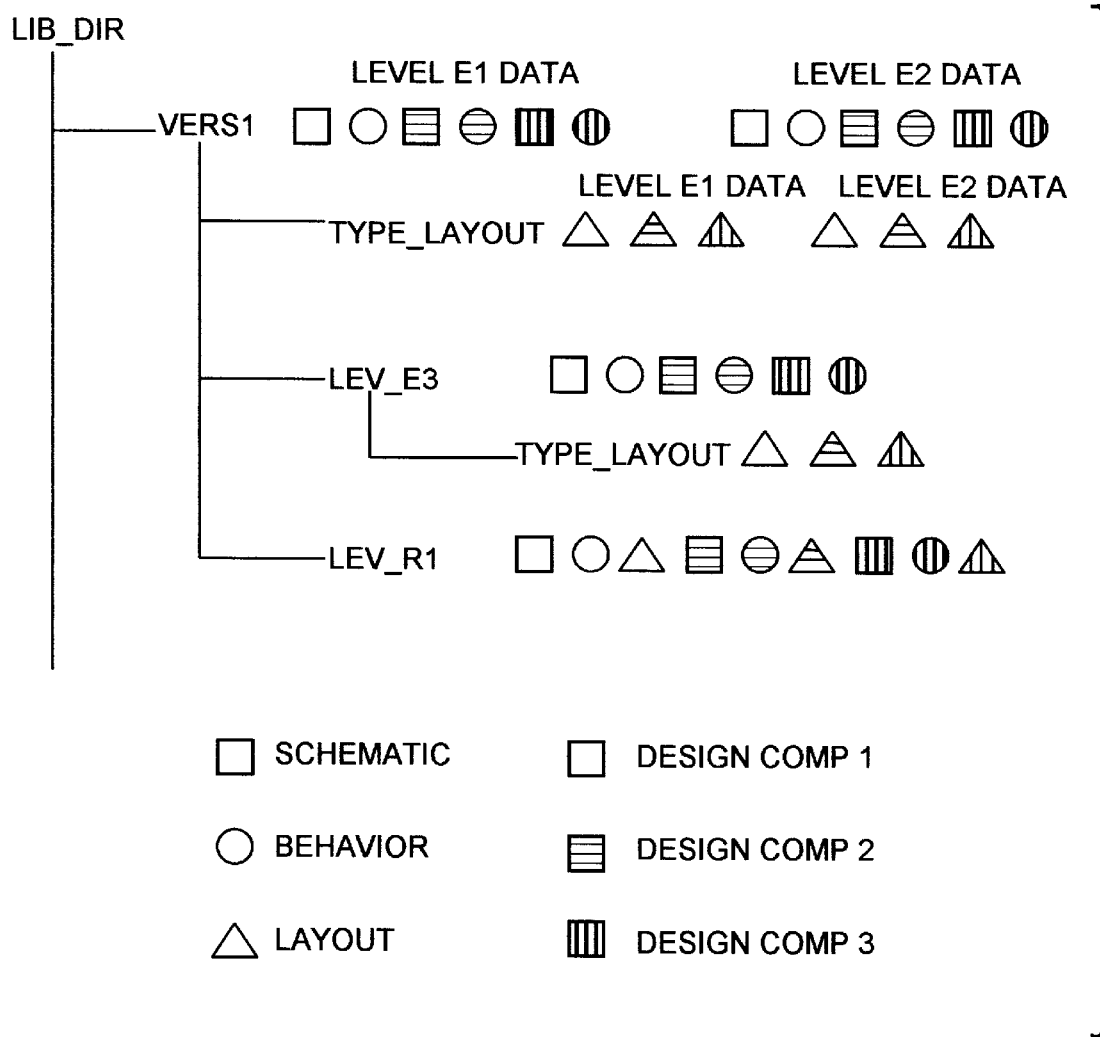
FIG. 10 illustrates our preferred Example of Location Independent Data Tracking.

One major advantage to this tracking scheme is it's independent of the physical location of the data. The DCS permits the Data Manager to establish as many repositories as he needs down to any level of granularity. For example, all data for a library could reside in one physical directory, the data could be segregated by version only, or there could be separate directories for each type of data. This level of flexibility allows the Data Manager to optimize the library to a given environment. For example, he can define his repositories in such a way that the data which moves most often is located on a single volume on his fastest server. Data which never moves (i.e. Release Level data) can be located on slow servers or spread out over multiple servers. As the Data Manager defines his library structure, he can specify the locations for every level of each version. In addition, if he has specific data types that he wishes to further segregate, he can specify a location for them. Finally, the DCS supports a feature called Automatic Component Grouping in which all data types for a given component name will automatically be located in a subdirectory off of the level directory. FIG. 10 illustrates a portion of a library directory structure with different levels of storage granularity. LIB_DIR is the primary directory for all data in the library. Under it, data is segregated by version where version 1 data resides in the subdirectory VERS1. At this point the diagram illustrates three examples of further segregation. In the VERS1 directory are the schematics and behaviors which comprise level E1 and E2 for all 3 design components. Although they are physically mixed together, their unique identifiers allow the DCS and users to tell them apart. The diagram shows the circuit layouts to be further segregated by data type. So they reside in subdirectory TYPE_LAYOUT Once data reaches level E3, it is segregated by level and type. LEV_E3 contains all the schematics and behaviors for the E3 level, but the layouts reside in the TYPE_LAYOUT directory under LEV_E3 The final example shows data segregated gated only by level with no regard to type. This is seen in the release level repository LEV_R1 By offering this kind of flexibility, the DCS permits the Data Manager to group the data in the most advantageous way. In addition, the Data Manager could invoke Automatic Component Grouping, which would result in further subdirectories under VERS1, LEV_E3 and LEV_R1 to segregate the pieces by component name.

Note: This is unnecessary in the TYPE_LAYOUT directories since the only difference between the objects is the component name. In order to boost performance, every time a structural change is made to a library which involves repositories, the DCS automatically generates a master cross reference between library/level/version/type and physical location. This table is used by mechanisms such as the library search engine to locate data without requiring extensive querying of the Design Control Repository. It also enables library searches to occur in the event the Design Control Repository is unavailable.

Our Aggregation Manager for a Data Management System(2.0)

Our Aggregation Manager provides a process for creating, modifying and tracking aggregates of data in a Data Management System running in a client server environment and is part of our overall Computer Integrated Design Control System, but can be organized as a separate Data Management Systems Aggregation Manager, so we will describe this part as applicable to a Data Management System. Our Aggregation Manager provides the process functions set forth in our Design Control System Section 1.8, and interacts with the other processes we have described. Specific aspects of our process flow for our Aggregation Manager which we described are shown in FIGS. 11 through 32.

Elements of the system may exist on a homogenous computer platform, or the elements may be scattered across multiple platforms. The Data Management system may incorporate processes for hardware design, software development, manufacturing, inventory tracking, or any related field which necessitates execution of repetitive tasks against multiple iterations of data in a quality controlled environment.

The present Aggregation Manager permits a user or a third party tool to create an aggregate collection of objects, encompassing those used as a Bill of Materials. In our preferred embodiment these objects are files residing in a Data Management System, but one skilled in the art could apply this definition to other types of data such as results, database tables, or any items that can be identified, tabulated and tracked by some organizational means. The remainder of this text refers to an aggregate collection by the simple pseudonym of Model.

By definition a Model consists of one master or Anchor and one or more members or Components. In our preferred embodiment, the anchor and components are pieces of data in the DMS. The components can belong to any level and version of any library in the DMS, and they are not restricted to the same library, level and version as the anchor. In addition, the members can consist of multiple data types, including data generated by disparate tools. Each component is labeled as an input or output in relation to the anchor file.

Our Aggregation Manager permits hierarchical Models whereby a component of one BOM may in fact be an anchor to a different Model. There is theoretically no limit to the levels of hierarchy supported by our Aggregation Manager. Once again, these components can belong to libraries, levels and versions other than that of the top-level Model.

Models can be created by interactive data entry on the part of the user, by importing a text file listing all the members of the Model in a prescribed way, or by an innovative library search feature. This mechanism provides an expedient and convenient way to search through a Data Management System for a particular type of data residing at or above a given control level. This features permits the user to quickly build large Models with hundreds or thousands of members. Furthermore, an Application Program Interface allows third party tools to couple the library search mechanism with the file importing scheme to automatically create Models as an extension of the process.

Upon creation of a Model, our Aggregation Manager provides continuous tracking of the anchor and the components. To begin with, the present Aggregation Manager incorporates powerful algorithms which monitor all the members of all the Models in real time. If any member is overlaid with a modification, or deleted altogether, an immediate notification is sent to the owner of the Model. This notification clearly states the Model being invalidated, the member which caused the invalidation and time-date information for providing an audit trail. In addition to simple Models, these algorithms will traverse Model hierarchies and notify the owners of all Models affected by the disturbance of any lower level member. Our Aggregation Manager also permits the Models themselves to move through the Data Management System. In a similar fashion to ordinary file movement, Model movement which disturbs another Model will result in the proper notification.

The present Aggregation Manager also permits the Aggregate Manager to interact with the Library Manager, Process Manager, and Lock Manager in order to promote an entire Model of files through the DMS, initiate Library Processes against a Model or set Move and Overlay locks on an entire Model. This facilitates data management of large inventories of objects which require identical actions to a group of pieces.

Our preferred embodiment interacts with the Authority Manager to control who can create Models and who can promote them through the DMS. Model Create and Promote authority can be granted in a broad fashion where a user can create and move any Model in the system, or a user's authority can be restricted down to a specific library, level, version and type of data. Our Aggregation Manager also includes utilities to delete Models, delete individual components of an existing Model, transfer ownership of a Model to another user, incrementally add new members to an existing Model, and view the current status of the Model. If the Model is invalid, the utility clearly indicates which members are invalid with time-date information regarding the invalidation. An authorized user can even override an invalid Model and reset the status back to valid.

Our Aggregation Manager provides a means to create, modify and track an aggregation of items hereafter referred to as a Model. In the preferred embodiment, a Model consists of one Anchor and one or more Components. Together, the Anchor and Components comprise the members of the Model and they all reside in the DMS using our PFVL method.

Our Aggregation Manager contemplates interaction with our Library Manager. to permit Models to be promoted through the DMS. This provides a means for moving large volumes of data through a data management system with high performance. Additionally, the present Aggregation Manager also contemplates interaction with the Authority Manager to provide a means for authorizing users to create and/or promote Models in the DMS. These authorities are controlled by the Data Manager using the DMS configuration utilities. The Aggregation Manager also interacts with the Lock Manager to permit a user to lock an entire Model with a single invocation.

Additionally, our Aggregation Manager permits Automated Library Processing to be executed against a Model. whereby the Anchor can be subjected to any Library Processing available to regular data objects. The Process Manager treats the Anchor like any other file thus permitting it to attain process results which must meet pre-defined promotion criteria.

All Components of a Model are either static or dynamic. A dynamic component is one that moves through the DMS with the Model as part of a Model promote. A static member does not move through the DMS, but it is tracked like all other members. Dynamic members are denoted by an I or O flag for Input or Output data with respect to the Anchor. The Anchor is denoted by an A flag and static members are denoted by S flags.

Models can be created interactively by authorized users or in the background using the Application Program Interface provided by the Aggregation Manager. Once created, the Aggregation Manager continuously tracks the Model and allows the user to modify it by adding members, deleting members, changing the status or deleting it. Anchors of one Model can be a Component of another Model, thereby creating hierarchical models.

Figure 29:
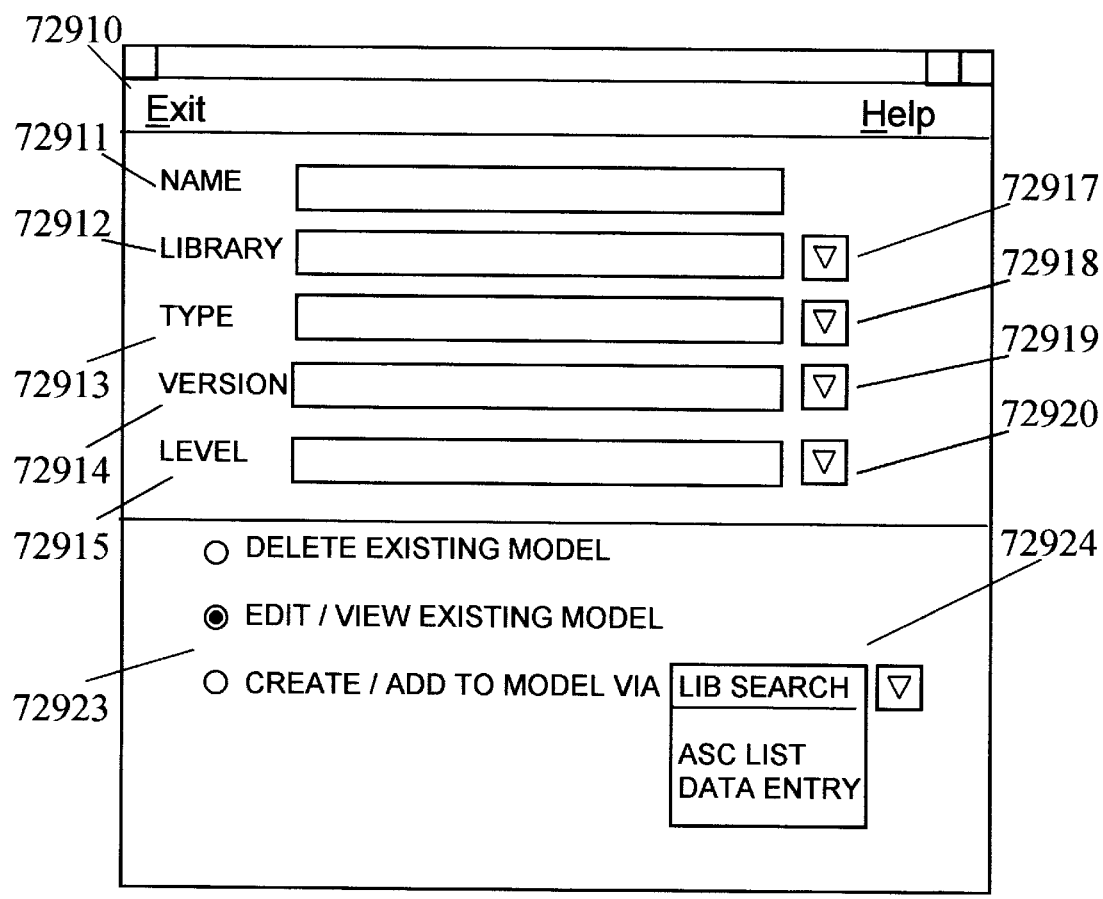
FIG. 29 shows the main menu for the Model Management Utilities

The preferred embodiment contains a collection of Model Management Utilities arranged under a hierarchy of menus. FIG. 29 illustrates the main screen with Main Menu Bar, 72910, at the top. This menu bar affords the user the chance to Exit and also provides on-line Help, which is presented through one or more subsequent screens. Directly under the Main Menu Bar lies the primary window which consists of fields 72911 through 72915. Field 72911 is the Name of the model which is identical to the name of the data object serving as the anchor. Field 72912 is the Library or Package where the anchor resides. Drop down menu button 72917 displays a list of all known libraries in the DMS. Field 72913 represents the Type of data object. In our preferred embodiment, this would be the file type of the anchor file. Drop down menu button 72918 displays all installed data types in the Package. Fields 72914 and 72915 are for the user to enter the Version and Level of the anchor, respectively. Drop down menu buttons 72919 and 72920 present a list of available Versions and Levels for the Package.

The lower portion of the screen depicts radio buttons, 72923, which offer the user three operations related to Models. The first button permits the user to Delete the Model. This function can only be performed by the owner of the Model or the Data Manager. Upon selecting this function, a subsequent dialog box permits four possible operations by way of two optional push buttons. They are:

Anchor This results in the removal of the Model and the deletion of the Anchor data object from the library.

Files Results in the removal of the Model and all Component data objects.

Pushing none of the buttons results only in Model deletion with all data objects remaining in tact in the DMS. Pushing both buttons results in the Model and all objects comprising the model to be deleted. Upon hitting enter, the program will automatically check for, and invalidate, any higher level Models which is comprised of this Model. The user is always given the opportunity to cancel prior to deletion of the Model. Model and component deletion are performed respectively by the QRMDLDEL and QRMFIDEL routines described in FIGS. 12 and 26.

The second option is for Editing or Viewing an Existing Model. Selection of this button reveals FIG. 31 which depicts Menu Bar, 72926, at the top. It offers the following selections: File, Return, Filter, Owner, Status, and Help. Below the Menu Bar is the Model information fields, 72927, which display the current Model Owner and Model Status. Under fields 72927, is the header information, 72928. This field denotes column headings for the Model information depicted in field 72929. Field 72929 displays one record for each member of the Model. The top record is the Anchor file of the Model, and the remaining records are the Components, any of which may be an Anchor to a lower level Model. Each record consists of the object Name, Data Type, Library, Version, Level and Status. Just to the left of the Name is a single character denoting the relationship to the Model. It may be:

A̲nchor of a Model

I̲nput of the Model denoted by the Anchor above it.

O̲utput of the Model denoted by the Anchor above it.

S̲tatic member of the Model denoted by the Anchor above it.

Figure 27:
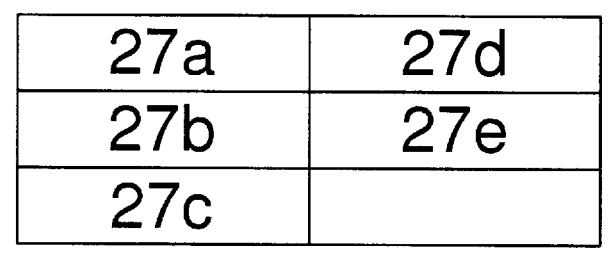

Field 72929 also serves as a line editor to permit the user to perform editing functions on individual members of the Model such as deleting them, using QRMFIDEL or changing the status via the QRMFIMOD routine described in FIG. 27. The removal of a member or, conversion of a status to Invalid, would result in the overall Model status converting to Invalid. Additionally, detailed information may be previewed for Anchor records. Such as number of Components, and the level at which the selected Anchor resides in the overall Model hierarchy. Our preferred embodiment entails using single character commands typed on the desired line number, in order to invoke the proper action. However, one skilled in the art could appreciate how other means such as cut and paste, selection using a pointer device such as a mouse, and/or menus or tool bars could be used to achieve the same means. Scroll bars 72930 and 72931 are present to permit the user to view additional records which may not fit on the screen, or the remainder of records too wide to fit on the screen.

Additional functions are provided on Menu Bar 72926. Upon selecting Filter, the user is presented with a dialog box offering radio buttons to select either Hierarchy or No Hierarchy. These buttons determine whether the model information is displayed in Window 72929 with all Anchors and Components or just the Anchors. There's also a push button to select Indented display which formats the output in a manner such that every hierarchical level of the Model is indented. Additionally, push buttons exist to allow the user to format the display information. These buttons are used to display any combination of the following:

Name

Type

Library

Version

Level

Status

Reason for Invalidation

Time Stamp of Invalidation

User Causing Invalidation

File Reference Number

Model Reference Number

Our preferred embodiment also includes a field where the user can specify the Maximum Number of Levels displayed on the screen. Upon hitting enter, the display window 72929 is immediately updated.

The user may also select Owner from menu bar 72926 to change the Model ownership. This results in a dialog box showing the current owner in an editable field. The user may fill in a new user and upon hitting enter, the program will verify that the user is the owner. If so, it will switch the ownership. The user may also select Status from Menu Bar 72926 in order to update the Model status. A subsequent dialog offers two radio buttons labeled Anchor Only or All Members. Upon choosing one of the options, the algorithm ensures the user is the Model owner, and proceeds as follows: if the current status is valid, it will change it to invalid. If the All Members option is selected, all Components will change to Invalid as well as the Anchor. Additionally, the program will check for any higher level Models which contain this Model. If any are found, the user is warned, as they will be invalidated upon commit of the changes to the DMS. If the current status is Invalid, the program will switch either the Anchor or the Anchor and all Components to Valid depending on the option chosen. Model ownership and status is altered via QRMDLMOD and component status is changed by the QRMFIMOD routines described in FIGS. 21 and 27 respectively.

Returning to Menu Bar 72926, the File selection results in a drop down menu offering the following choices:

Save Changes Commits any edits made on the current Model to the DMS. These changes can only be made by the Model owner or the Data Manager.

Reports Offers a variety of formatted reports that can be generated for the current Model. Our preferred embodiment includes replication of window 72929 with hierarchical or non-hierarchical formatting. Additional information beyond that shown in window 72929 may also be included in the reports. Some examples are model reference numbers, date/time of invalidation, user causing the invalidation, reason for invalidation, etc. Our Aggregation Manager also contemplates the export of the report data in popular commercial spreadsheet and database formats.

Print Prints the current view in window 72929 to an attached printing device or to a file in a printer-specific format (ie. PostScript).

Exit Leaves the utility without saving any modifications to the Model. The user must answer positively to a confirmation dialog box before the program exits.

At any time during the editing process, the user may return to the main screen in FIG. 29 by selecting the Return option on Menu Bar 72926. The user is given the opportunity to commit any unsaved changes to the DMS.

Returning to the main user screen in FIG. 29, the user may elect to create a new Model or add members to an existing Model using the radio buttons, 72923. Only authorized users can create Models, and only users who own an existing Model can add members. The only exception is the Data Manager. Upon selection of the Create/Add to Model via button, the user may also use cyclic field drop down menu 72924 to select the input method.

The first choice is via a Library Search. This results in the appearance of the user screen in FIG. 30. The top of the screen contains menu bar 72925 with choices File and Return. Return may be used to leave this function and return to the main screen in FIG. 29 at any time. No new Models or modifications to existing Models will be saved. Upon selecting File, the user is presented with a drop down menu with the choices Commit and Exit. Commit is the means for the user to communicate to the DMS that the data selected from the library search should be permanently added to the model. Exit allows the user to completely exit the Model Management Utilities at any time. The user is given the opportunity to commit any unsaved work.

Figure 30:
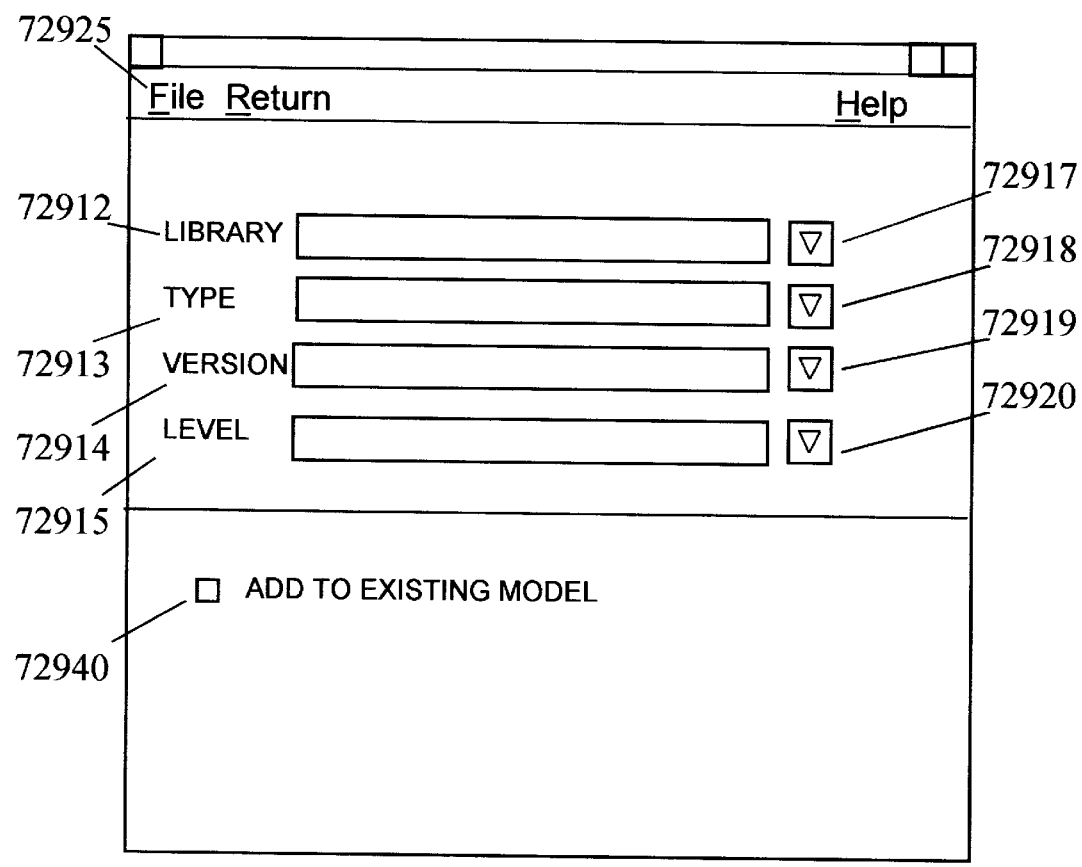
FIG. 30 illustrates the data entry screen for launching a Library Search used in creating Models.

The main portion of the screen in FIG. 30 is comprised of data entry fields 72912 thru 72915 with supporting drop down menu buttons 72917 thru 72920.

These serve the identical purpose to those found in FIG. 29, but they are used to select the members of the Model. The program interacts with the Search Manager to invoke a library search using the data entered in fields 72912 thru 72915. This data can be entirely different from that entered in fields 72912 thru 72915 of FIG. 29. Hence, a Model in one Library, Version, Level and Filetype can contain members of a completely different Library, Version, Level and Filetype.

The only option on FIG. 30 is push button 72940. This permits the user to explicitly request that any selected data be Added to the Existing Model. In certain instances the user is already aware of an existing Model to which additional members are desired. The presence of this button allow positive confirmation in advance, thus avoiding a subsequent warning dialog box.

Upon filling in all the information and hitting enter, the program embarks on the library search and presents a selection screen with all the data that was located. The user may select as many items as desired. The selection is performed by placing one of the following characters (I C S A) next to the desired data object to denote it as an Input, Output, Anchor, or Static member. Upon hitting enter, the following algorithm is implemented. If no Model identified by the main screen in FIG. 29 exists, then it's assumed that the user is creating a brand new Model. Thus, the program expects push button 72940 to be deselected. If those assumptions are satisfied, the program proceeds to create the new model. On the other hand, if push button 72940 is selected, this indicates the user believes a model exists that really doesn't. Therefore an error message is displayed and the user is given the opportunity to quit or have the new model created.

If a Model identified by the information in FIG. 29 does exist, the program assumes the user is adding new information. Therefore, it expects push button 72940 to be selected. If so, then the program proceeds with adding the selected data objects to the Model. If push button 72940 is not selected, the user is presented with a dialog box indicating two possible choices via mutually exclusive radio buttons.

1. Since a Model already exists, the user may add the selected data objects to it by pushing this button.
2. The user may elect to replace the existing Model with a brand new one comprised only of the selected data objects. This is permitted by this button.

Note: During the creation of the model, the program ensures that if an Anchor was identified, it's the same one denoted by FIG. 29. Otherwise, an error condition ensues, and the user is told that the Model may not possess multiple Anchors.

The user may utilize FIG. 30 multiple times to perform different library searches and accumulate a list of members which can be committed to the DMS at any time by selecting the File, Commit selection from menu bar 72925 on FIG. 30. Each time a library search is invoked, the program requests the Control Repository to return the File Reference numbers as part of the search results. These numbers are used to drive the actual Control Repository queries responsible for updating the Models.

Figure 32:
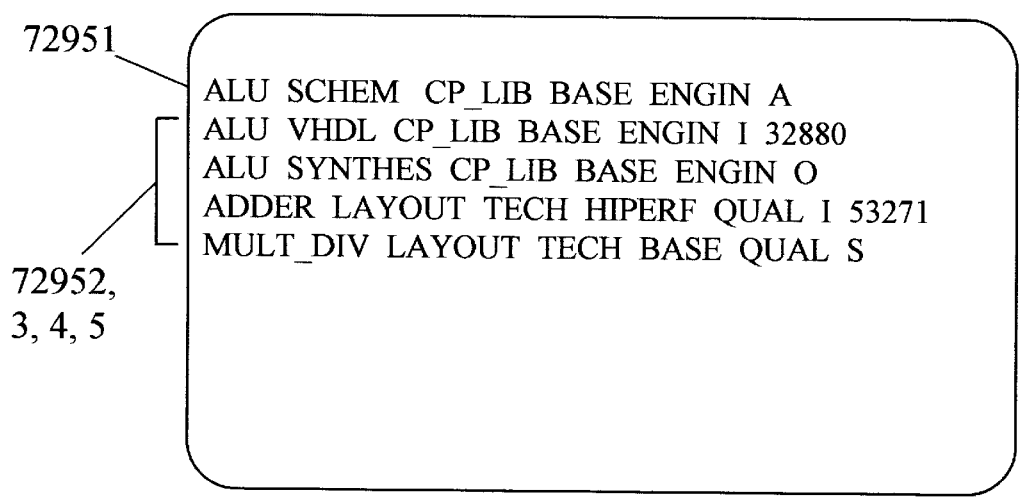
FIG. 32 diagrams a sample text file which may used to import the information required to create a Model.

The second method of inputting data into a Model is via the ASC List selection on cyclic field menu 72924 of FIG. 29. Upon hitting enter, the user is presented with a dialog box requesting the name of a formatted text file like the one shown in FIG. 32. Our preferred embodiment uses the following format, although one skilled in the art would clearly see that the same information can be conveyed to the program in numerous other formats. FIG. 32 indicates five records to show a sample Model containing an Anchor in Record 72951 and four Components in records 72952 thru 72955. Our Aggregation Manager supports any number of records, and the Anchor is not required to be listed first. The preferred embodiment shows each record comprising the same format which consists of six or seven tokens. The first six tokens are required and represent:

Name of the object
Type of the object
Library
Version
Level
IOSA flag

The seventh token is a File Reference number and it's optional. In certain instances, especially those involving creation of Models through third party tools, a File Reference number may be provided to improve performance. All records must have six tokens, and any record may have the seventh token.

Once the user has specified the name of the text input file, the program immediately begins processing it. If it encounters any Anchor records, they must match the Model identified in main menu FIG. 29, otherwise it's an error and processing aborts. If a Model already exists, the user is given the opportunity to replace or append the information in the text file to the existing Model.

Since the file may contain a mixture of records with and without File References, the underlying algorithm performs intelligent querying of the Control Repository to improve performance. In cases where File References are provided, no query is necessary since the File Reference number is the type of identifier required for creating Models or adding members to Models. For all records where the File Reference token is absent, the algorithm groups them by Package, Version, Level and File Type. It invokes separate queries for each PFVL, but a single query within a PFVL can return a list of all File References for that PFVL. The program filters the list to find the matching members and saves the File Reference number into a data structure. To further improve performance, if a given PFVL has only a small number of members (ie. five or less), then separate queries are done on each member as opposed to one giant query for the overall PFVL. Our preferred embodiment uses a threshold of 5 to determine the cutoff between one giant query and multiple smaller queries, but the number is really a function of the embodiment's environment, implementation of the Control Repository, bandwidth, size of user community, etc. Once the File Reference numbers are obtained for all the data objects in the list, the program proceeds with updating the DMS automatically.

Returning to FIG. 29, the user's third method for inputting Model data is via the Data Entry choice on cyclic menu 72924. This results in a simple data entry screen where the user must interactively type in the same information which is provided by the text file method previously described. In our preferred embodiment, the information is entered in the same format as FIG. 32 which enables the same algorithm to process it. If the user has File Reference numbers on hand, they can be entered as optional seventh tokens. Once the user finishes typing all the desired records into the data entry screen, a Commit button is provided to install the modifications into the DMS. Once again, if an Anchor is detected, it must match the Model identified in FIG. 29. Also, if a model already exists, the user is given the opportunity to replace it or append the information to it.

Figure 28:
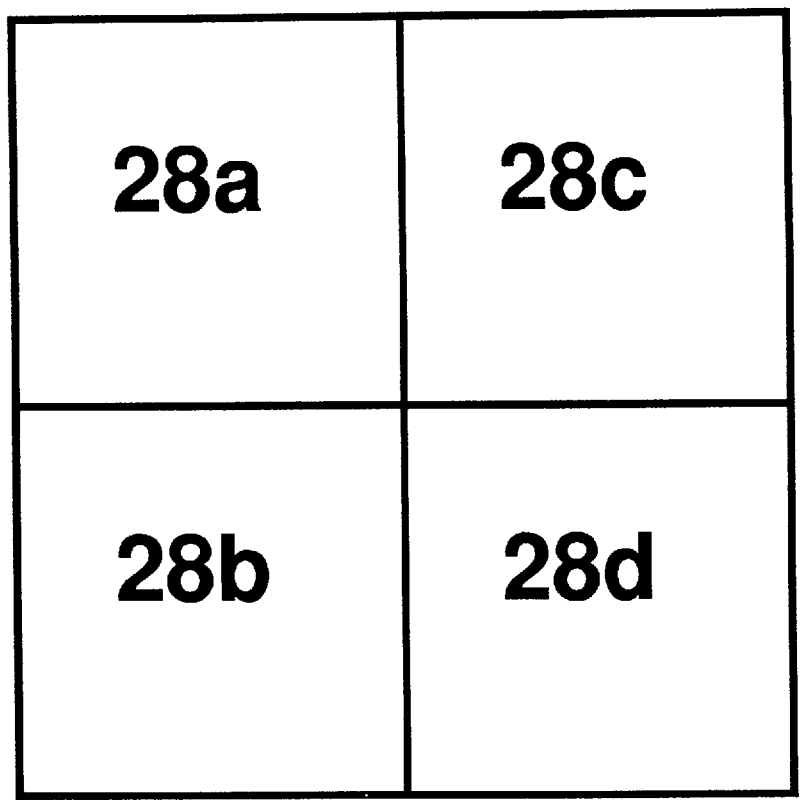
FIGS. 28 and 28a–28d describe the QRSUPMFI Process.
Figure 28A:
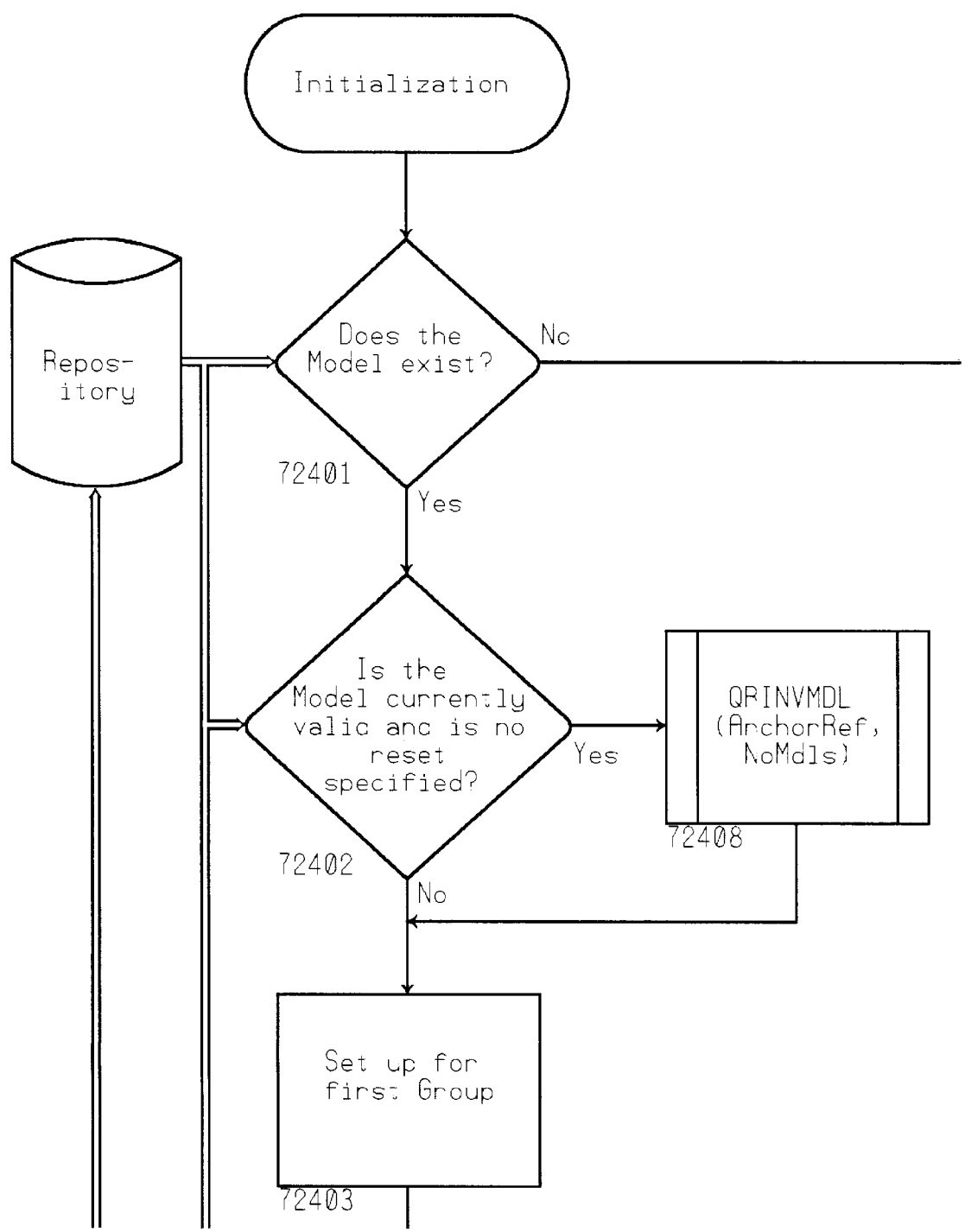
Figure 28B:
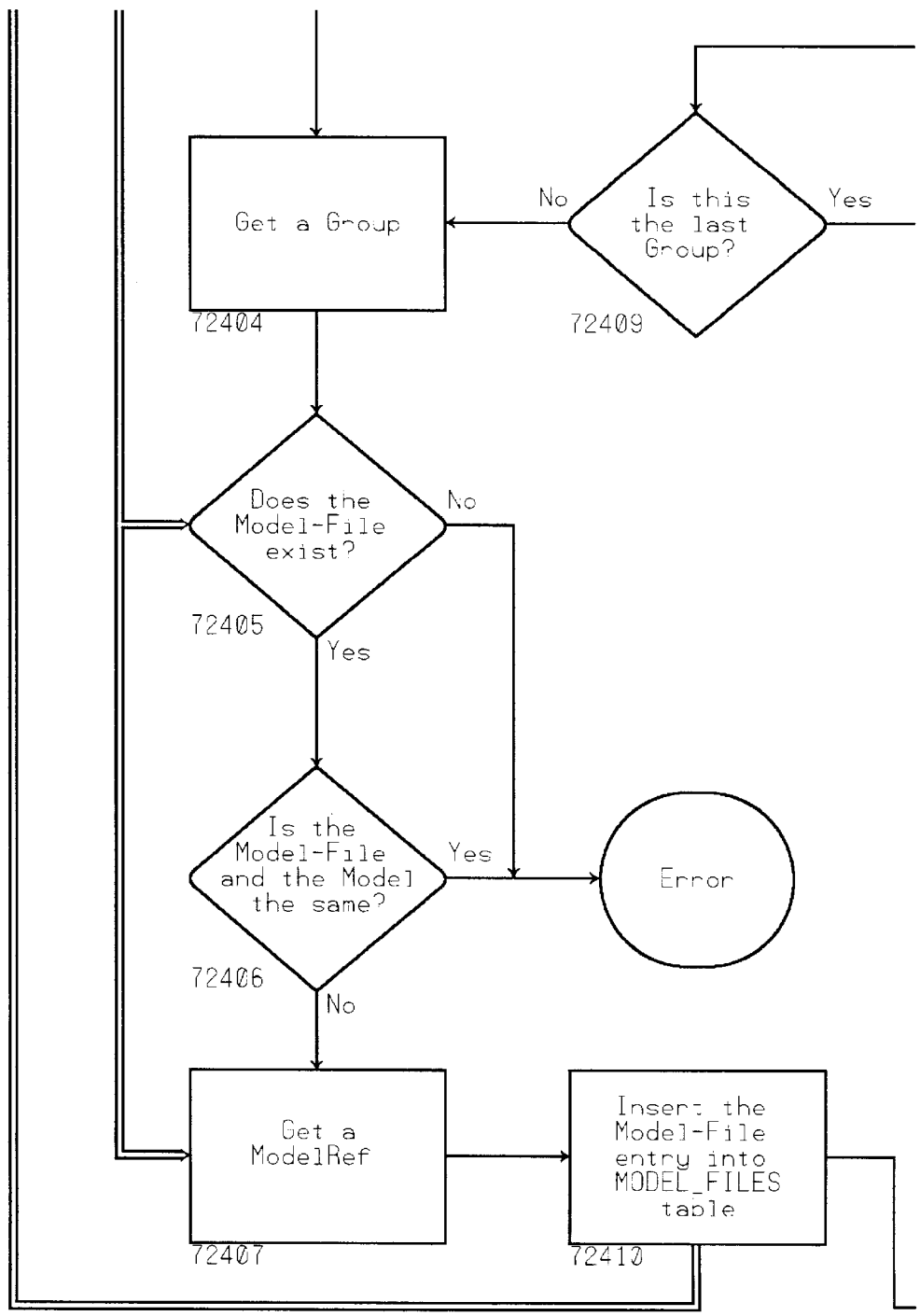
Figure 28C:
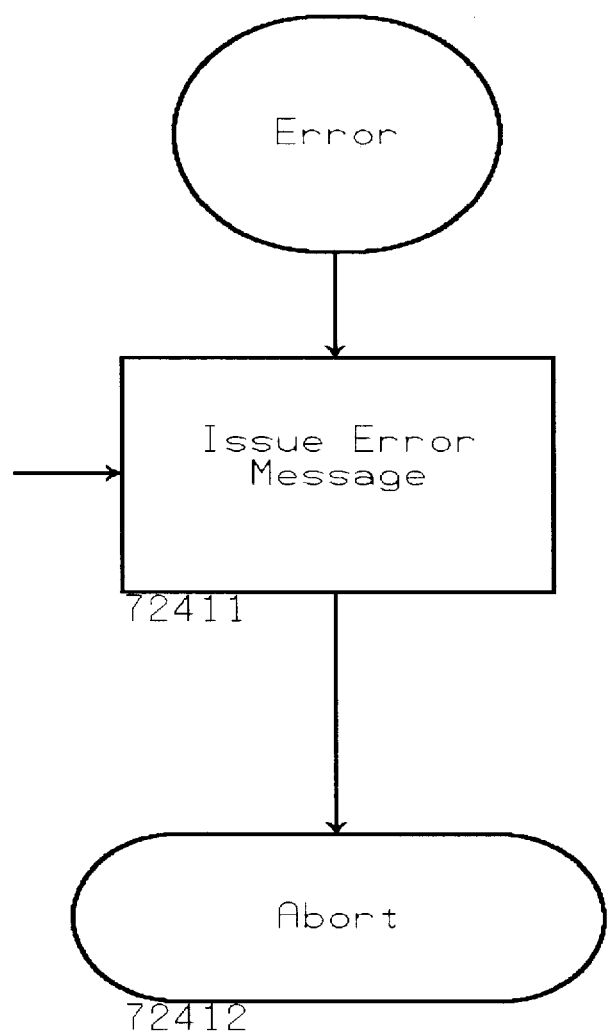
Figure 28D:
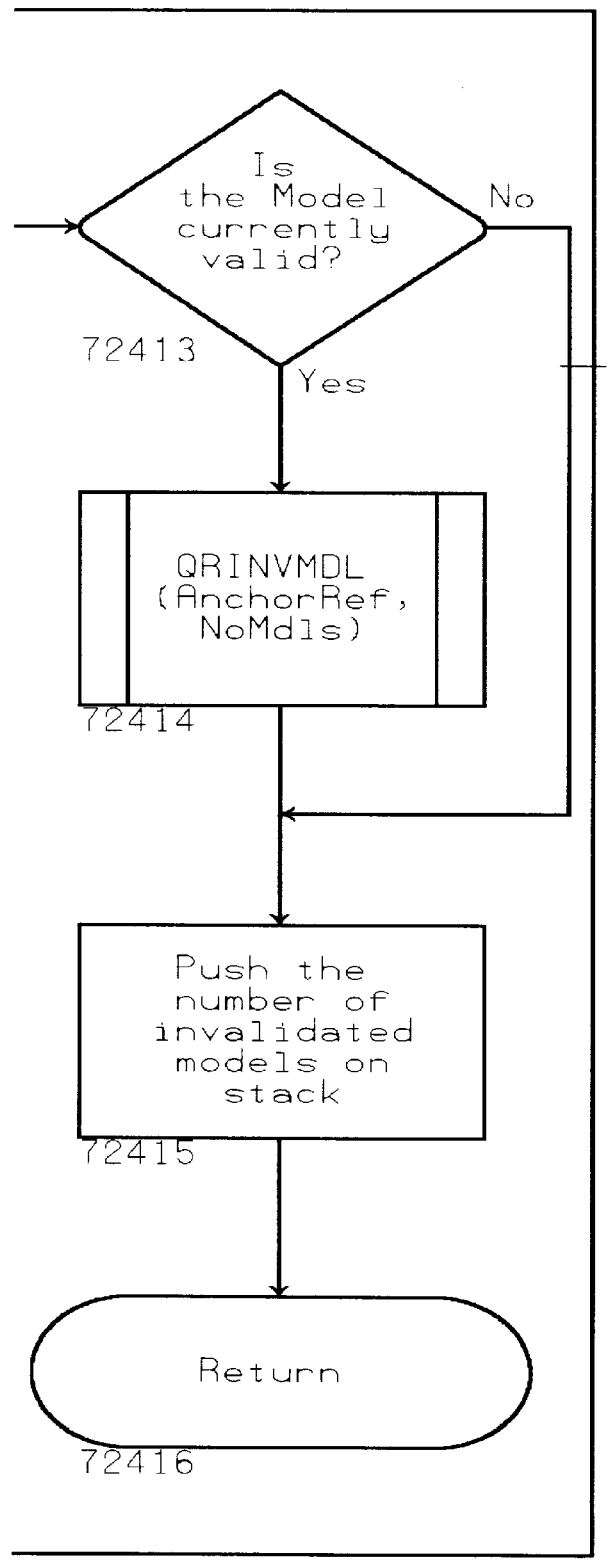

Regardless of the method of inputting Model data (Library Search, ASC List, or Data Entry), the program proceeds identically from this point on. In the case where the current Model is replacing an existing one, the following 3 steps are performed:

1. A query is made to the Control Repository to delete the old Model first using QRMDLDEL in FIG. 12.
2. The new Model is created using QRMDLADD in FIG. 11.
3. Depending on the number of components, either QRMFIADD, described in FIG. 25, or QRSUPMFI, described in FIG. 28, is used to add all the members.

Note: QRSUPMFI is a high performance method for adding multiple components with a single query.

In the case where a new Model is being created, and no Model with the same name exists, only Steps 2 and 3 are executed. Finally, if members are being added to an existing Model, only Step 3 is performed. In all three cases, Step 3 is a special high performance query which allows a theoretically infinite list of File Reference numbers to be passed to the Control Repository using a single invocation. The list consists of a File Reference/IOSA pair separated by a special delimiter. This arrangement permits large Models to be created in a timely manner without causing severe bottlenecks at the Control Repository.

In addition to interactive use, our Aggregation Manager allows all of the aforementioned Model Management Utilities to be executed from a command line or called by a third party tool. An Application Program Interface exists to allow every action that can be initiated interactively. Some additional parameters exist to enable the calling routine to instruct the Model Management algorithms on how to handle cases where user interaction may be required. For example, a parameter can be passed to instruct the program to automatically delete any old Model found during the creation of a new Model. The ability to be exercised by a third party tool makes the Aggregation Manager a powerful data management addition to tools such as hierarchical design systems.

When a Model is created, it begins with a Valid status. Cur Aggregation Manager incorporates algorithms which constantly track the status of all Models in the DMS through the use of tables in the Control Repository. The algorithms automatically invalidate a Model if any member is overlaid or deleted from the DMS. The Aggregation Manager automatically notifies the owner of the Model via electronic mail of the invalidation. The owner receives information containing the identity of the Invalid Model, the date and time of the invalidation, the reason and the user who caused it.

This following describes the processes that support the Aggregation Manager functions in Data Management Control Utilities. The processes are depicted in FIGS. 11 to 28. To support these processes the Aggregation Manager maintains the following tables in the Control Repository.

TABLE 1

MODEL - Model components

| Column | Description |
| --- | --- |
| REF | Reference number |
| ANCHOR_REF | File reference of anchor file of model |
| OWNER | Userid of owner of the model |
| INVALID | Y = model is invalid |
| INVALIDATOR | Userid causing invalidation |
| DATE | Date when invalid flag set |
| TIME | Time when invalid flag set |

TABLE 2

MODEL_FILES - Mapping of files to a model

| Column | Description |
| --- | --- |
| REF | Reference number |
| MODEL_REF | Pointer to model |
| FILE_REF | Pointer to file |
| IO_FLAG | I = Input file; O = Output file; S = Support file |
| INVALID | Y = file is invalid |
| INVALIDATOR | Userid causing invalidation |
| DATE | Date when invalid flag set |
| TIME | Time when invalid flag set |

Figure 11:
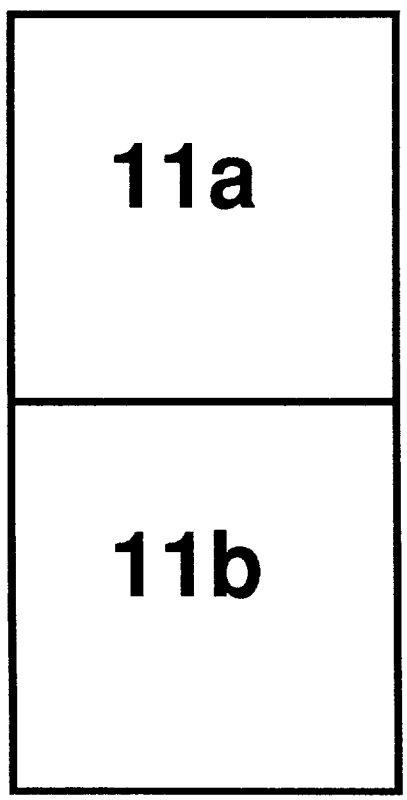
FIGS. 11 and 11a–11b describe the QRMDLADD Process.
Figure 11A:
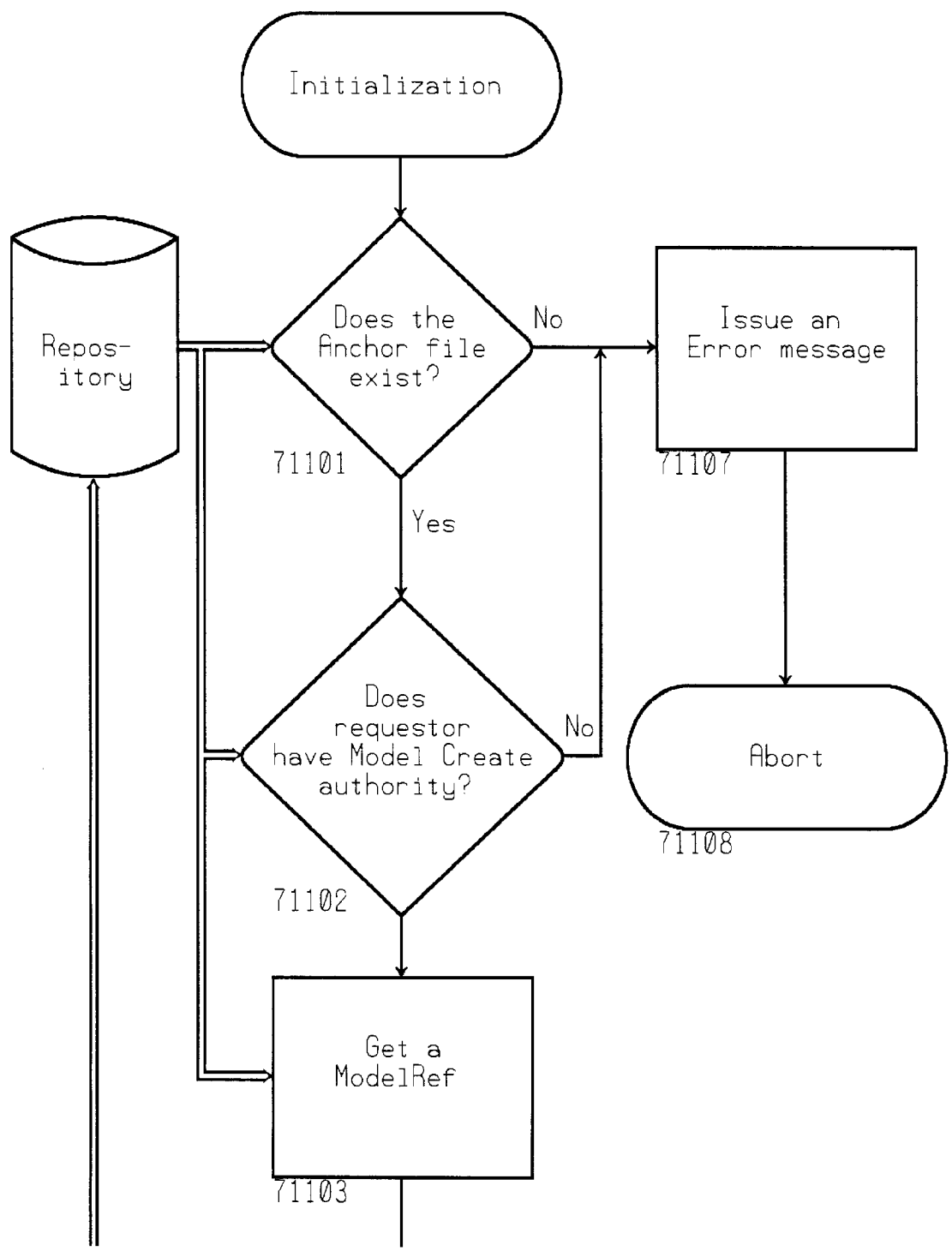
Figure 11B:
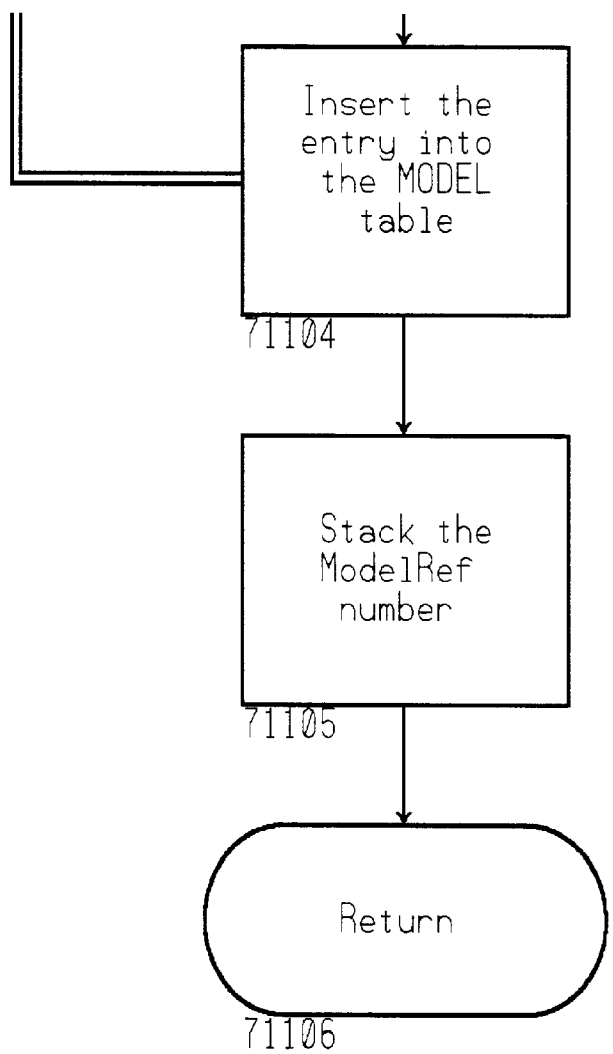

The QRMDLADD Process FIG. 11: This process is used to add a new Anchor file to the MODEL table in the Control Repository. After initialization, a query 71101 is made the Control Repository to determine if the anchor file exists in the FILES table. If not, an Error Message is issued 71107 and the process is aborted 71108. If it does exist, the Control Repository is checked 71102 to make sure that the requestor has MODEL CREATE authority. If not, an Error Message is issued 71107 and the process is aborted 71108. Next a new Model reference number is obtained 71103 from the Control Repository. The new Model is then entered 71104 into the MODEL table in the Control Repository. The Model Reference number is stacked 71105 for use by the requestor, and the process returns 71106 to the requestor.

Figure 12:
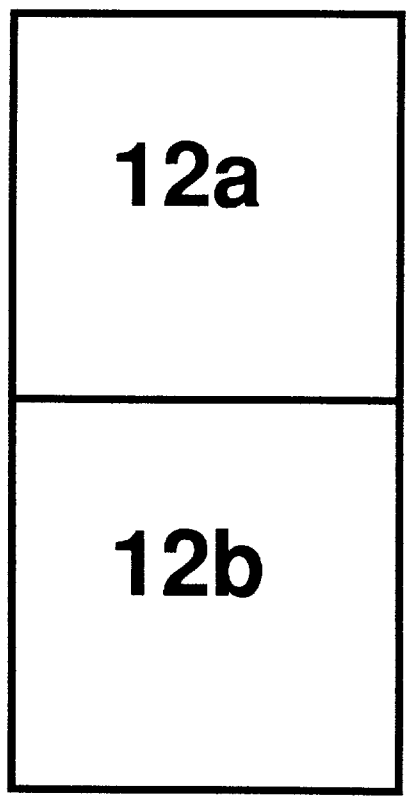
FIGS. 12 and 12a–12b describe the QRMDLDEL Process.
Figure 12A:
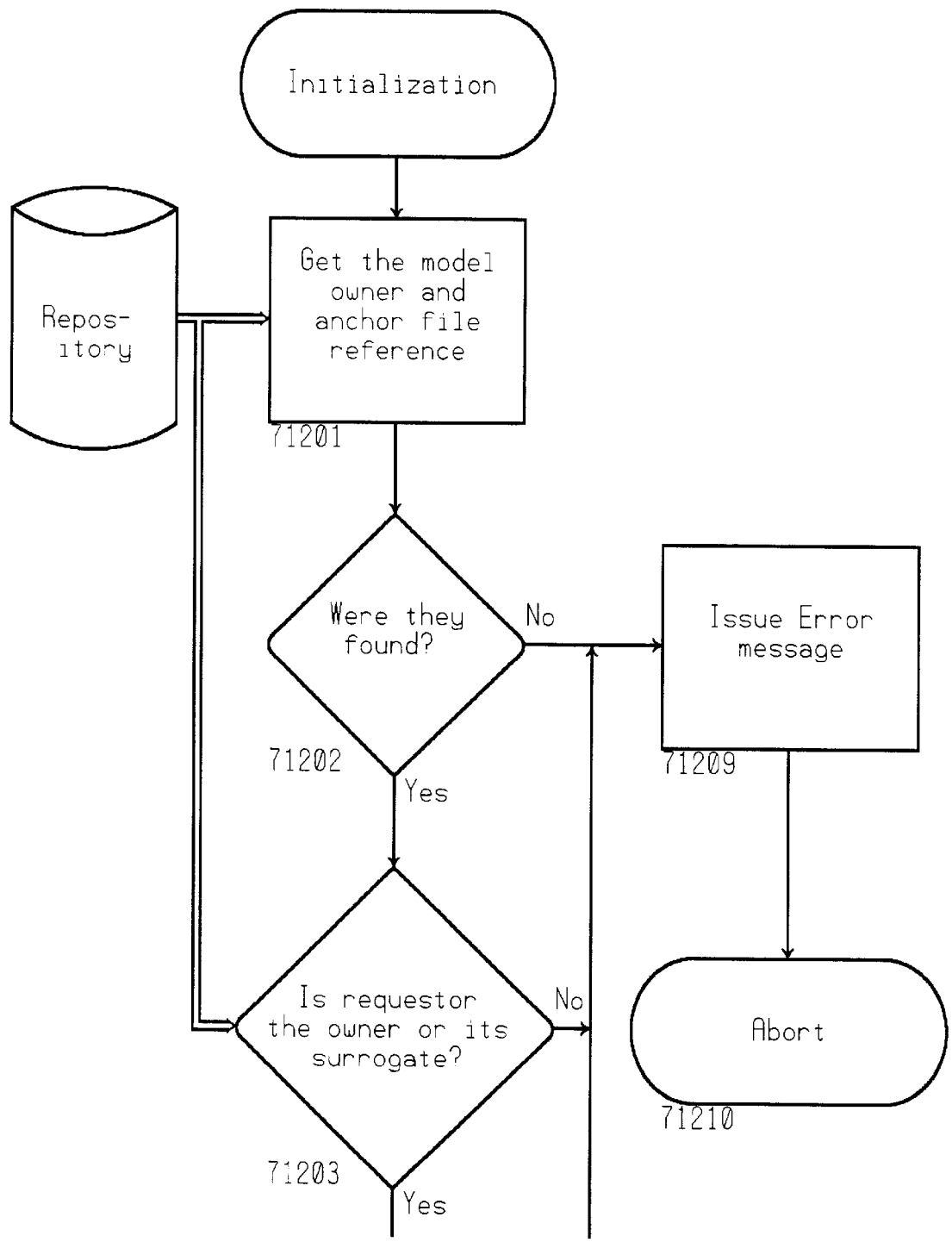
Figure 12B:
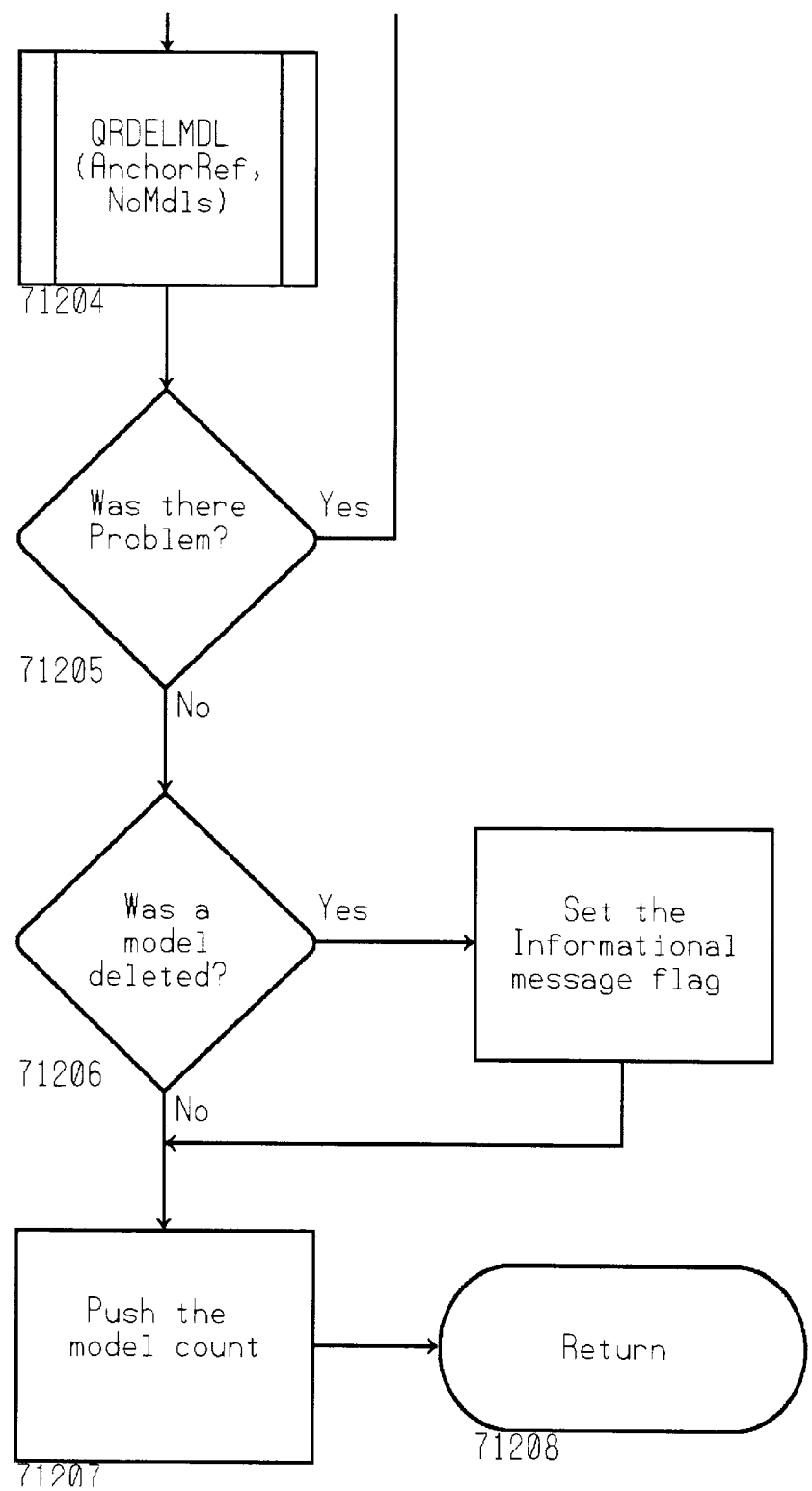

The QRMDLDEL Process FIG. 12: This process is delete an Anchor file from the MODEL table in the Control Repository. After initialization, a query 71201 is made to the Control Repository to get the Model owner and Anchor Reference. If they are not found 71202, an Error Message is issued 71209 and the process is aborted 71210. If they do exist, the Control Repository is checked 71203 to make sure that the requestor has MODEL DELETE authority.

Figure 13:
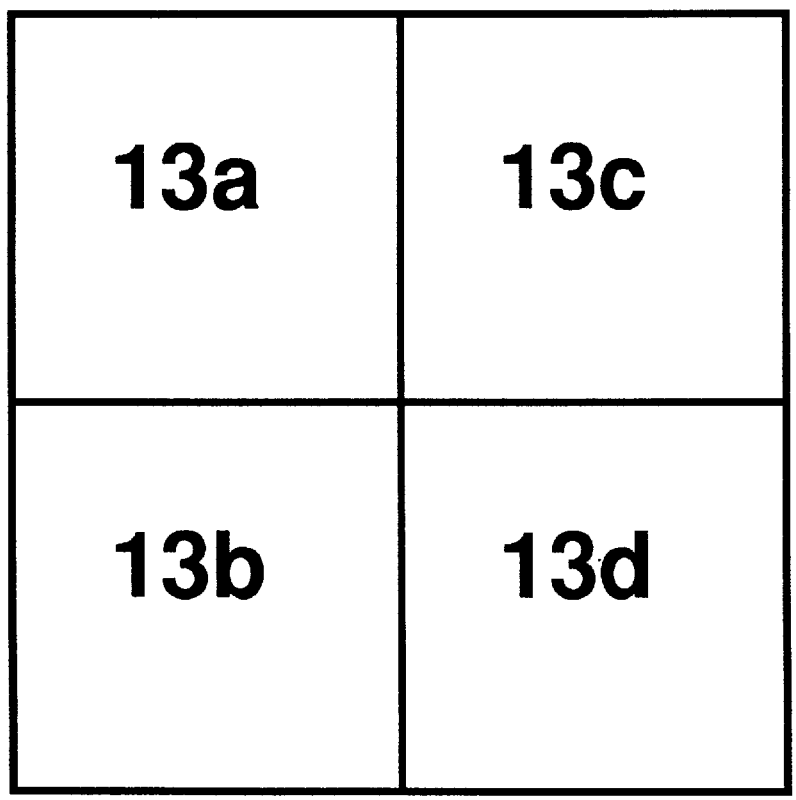
FIGS. 13 and 13a–13d describe the QRDELMDL Process.
Figure 13A:
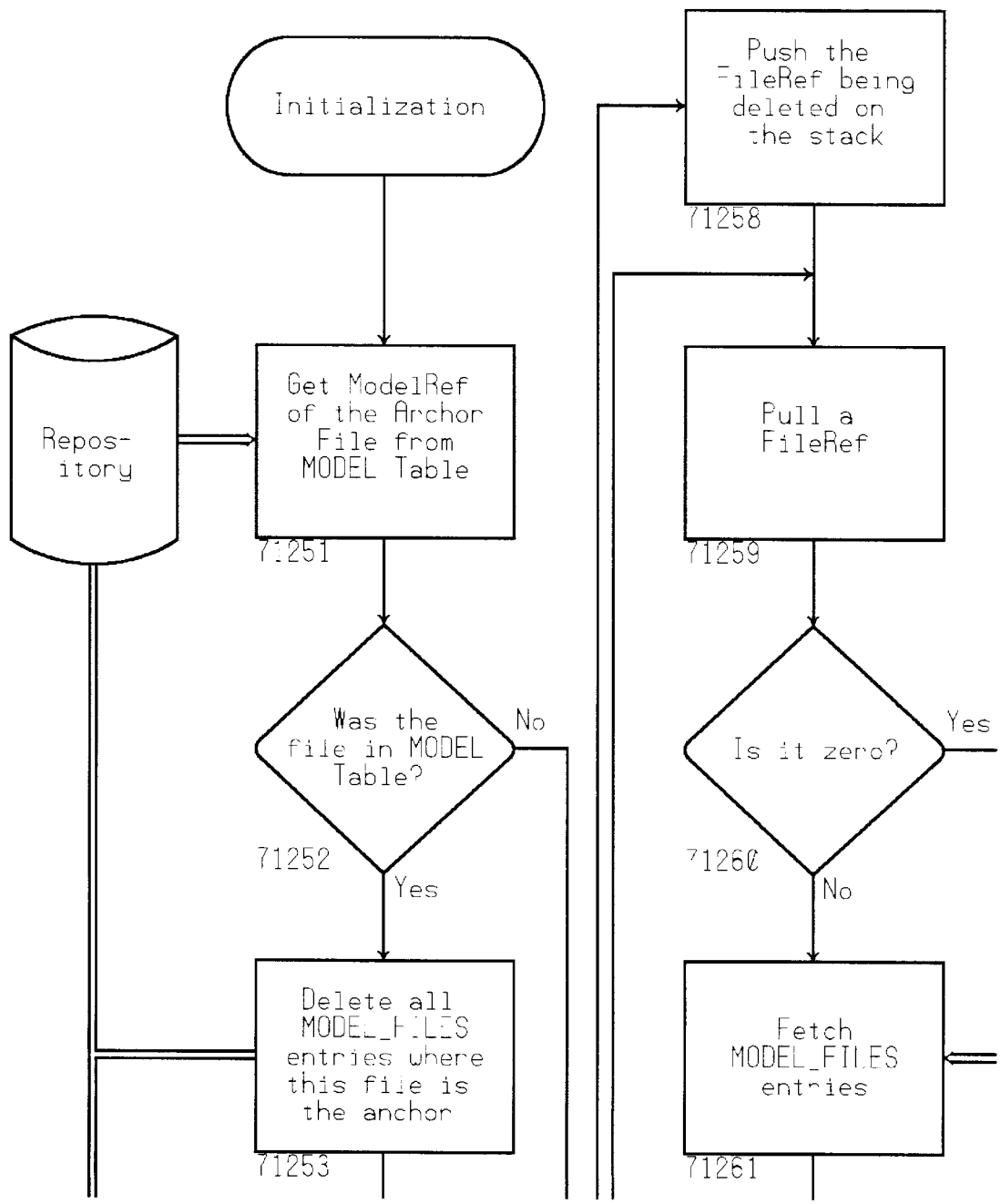
Figure 13B:
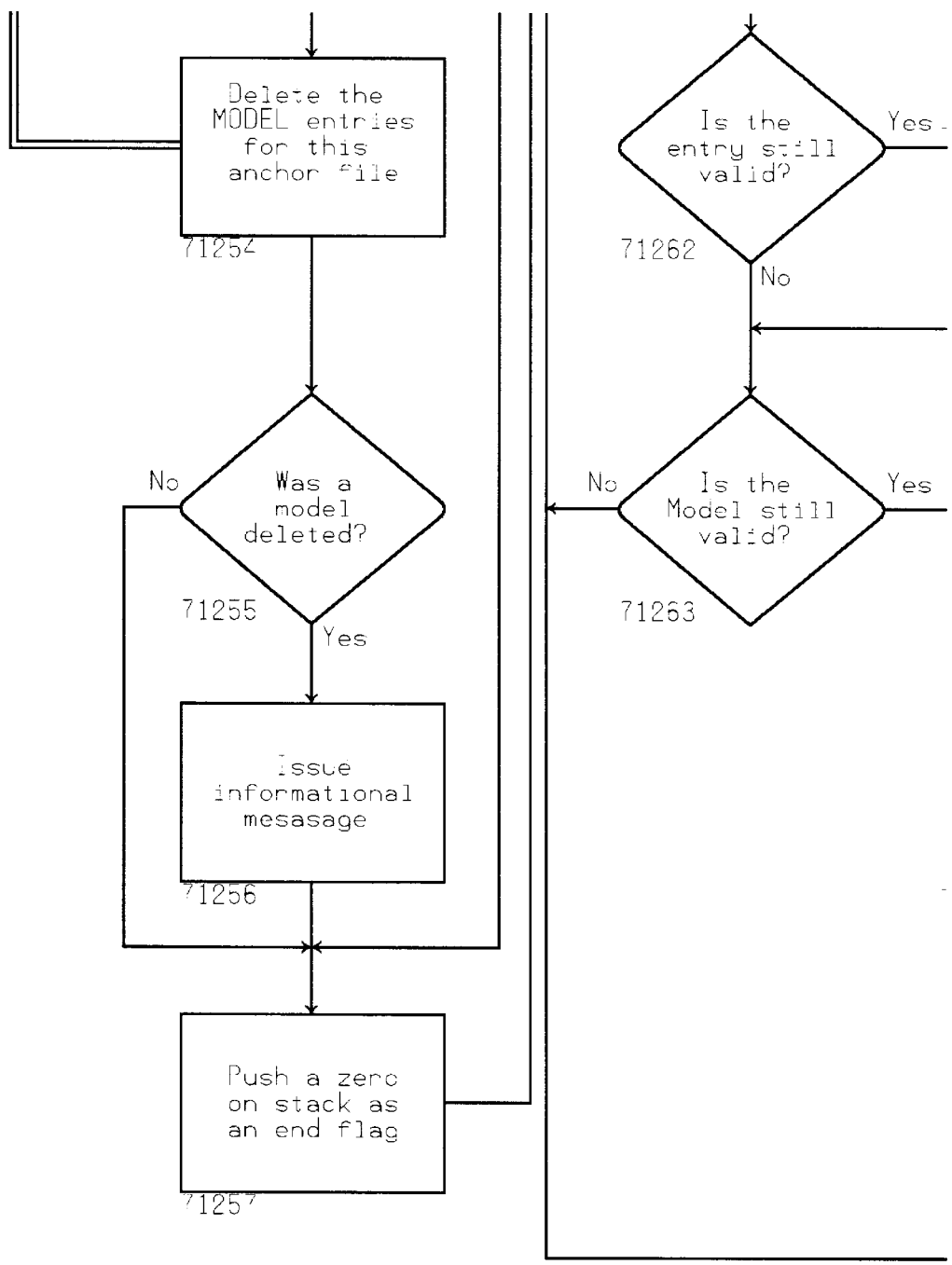
Figure 13C:
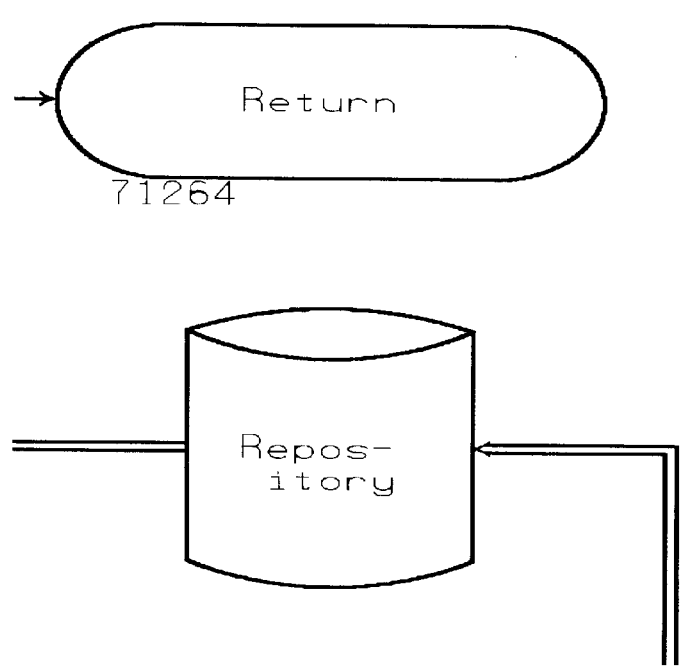
Figure 13D:
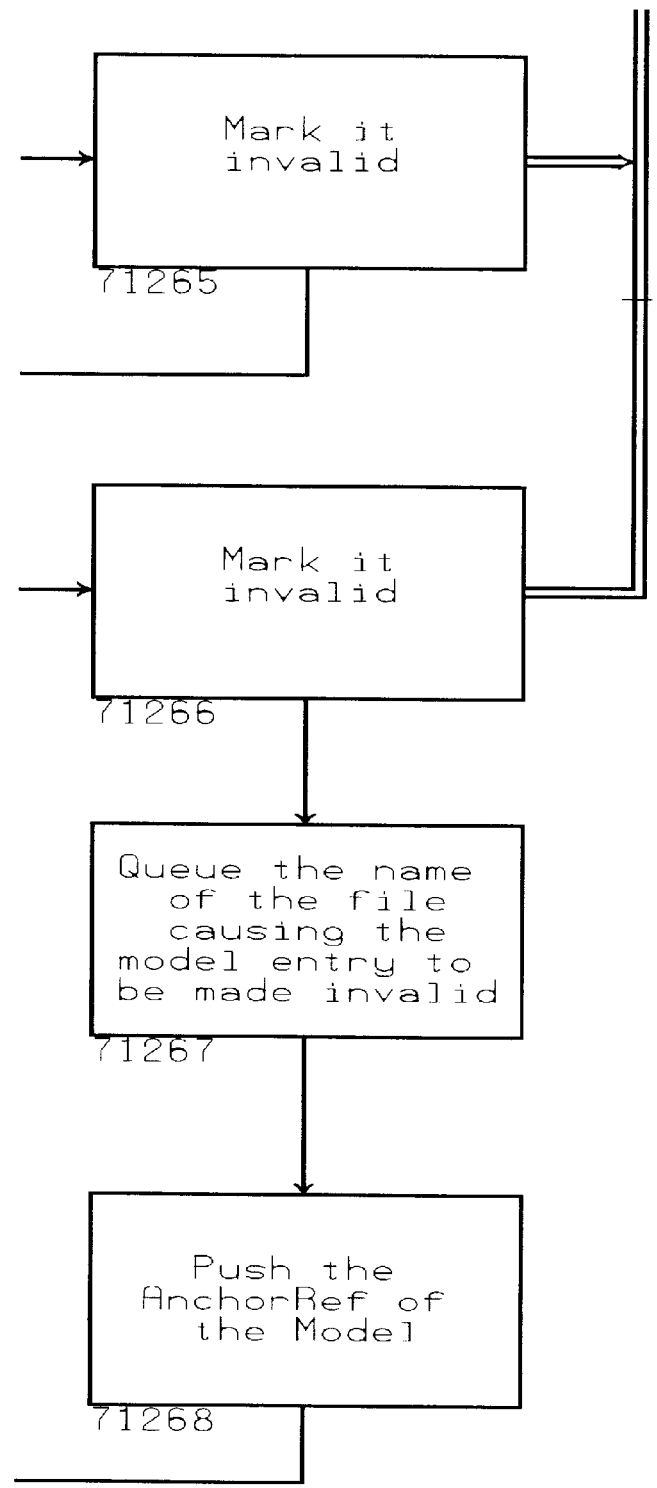

If not, an Error Message is issued 71209 and the process is aborted 71210. Next 71204, the QRDELMDL Process described in FIG. 13 is invoked. Upon return from that process, a check is made 71205 to determine whether it completed with out problem. If not, an Error Message is issued 71209 and the process is aborted 71210. If it completed, without problem, a check 71206 is made to determine if a model had been deleted by the QRDELMDL process. If so, a flag is set to issue an informational message. In any case, the count of the number of models deleted is put on the stack 71207 and the process returns to the requestor.

The QRDELMDL Process FIG. 13: This process receives the Anchor Reference of the model to be deleted. After initialization, a query 71251 is made the Control Repository to get the ModelRef for the Ancho.- file from the MODEL table. A check 71252 is made to determine if the file was in the MODEL table. If not, the process flows to 712257. If it does, all entries in the MODEL_FILES table that have the given ModelRef are deleted 71253. Next 71254, the MODEL table entry is deleted. A check 71255 is made to determine if the delete was successful. If not, an informational message is issued 71256. In any case, a zero is pushed 71257 on the stack as an end flag and then the AnchorRef just deleted is pushed 71258 on the stack.

The following steps will recursively examine all the nested model and model-files to set the invalid flags. First, pull 71259 a file ref from the stack. Check 71260 to see if it is the zero end marker. If so, return 71264 to the caller. If not Fetch 71261 MODEL_FILES entries from the Control Repository. If the entry is still valid 71262, mark 71265 it as invalid. Next, check 71263 if the Model is still valid. If not, the process flows back to 71259 to pull a new file ref. If the Model is still valid, mark 71266 it invalid, queue 71267 the name of the file causing the model entry to become invalid and push 71268 the AnchorRef of that Model on the stack.

Figure 14A:
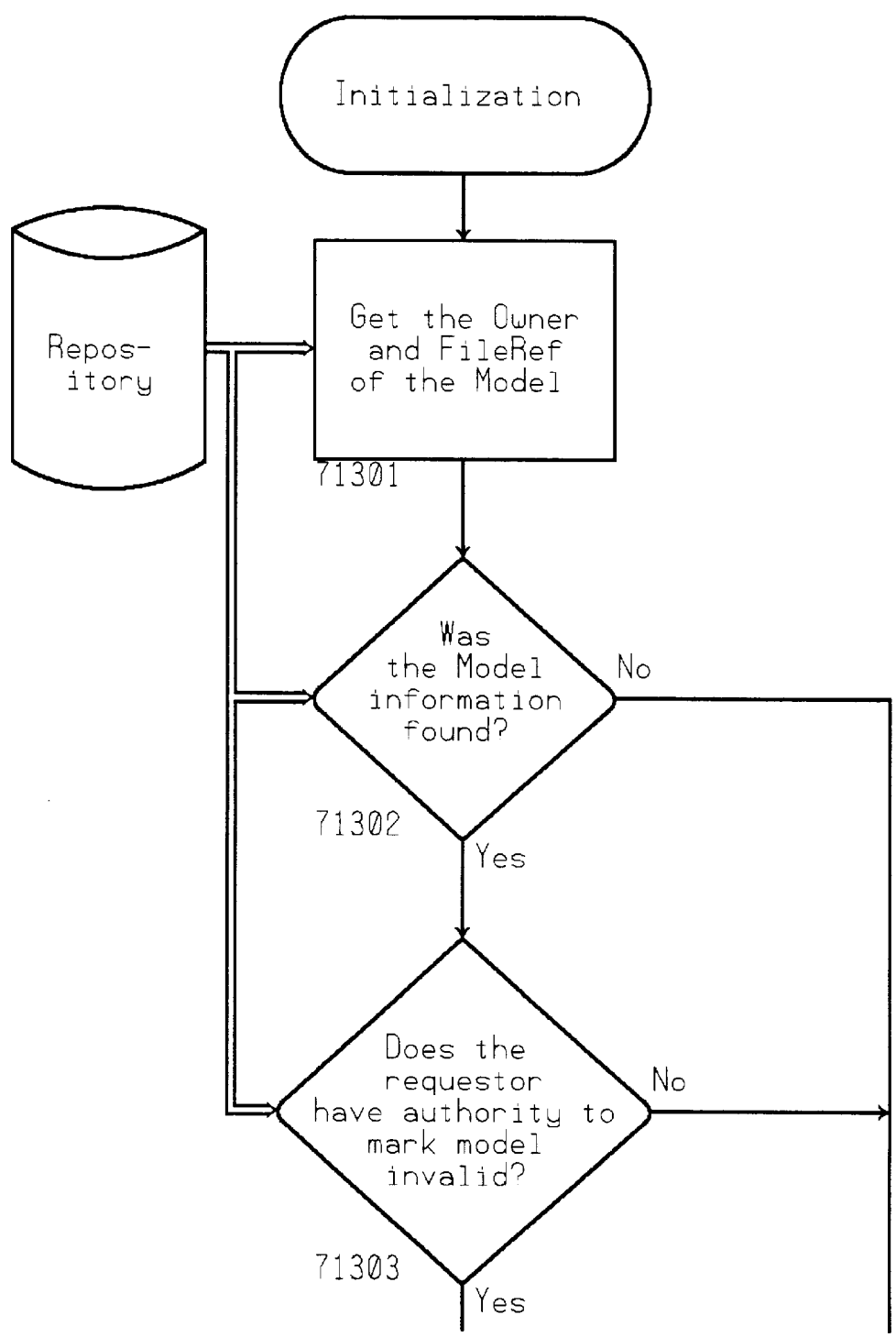
Figure 14B:
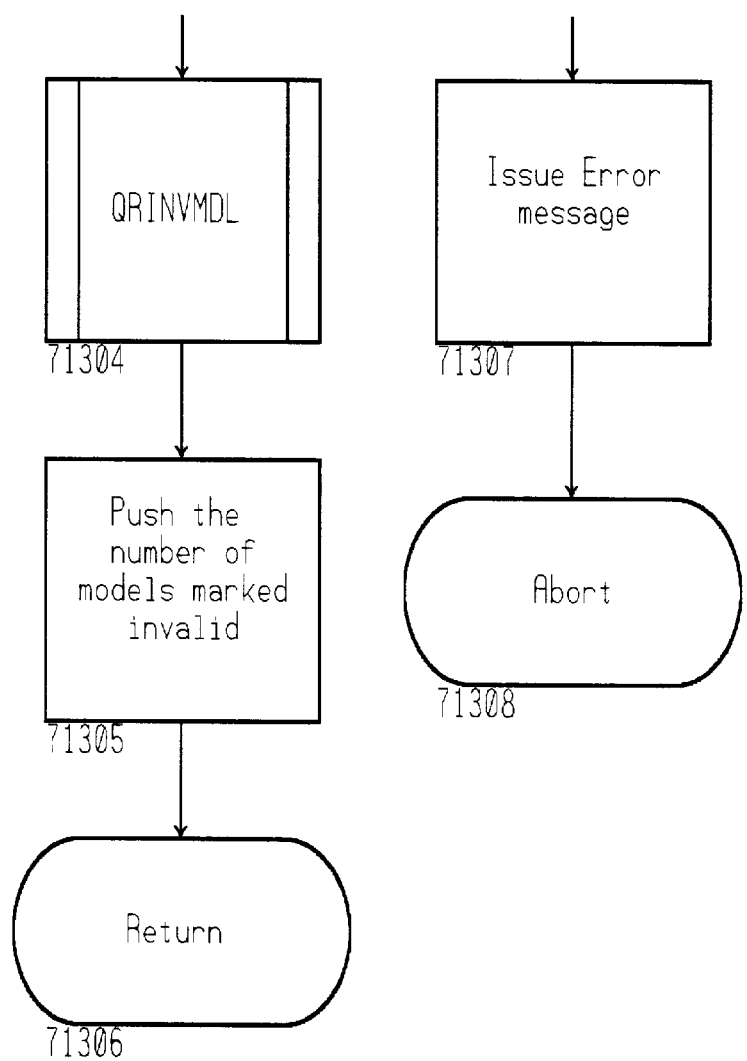
Figure 15:
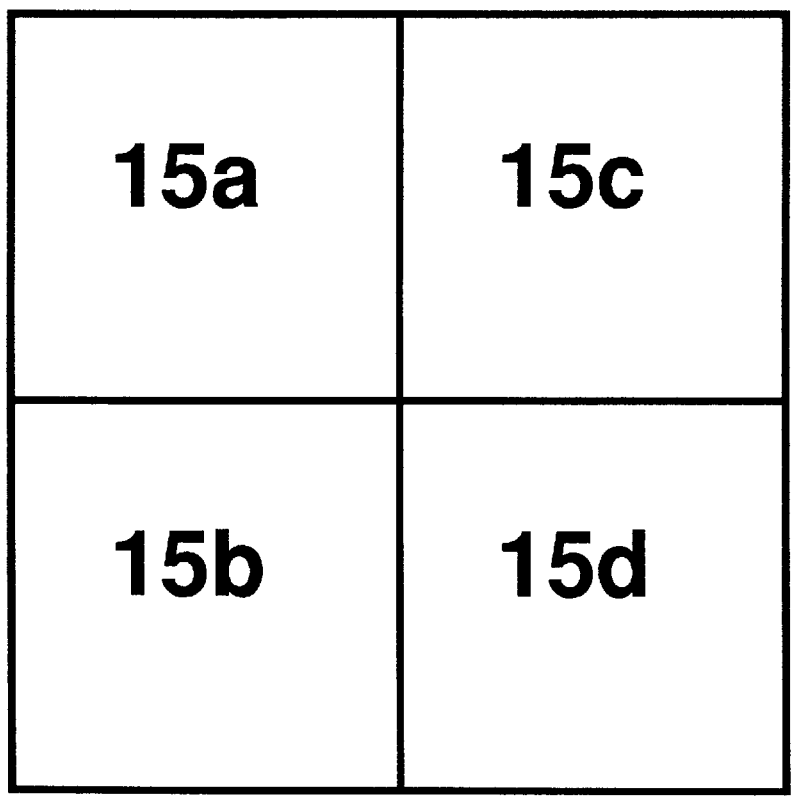
FIGS. 15 and 15a–15d describe the QRINVMDL Process.
Figure 15A:
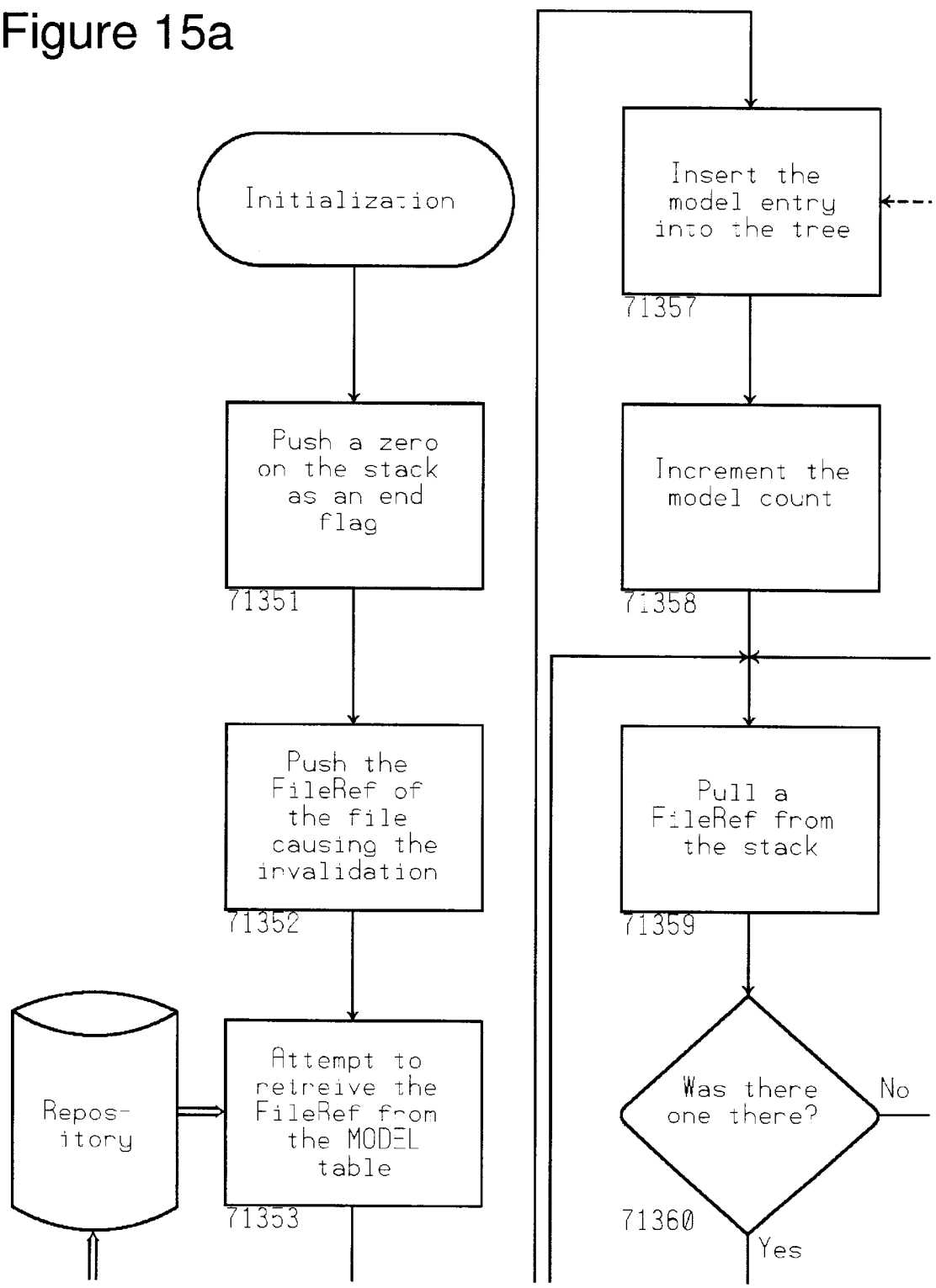
Figure 15B:
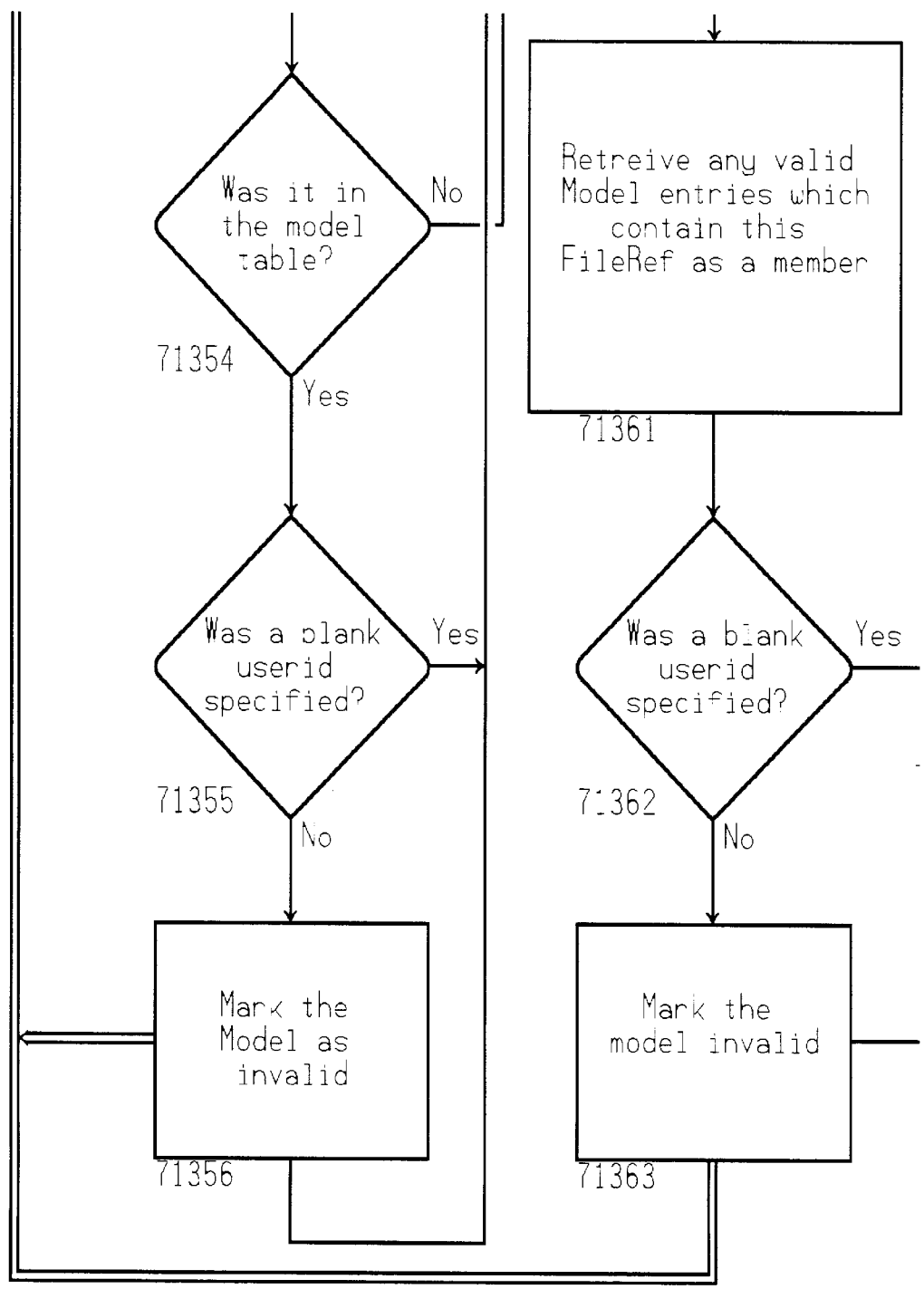
Figure 15C:
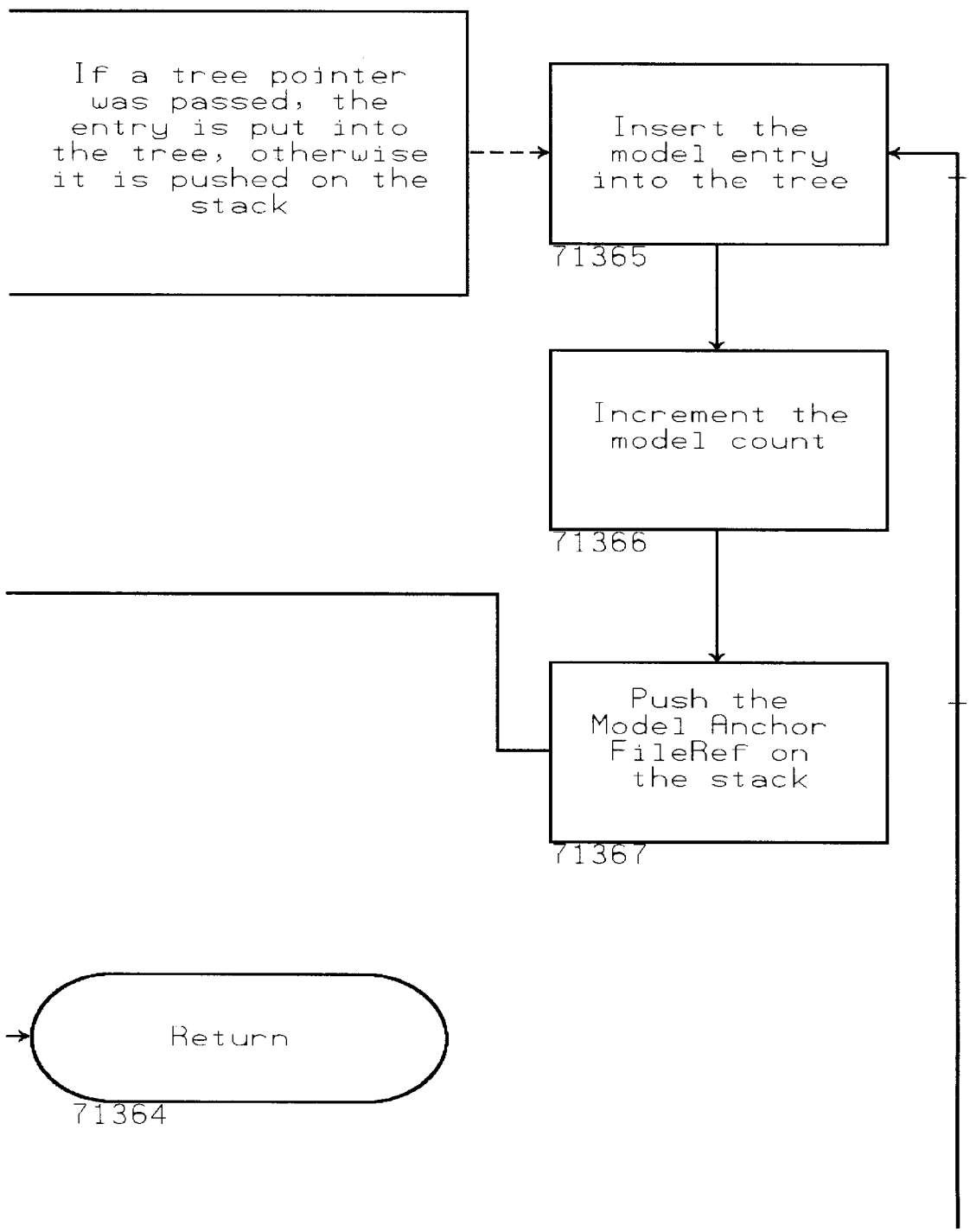
Figure 15D:
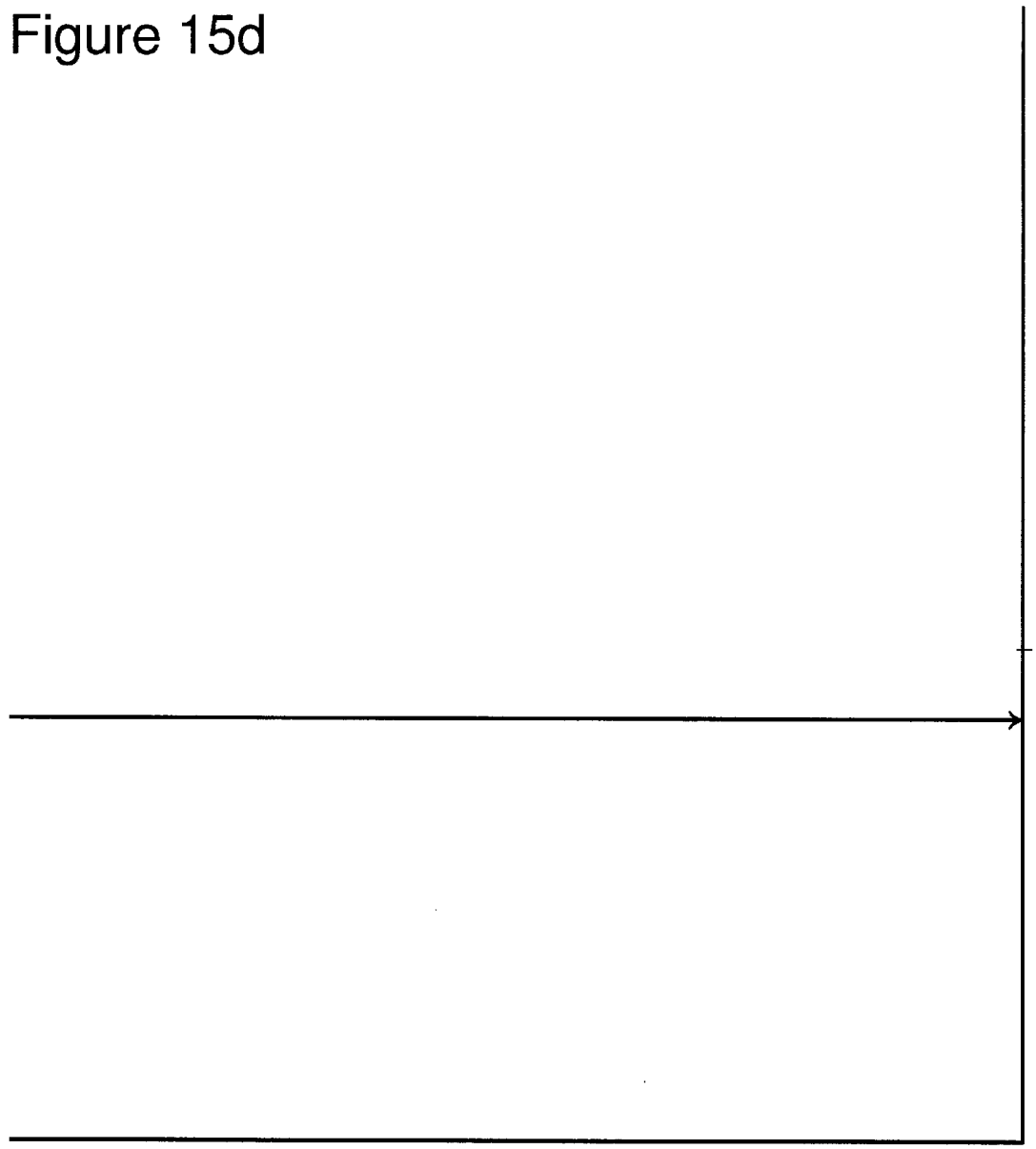

The QRMDLINV Process FIG. 14: The QRMDLINV process is used to mark a model as invalid in the Control Repository. After initialization, a query 71301 is made to the Control Repository to get the Model owner and Anchor Reference. If they are not found 71302, an Error Message is issued 71307 and the process is aborted 71308. If they are found, the Control Repository is checked 71303 to make sure that the requester has MODEL INVALIDATION authority. If not, an Error Message is issued 71307 and the process is aborted 71308. If the requestor has the authority, the QRINVMDL Process described in FIG. 15 is invoked 71304. Upon return from that process, the number of models marked invalid is pushed 71305 on the stack and the process returns 71306 to the requestor.

The QRINVMDL Process FIG. 15: This process receives the file ref of the file as well as the USERID requesting or causing the invalidation. The USERID may be specified as a blank in which case no invalidations will be made but the Model and its nested models will be traversed. In addition, a pointer to a radix partition tree may be passed. If so, visited entries will be inserted into the tree. If not, the entries will be pushed on the stack.

After initialization, a zero is pushed 71351 on the stack as an end flag. Next 71352, the file ref is pushed onto the stack. Then, a query 71353 is made to the Control Repository to retrieve entry from the MODEL table for this file ref. If it was not found 71354, the process flows to 71359. Otherwise, a check 71355 for a blank USERID is made. If it is blank, the process flows to 71357. If not, the model entry in marked 71356 invalid in the Control Repository. Next, the model entry is either pushed on the stack or inserted into the tree 71357 and the model count is incremented 71358.

The following steps will recursively examine all the nested models. First, a file ref is pulled 71359 from the stack. If there was none there 71360, the process returns 71364 to the requester. Otherwise, all model entries which contain this file ref are retrieved 71361. Next, a check 71362 for a blank USERID is made. If it is blank, the process flows to 71365. If not, the model entry in marked 71363 invalid in the Control Repository and the model entry is either pushed on the stack or inserted into the tree 71365, the model count is incremented 71366 and the AnchorRef of the Model is pushed 71367 is pushed on the stack. The process then flows to 71359.

Figure 16:
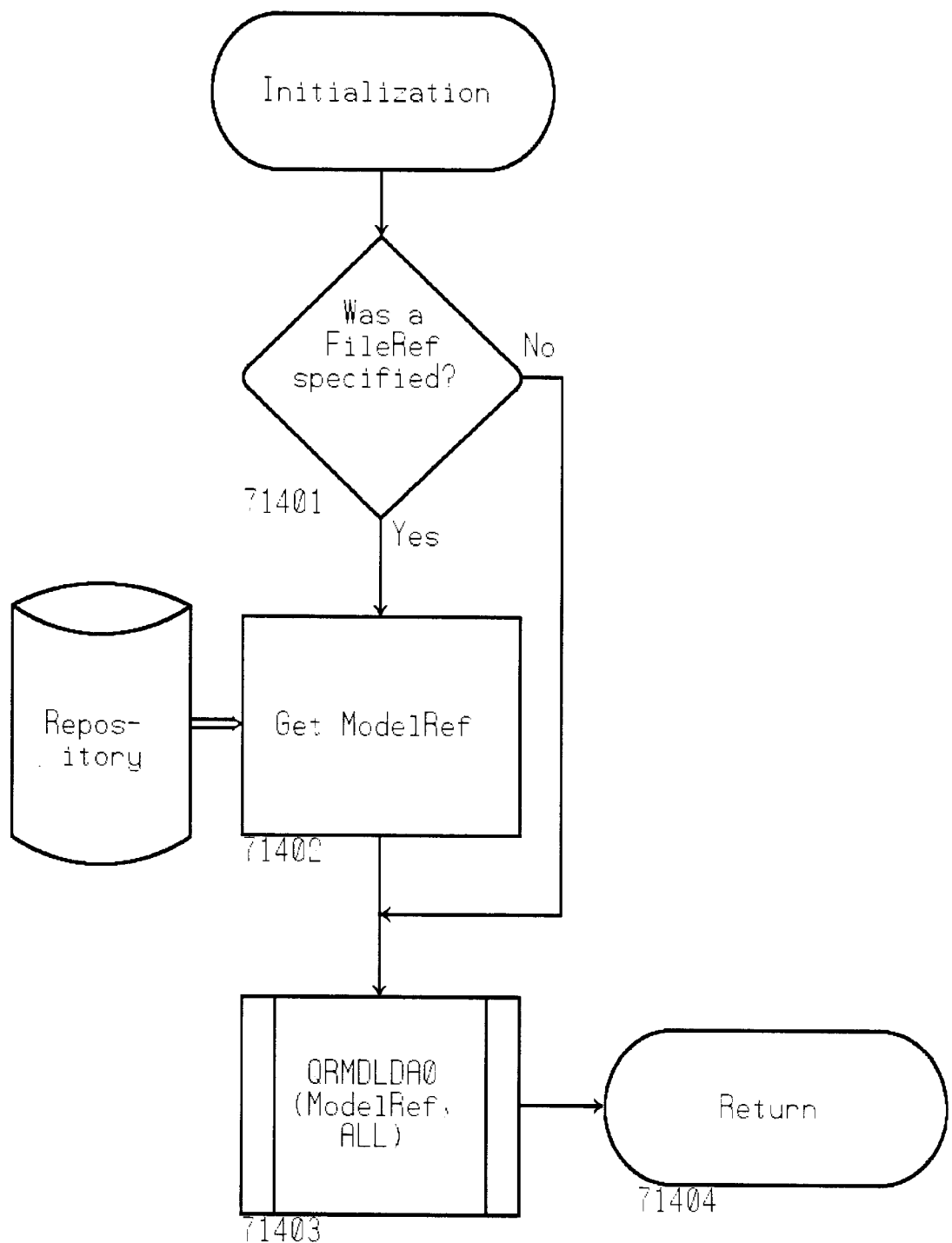
FIG. 16 describes the QRMDLLST Process.
Figure 17A:
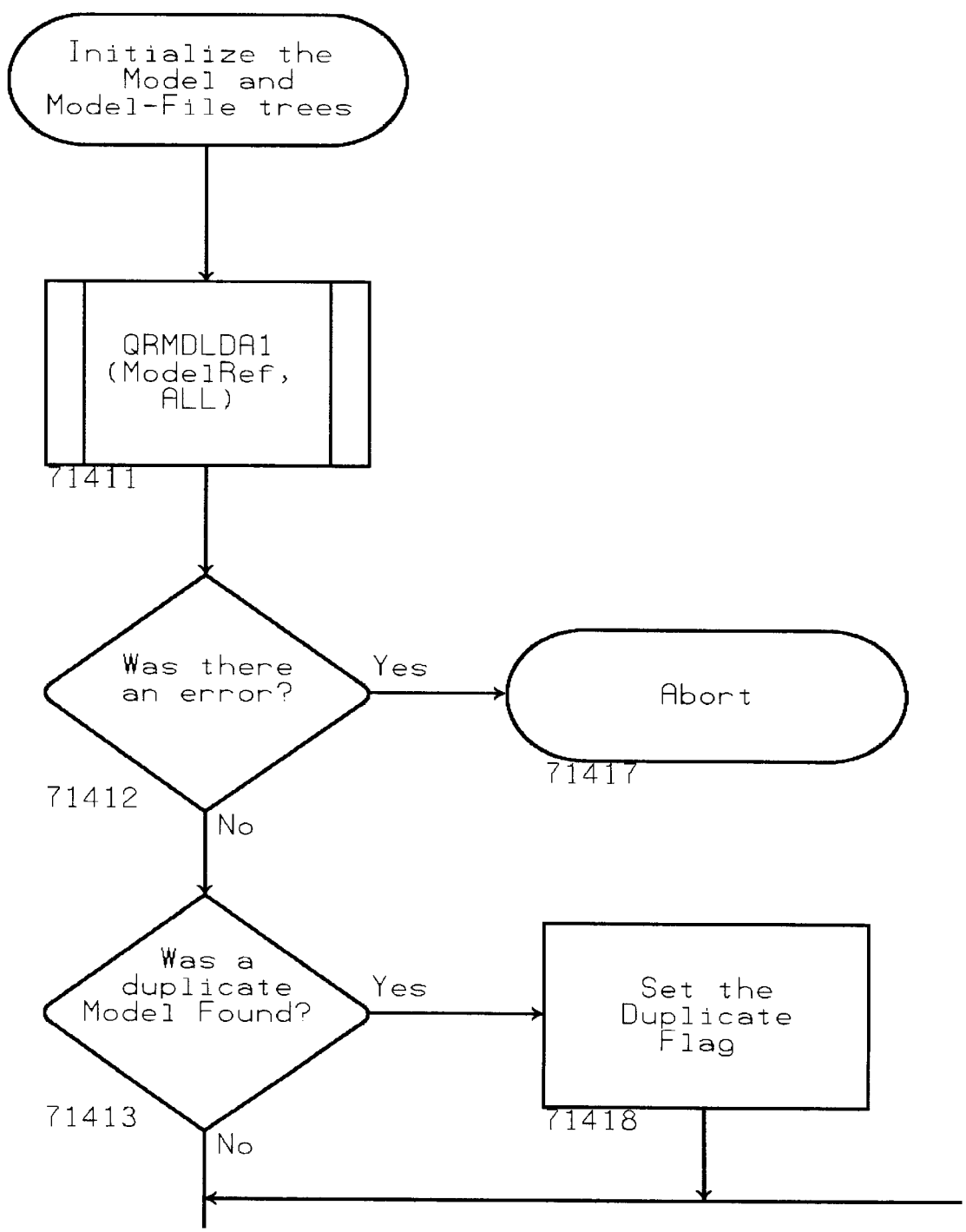
Figure 17B:
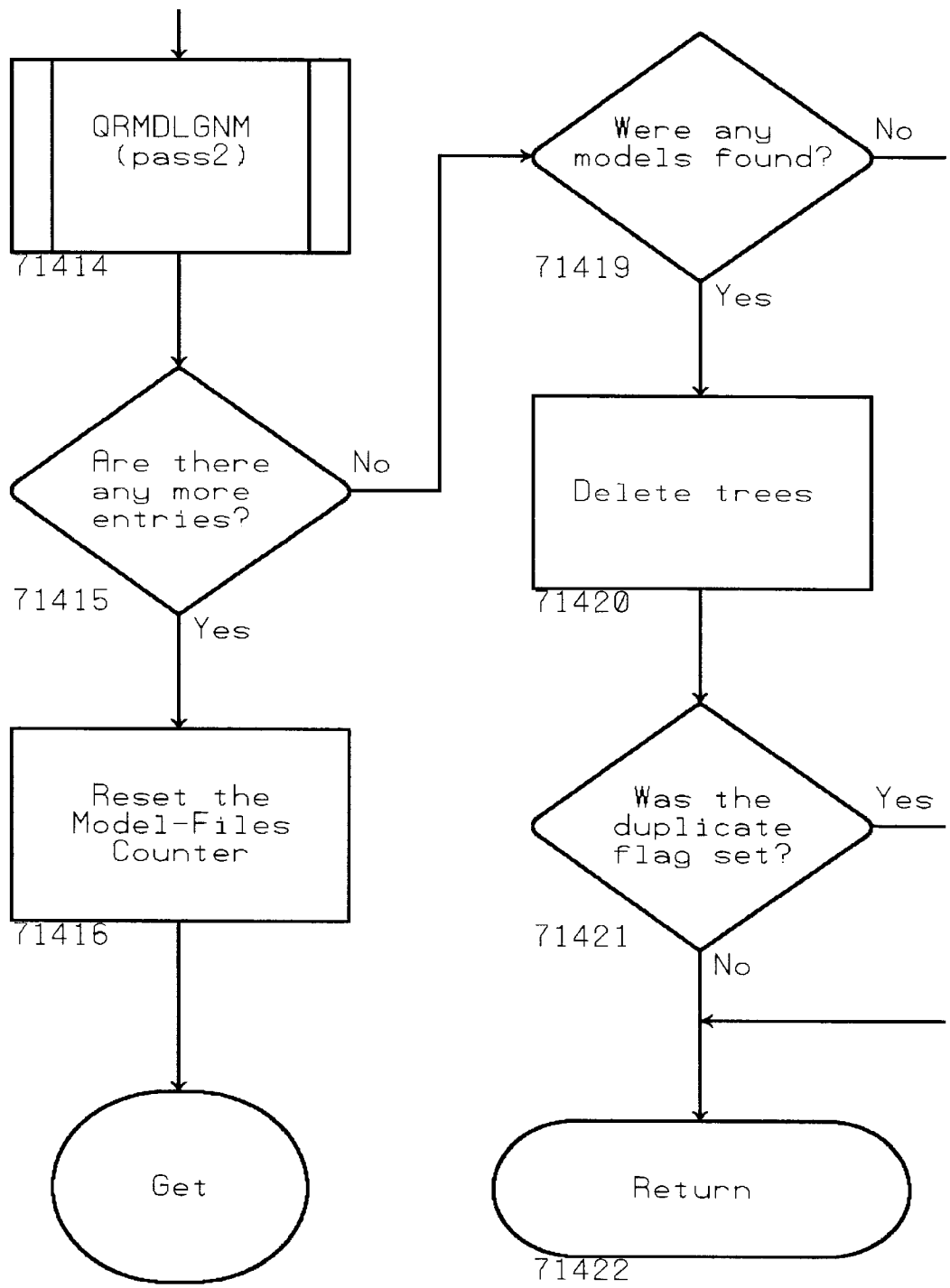
Figure 17C:
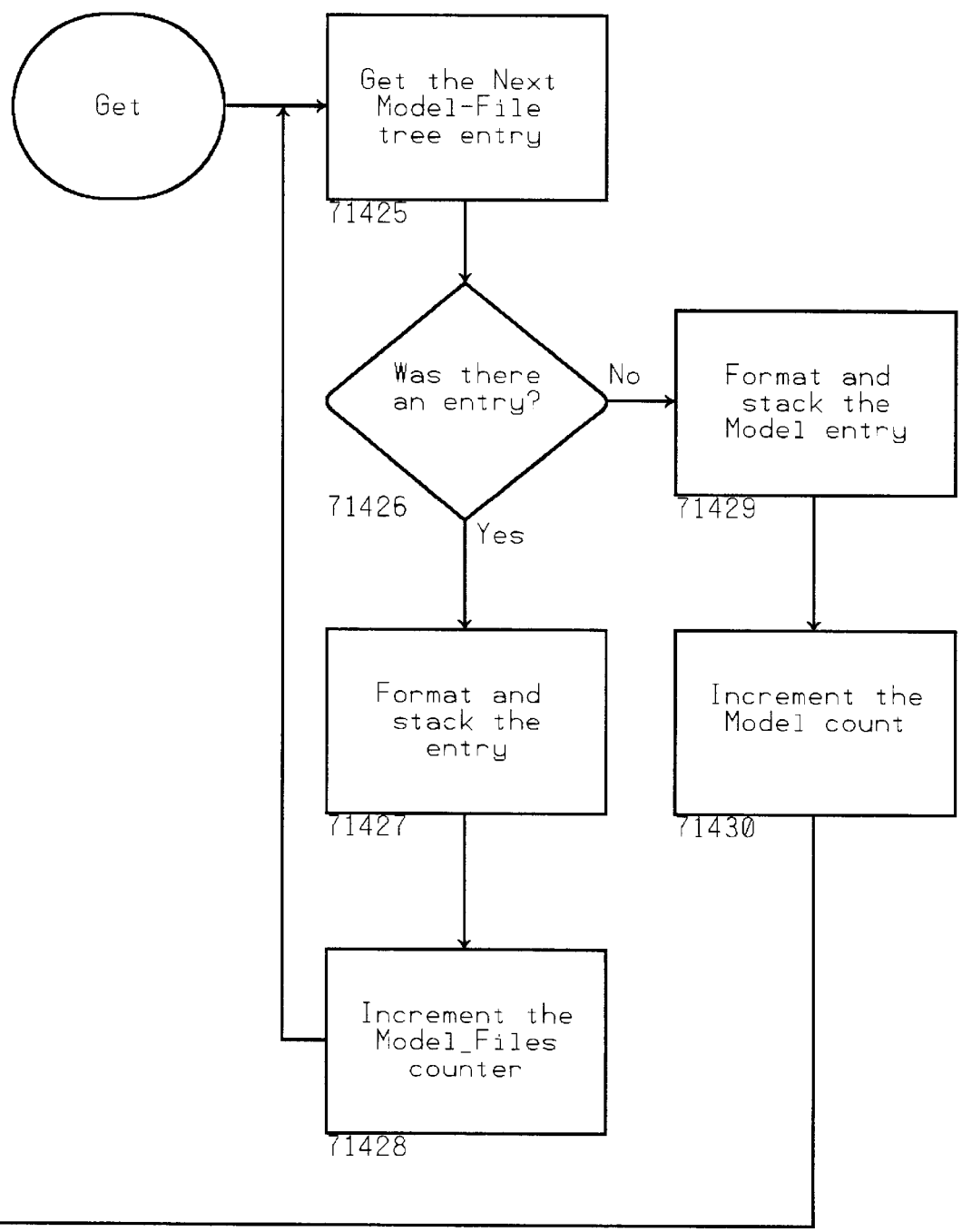
Figure 17D:

The QRMDLLST Process FIG. 16: The QRMDLLST process is used to get a list of all the component files of a specified model. The model may be specified as either a ModelRef or a file ref.

After initialization, a check 71401 is made to determine is a file ref was specified. If so, the ModelRef is retrieved 71402 from the Control Repository. Next 71403, the QRMDLDAO Process described in FIG. 17 is invoked. Upon return from that process, this process will return 71404 to the requestor.

The QRMDLDA0 Process FIG. 17: Initialization includes setting up the Model and Model-File radix partitioned trees. To handle the recursion caused by nested models, this process uses Luther Woodrum's Radix Partitioned Tree Services. Two trees are used. the "model" tree will contain one entry for each model file encountered. a priority key related to the model nesting level is associated with each "model" tree entry. The "model_file" tree will contain one entry for each model_file encountered that is not itself in the model table. These model_file entries are stored using the model_ref of the containing model as the key. Retrieval of "model" entries occurs in two passes. in the first pass which is used to build the trees, we wish to retrieve entries from the smallest nesting level to the largest. In the second pass, which is used to retrieve "model_file" entries, we wish to retrieve entries. from the largest nesting level to the smallest. to accomplish this a pass1 and a pass2 priority key offset was defined ('7FFFFFFF'x, and '3FFFFFFF'x respectively.) On initial insertion the priority key is created by subtracting the nesting level from the pass 1 offset. after the "model" entry is used in the first pass it priority key is changed to be its nesting level. After the entry is used in the second pass, the priority key is changed to zero. in this way, the appropriate entry on any pass can be obtained. On the first pass, only priority keys between the pass1 offset and the pass2 offset will be considered. on the second pass, only priority keys above zero will be considered.

```
pass1off ==> '7fffffff'x
    nesting level 1
    nesting level 2
    nesting level . . .
    nesting level n
    . . .
pass2off ==> '3fffffff'x
    nesting level n
    nesting level . . .
    nesting level 2
    nesting level 1
    . . .
zero    ==> '00000000'x
```

Figure 19:
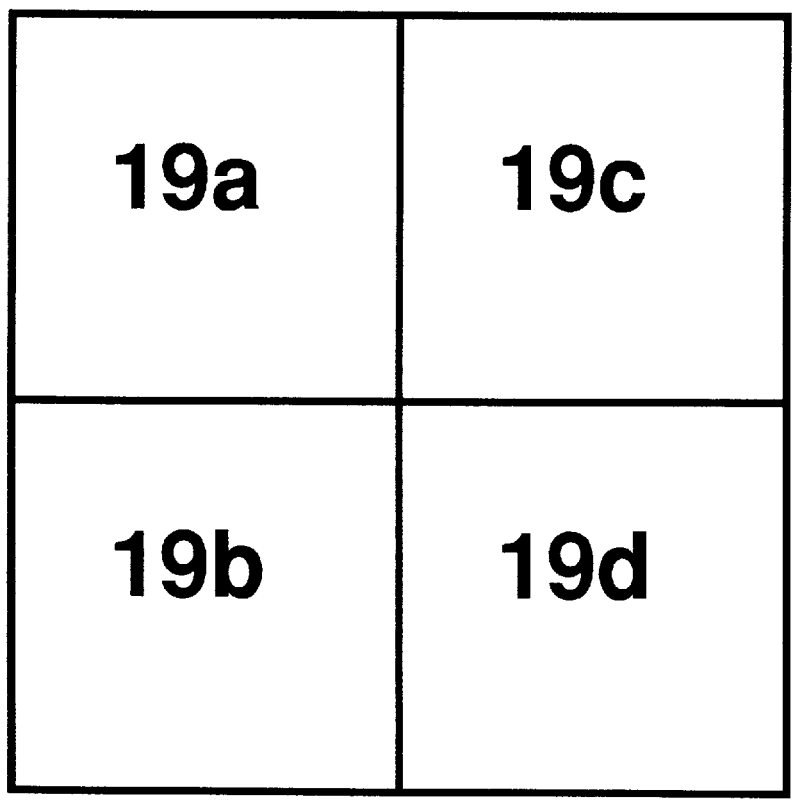
Figure 19A:
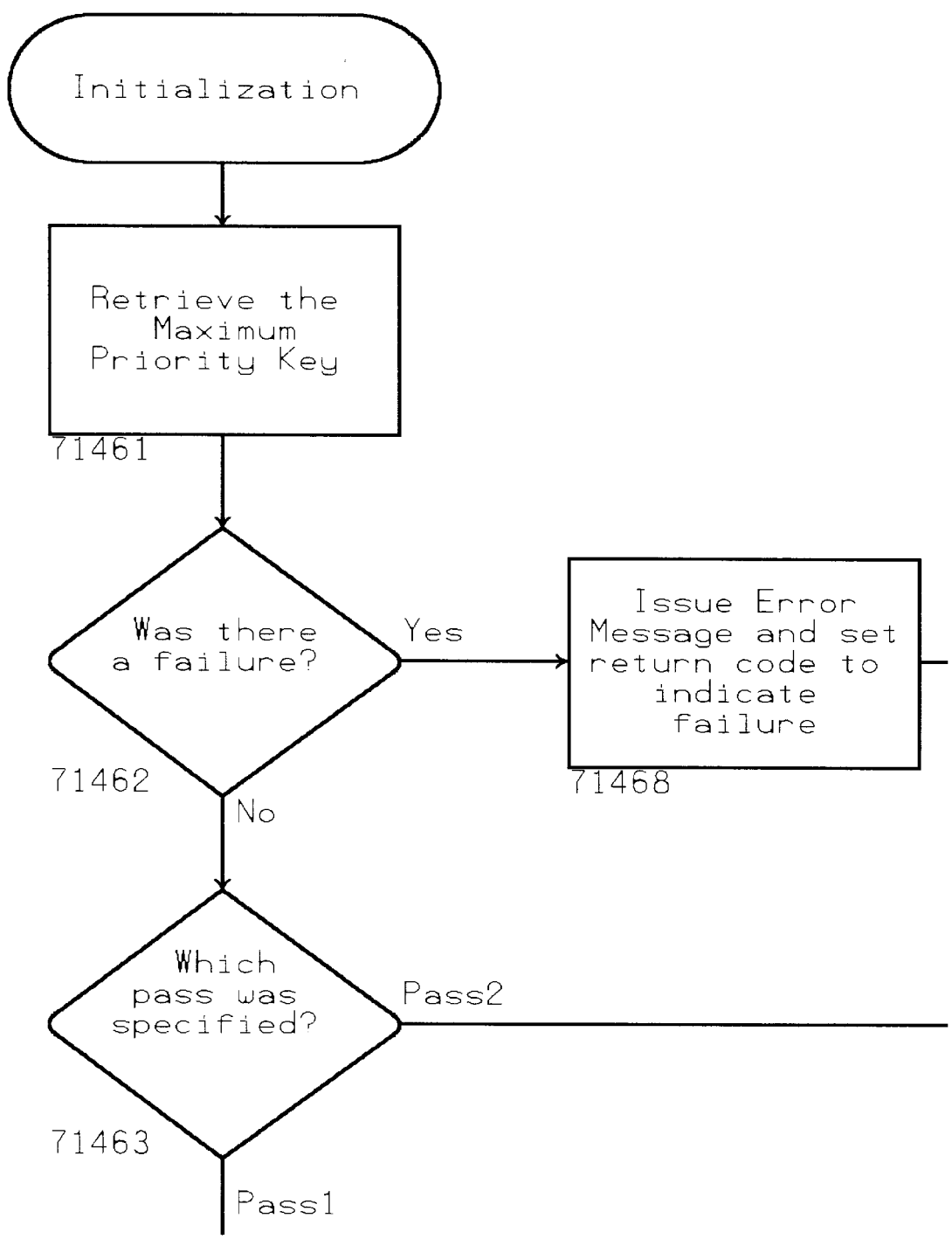
Figure 19B:
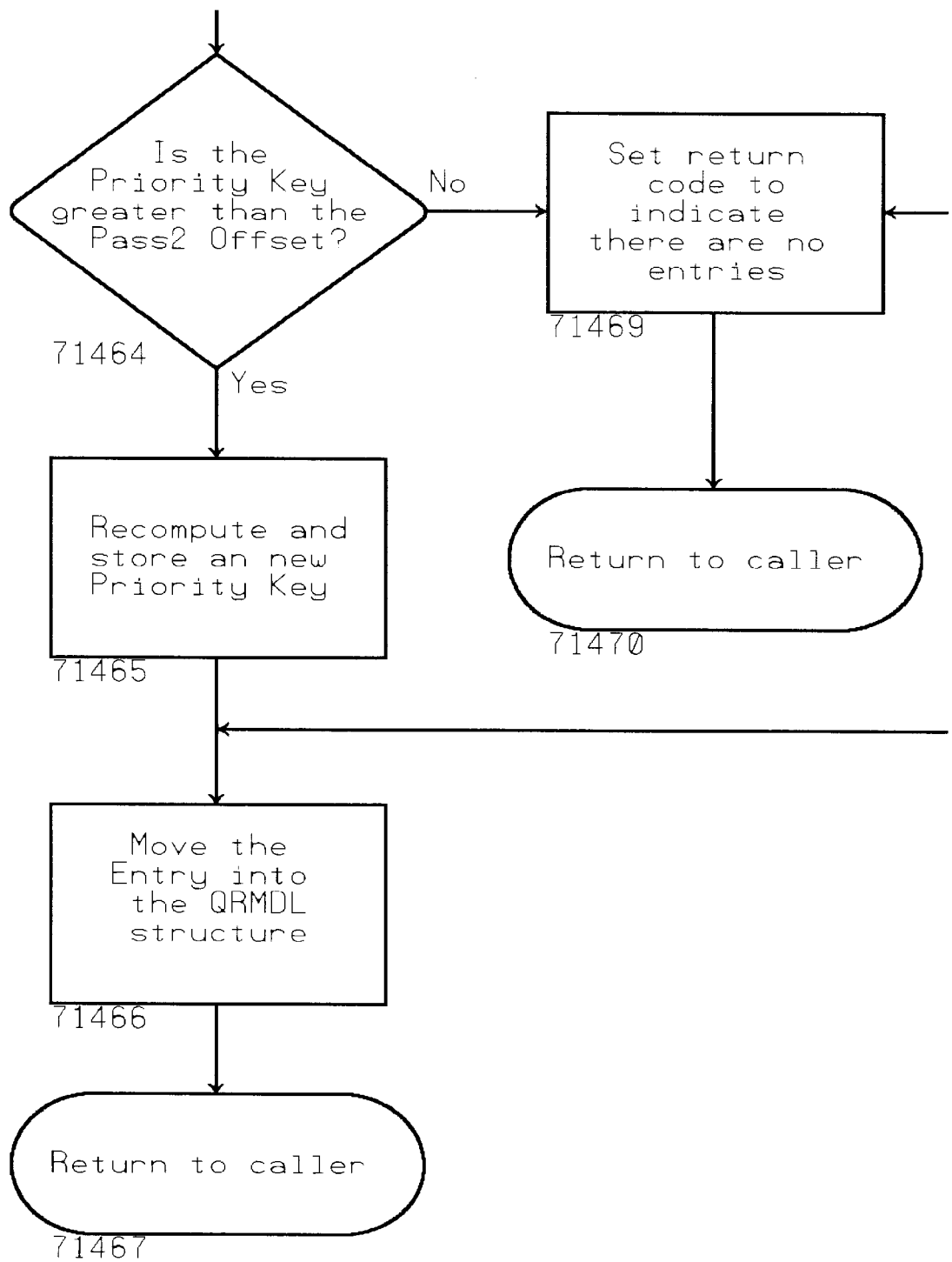
Figure 19D:
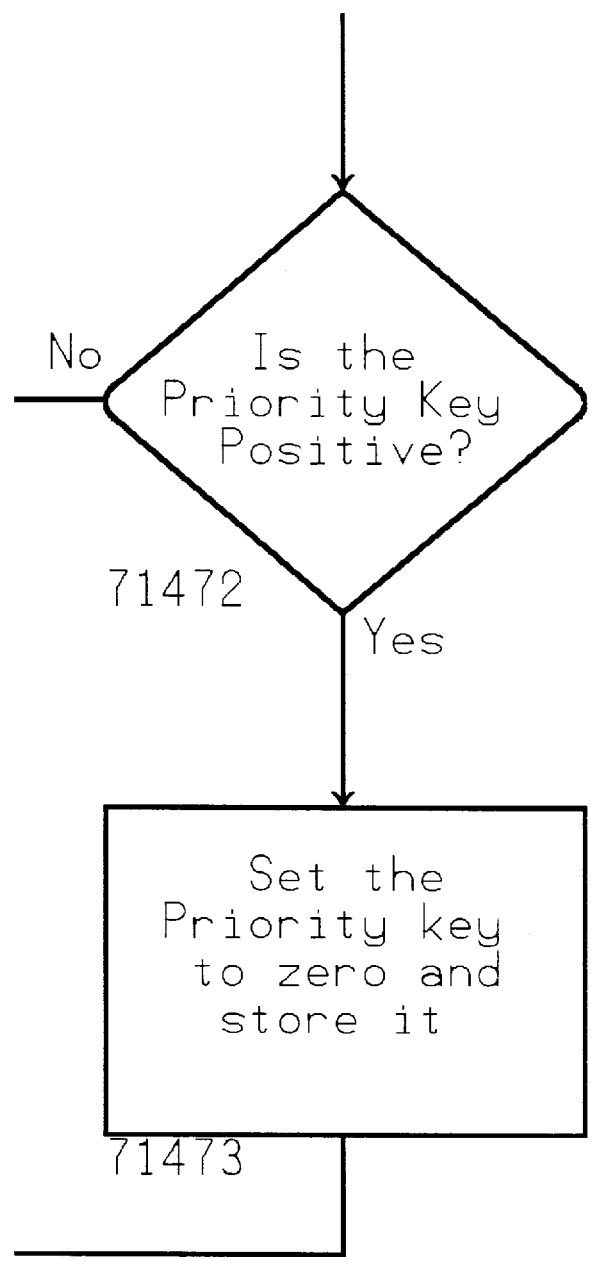

After initialization the QRMDLDA1 Process described in FIG. 71140 is invoked 71411. Upon return from this process a check 71412 is made to determine if there were any errors. If so, the process is aborted 71417. If not, a check 71413 is made to determine if a duplicate model was found. If so, the duplicate flag is set 71418. If not, the QRMDLGNM Process described in FIG. 19 is invoked 71414 with the Pass2 parameter. Upon return from this process, a check 71415 is made to see if there are any more model entries. If there were, the next Model-File entry is obtained 71425 from the Model File tree. A check 71426 is made to determine if there was a model-file entry. If so, the model-file entry is formatted and stacked 71427. If not, the model entry is formatted and stacked 71429 and the model count is incremented 71430. The process then flows back to 71414. If no more entries were found 71415, a check 71419 is made to determine any models were found. If not, an Error message is issued a return code is set 71423 to indicate a process error and the process returns to the requester 71422. If models were found, the model and model-file trees are deleted 71420. Next a check 71421 is made to see if the duplicate model flag was set. If so, a return code is set 71424 to indicate a duplicate. In either case, the process then returns 71422 to the requester.

Figure 18:
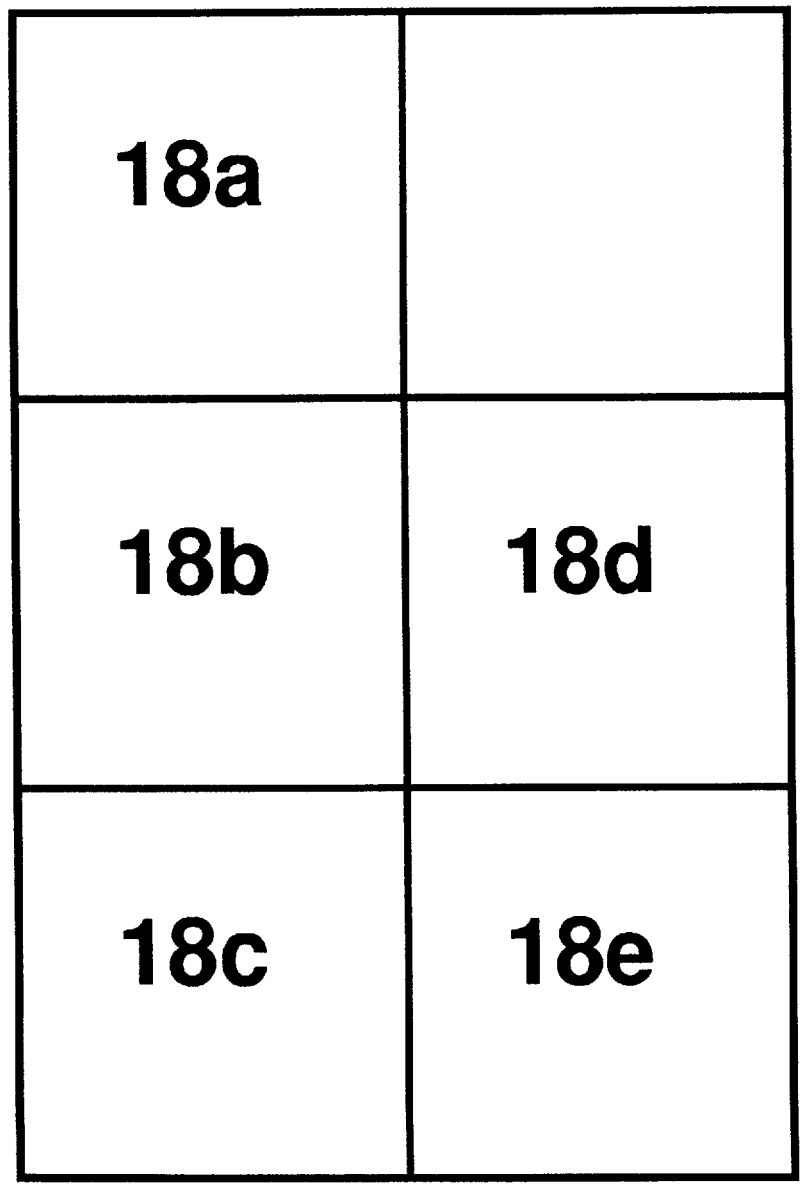
FIGS. 18 and 18a–18e describe the QRMDLDA1 Process.
Figure 18A:
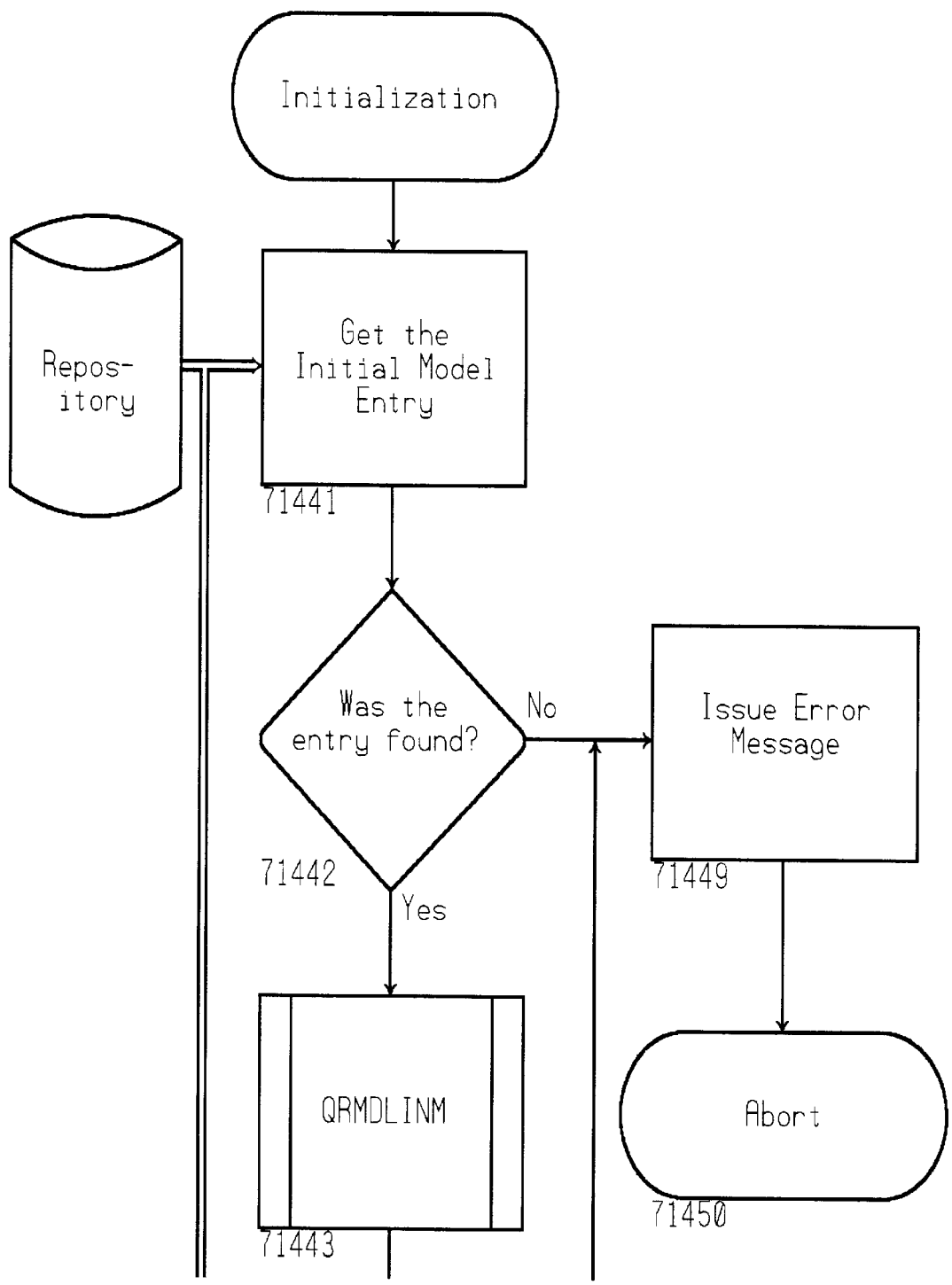
Figure 18B:
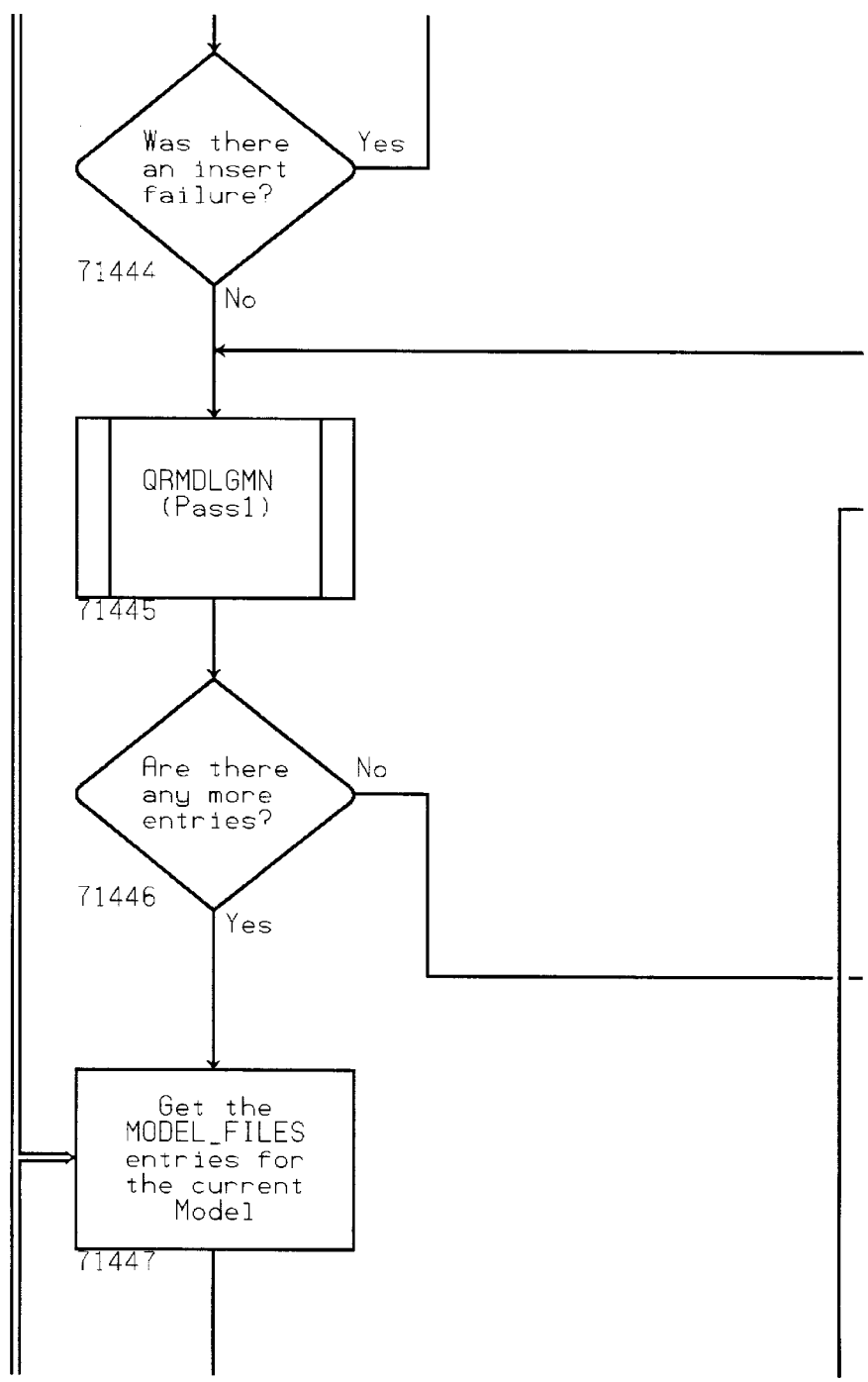
Figure 18C:
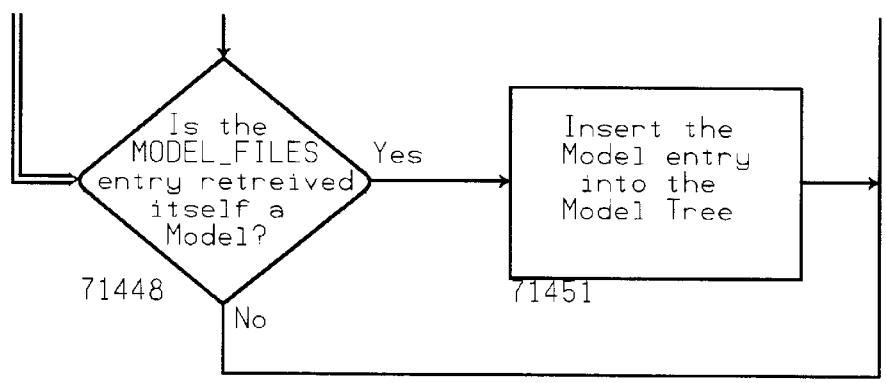
Figure 18D:
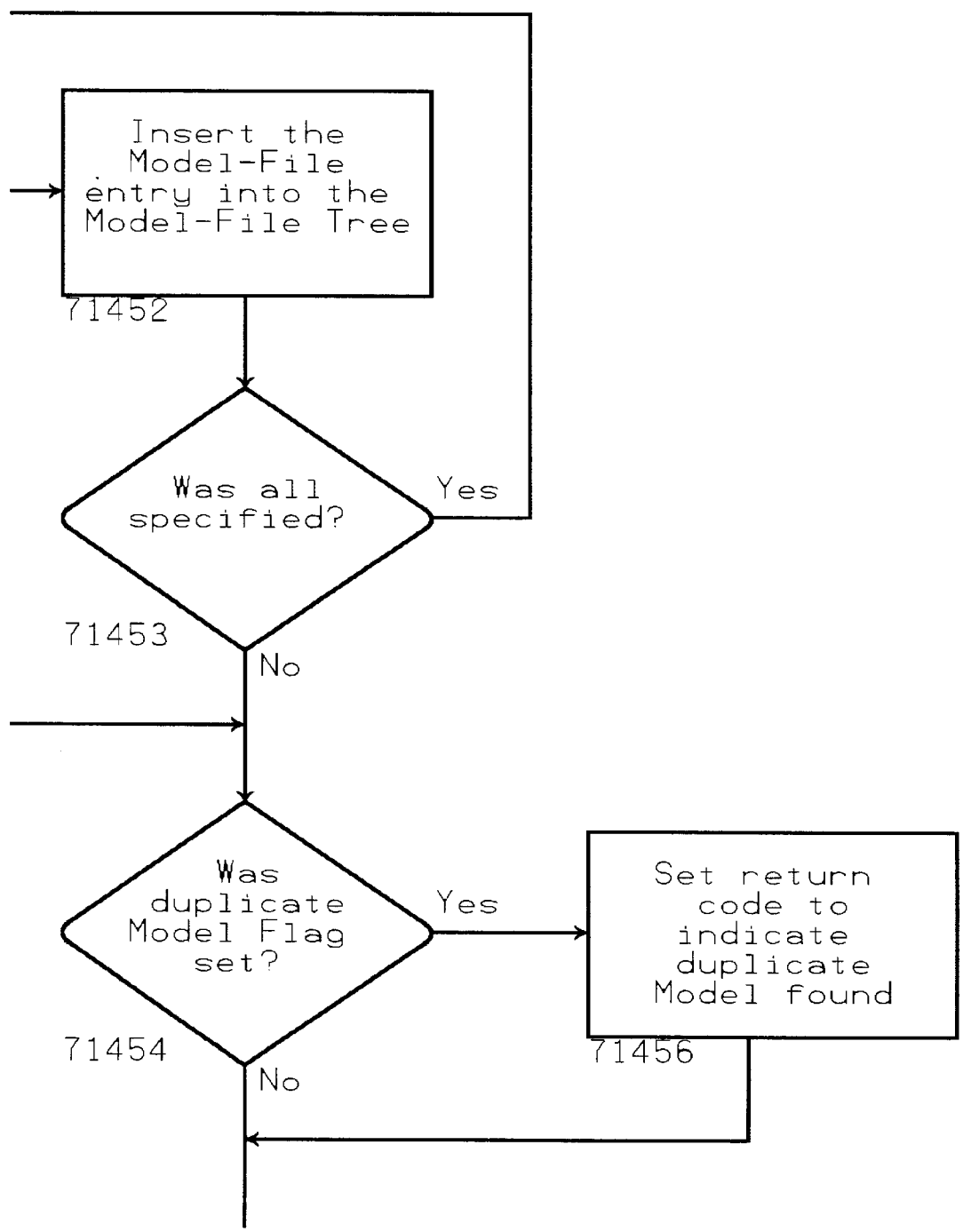
Figure 18E:
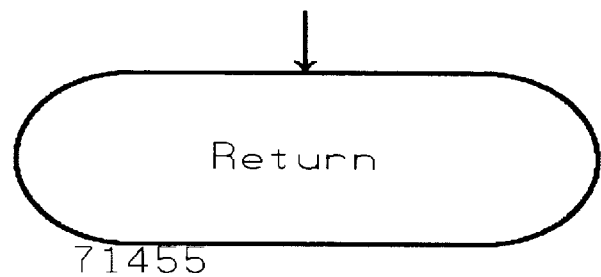
Figure 20:
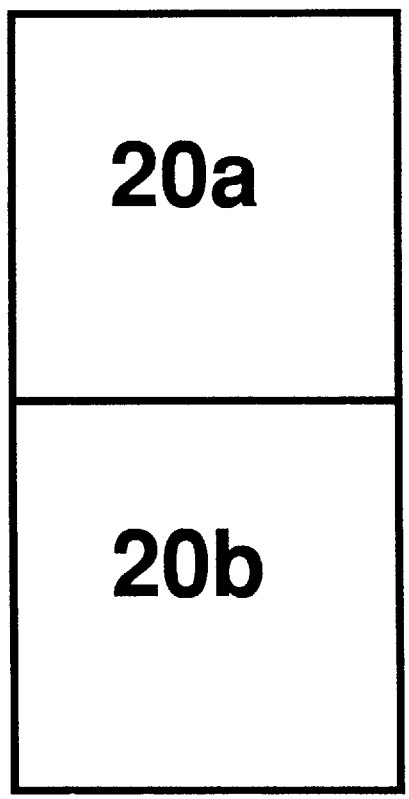
FIGS. 20 and 20a–20b describe the QRMDLINM Process.
Figure 20A:
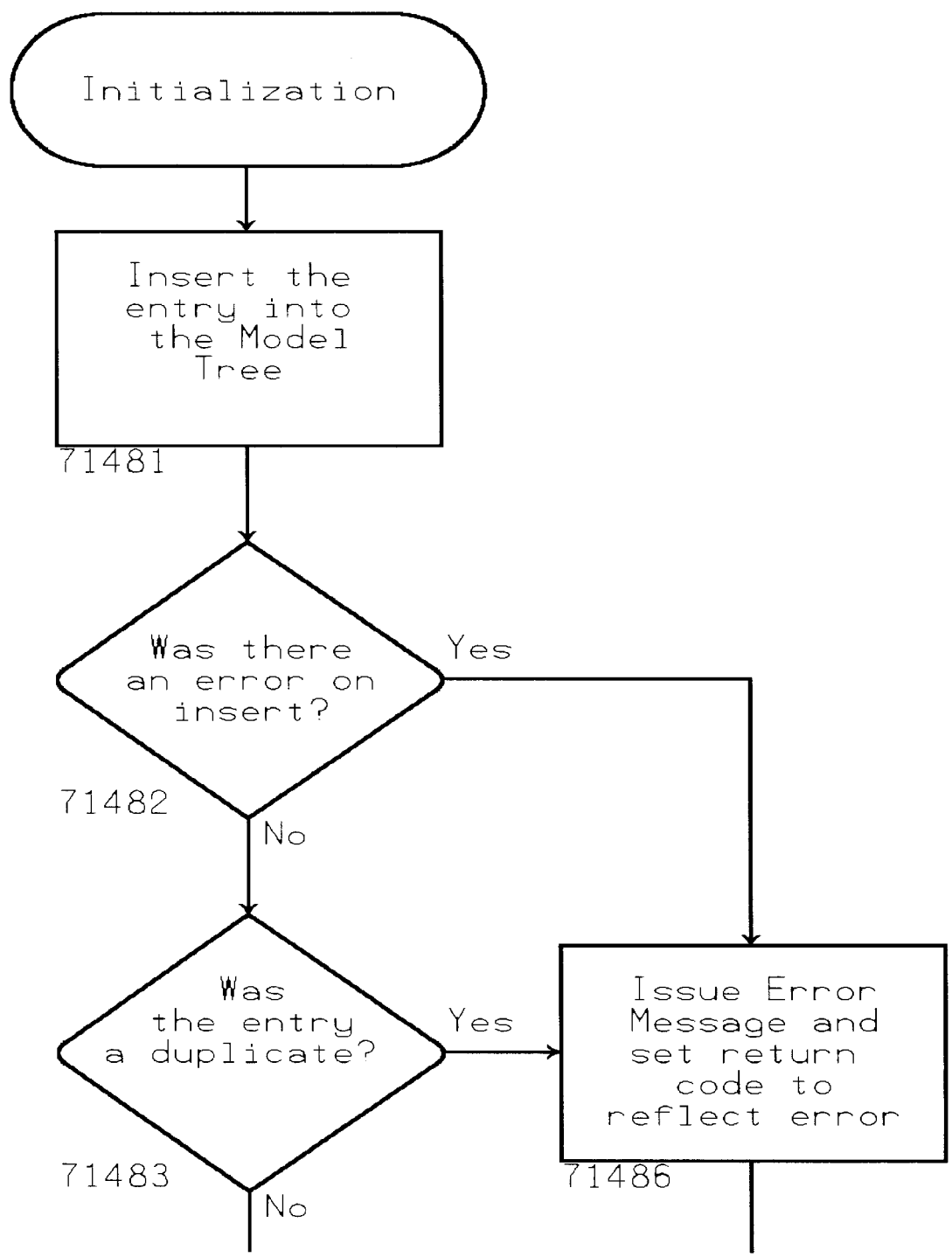
Figure 20B:
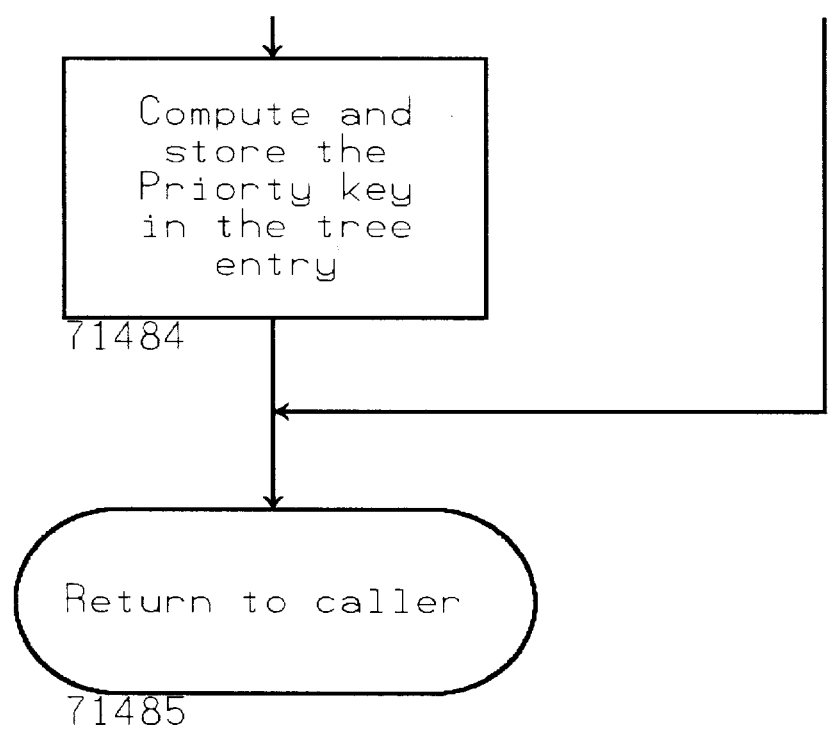

The QRMDLDA1 Process FIG. 18: After initialization, a query is issued 71441 to get the initial model entry from the MODEL table in the Control Repository. A check 71442 is made to determine if it was found. If not, an Error message is issued 71449 and the process is aborted 71450 If it was, the QRMDLINM process described in FIG. 20 is invoked. Upon return from that process a check 71444 is made to determine of an insert failure had occurred. If so, an Error message is issued 71449 and the process is aborted 71450 If not, the QRMDLGNM Process described in FIG. 19 is invoked 71445 with the Pass1 parameter. Upon return from this process, a check 71446 is made to see if there are any more model entries. If not, the process flows to 71454. If there were, a query is issued to retrieve the MODEL_FILE entries for the current model from the Control Repository. Next, a check 71448 is made to determine if the Model-File entry is itself a model. If it is the entry is inserted 71451 into the model tree. In either case, the model-file entry in inserted 71452 into the model-file tree. Next, a check 71453 is made to determine if ALL was specified. If so, the process flows back to 71445. It not, a check 71454 is made to see if the duplicate model flag was set. If so, a return code is set 71456 to indicate a duplicate. In either case, the process then returns 71455 to the requester.

The QRMDLGNM Process FIG. 19: This process is used to get the next entry from the model tree. The process can be invoked either as a PASS1 or a PASS2 process. On PASS1 processing, only priority keys between the pass1 offset and the pass2 offset will be considered. As the items are processed the priority keys will be inverted and based above zero for second pass selection. On PASS2 processing, only priority keys above zero will be considered. As the items are processed the priority keys will be set to zero.

After initialization, the maximum priority key is retrieved 71461 from the model tree. A check 71462 is made to determine if there was a failure. If so, an Error message is issued and a return code set 71458 to indicate failure. The process then returns 71471 to the caller. If it did not fail, a check 71463 is made to determine which pass was specified.

If PASS1 was specified, a check 71644 is made to determine if the priority key is greater than the PASS2 offset. If it is not, then set 71469 a return code to indicate that there are no entries and return 71470 to the caller. Otherwise, recompute and store 71465 a new priority key. Next move 71466. the model entry into the return area and return 71467 to the caller.

If PASS2 was specified, a check 71472 is made to determine if the priority key is positive. If it is not, then set 71469 a return code to indicate that there are no entries and return 71470 to the caller. Otherwise, set the priority key to zero and store it 71473. Next move 71466. the model entry into the return area and return 71467 to the caller.

The QRMDLINM Process FIG. 20: This process is used to insert a model entry into the model tree. After initialization, the model entry is inserted 71481 in the model tree. Next, a check 71482 is made to determine if there was an error on insert. If there was an error, an Error message is issued and a return code is set 71486 to reflect the error and the process returns 71485 to the caller. If there was no insert error, a check 71483 is made to determine whether the entry was a duplicate. If so, an Error message is issued and a return code is set 71486 to reflect the error and the process returns 71485 to the caller. Otherwise, the priority key is computed and inserted 71484 into the tree entry and the process returns 71485 to the caller.

Figure 21:
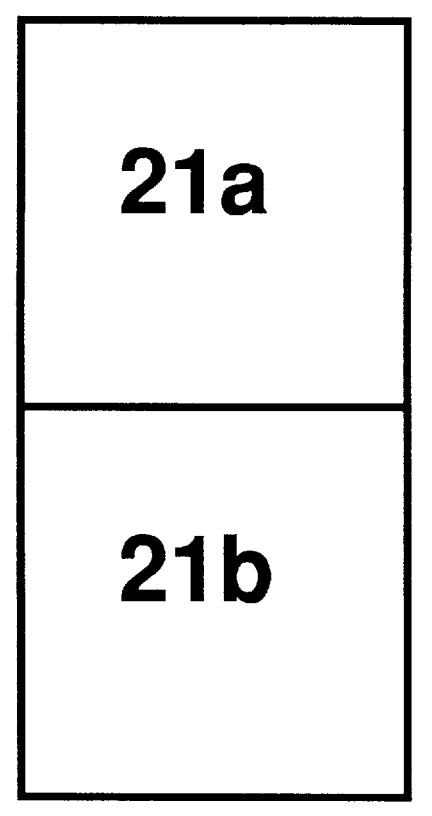
Figure 21A:
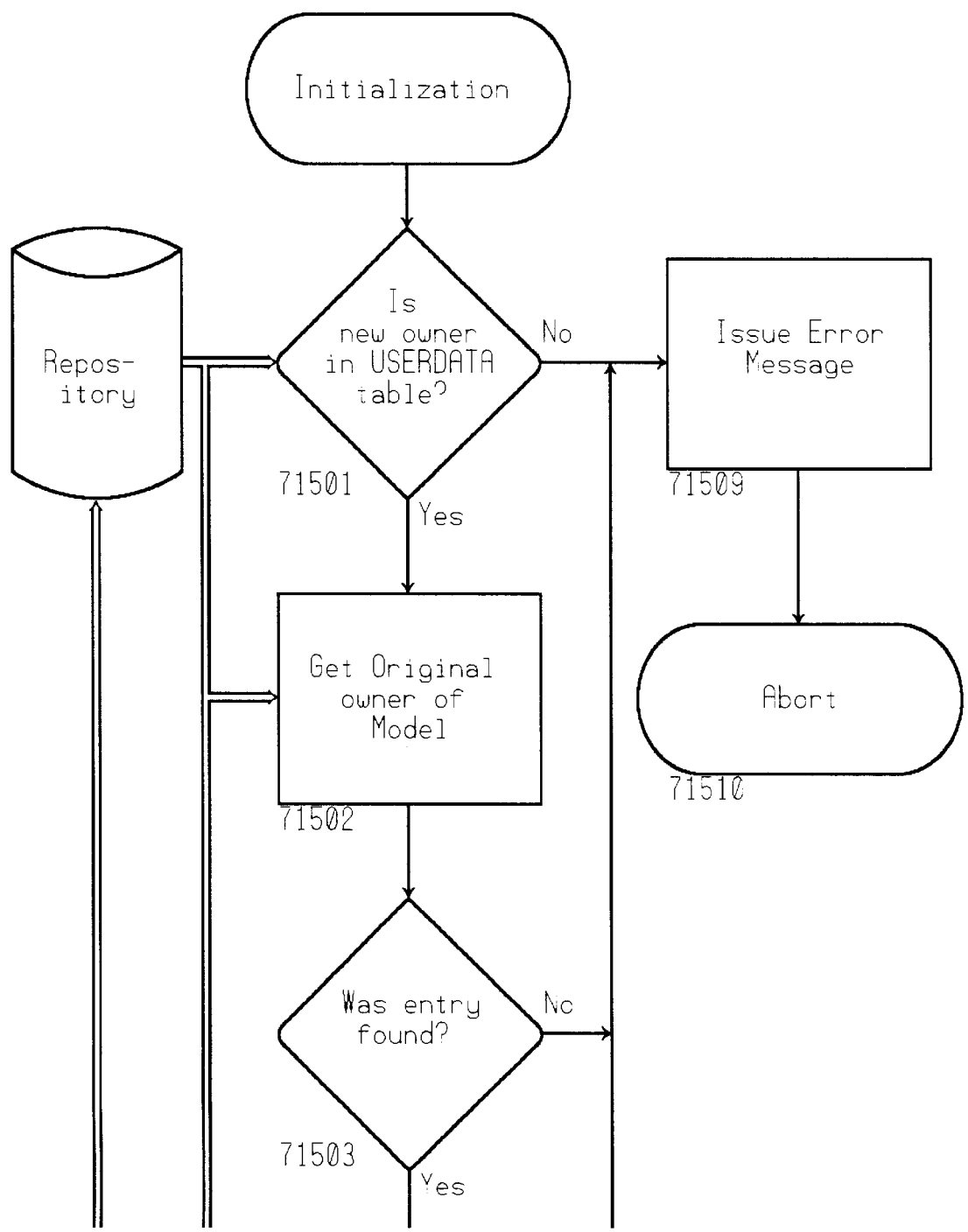
Figure 21B:
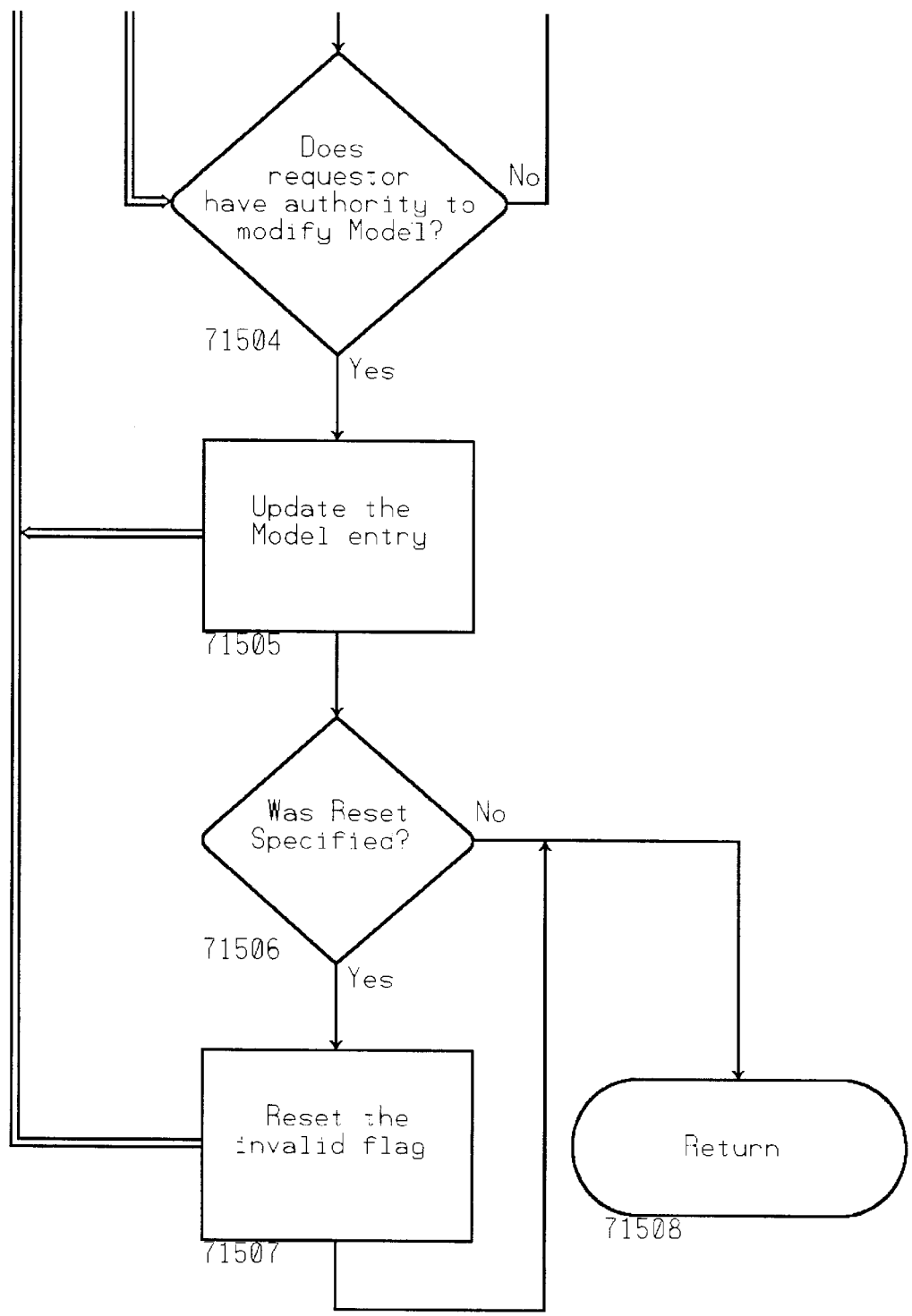

The QRMDLMOD Process FIG. 21: This process is used to modify a Model entry in the MODEL table in the Control Repository. After initialization, A query 71501 is made to determine if the new owner is in the USERDATA table in the Control Repository. If not, an Error message is issued 71509 and the process aborts 71510. If it is, a query 71502 is made to get the original owner of the model. A check 71503 is made to determine whether the entry was found. If not, an Error message is issued 71509 and the process aborts 71510. If it was found, the Control Repository is checked 71504 to make sure that the requestor has MODEL MODIFY authority. If not, an Error message is issued 71509 and the process aborts 71510. Otherwise, the model entry in the MODEL table in the Control Repository is updated. Next, a check 71506 is made to determine whether RESET was specified. If so, reset 71507 the invalid flag in the MODEL table in the Control Repository and return 71508.

Figure 22:
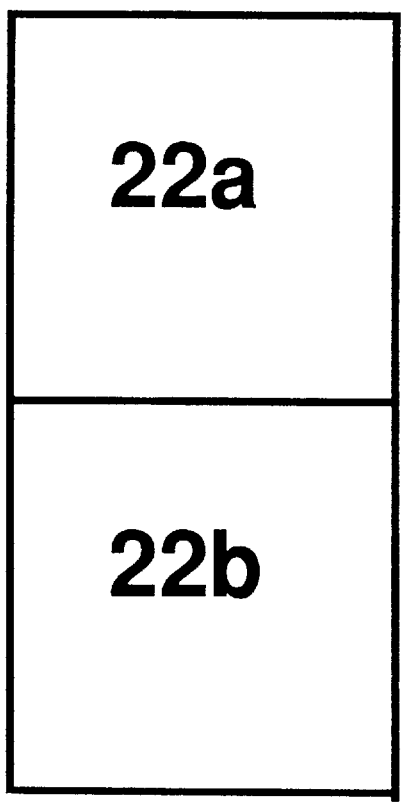
FIGS. 22 and 22a–22b describe the QRMDLRES Process.
Figure 22A:
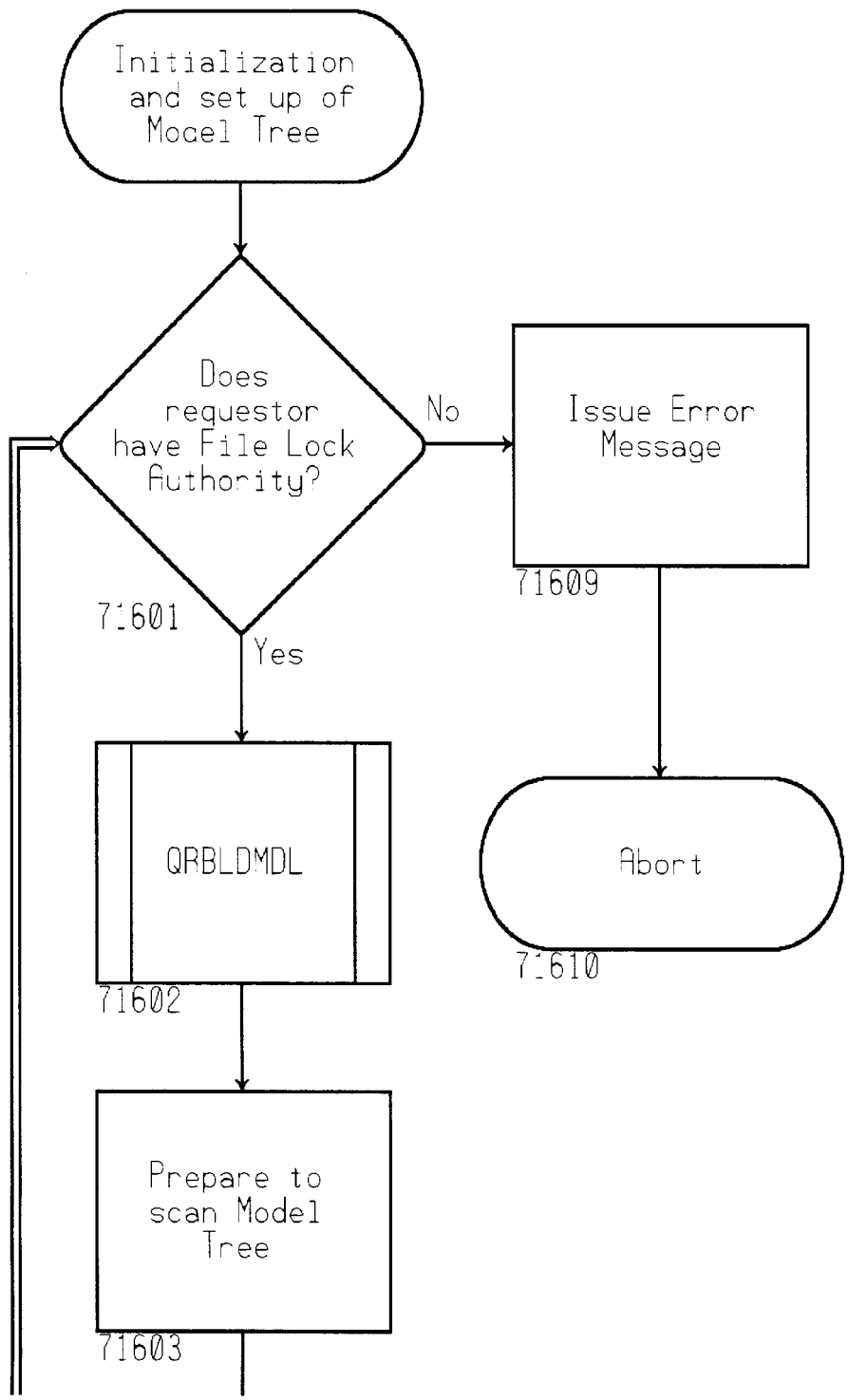
Figure 22B:
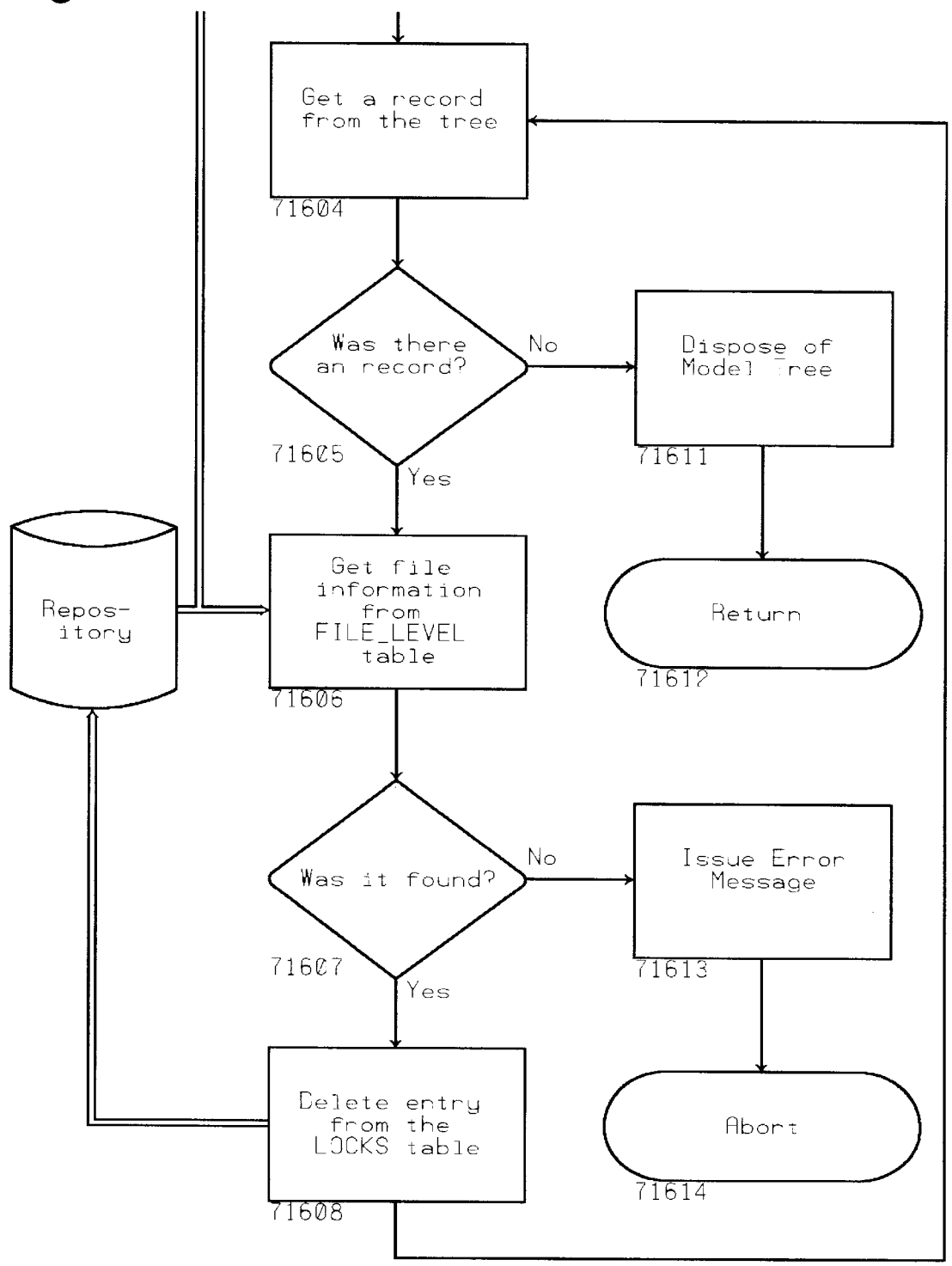
Figure 24:
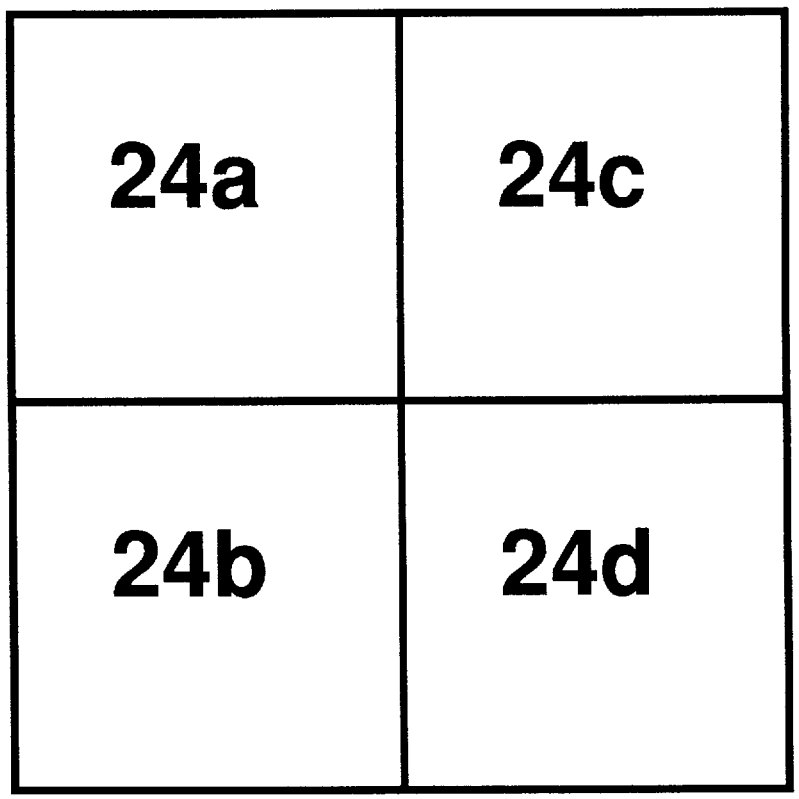
FIGS. 24 and 24a–24d describe the QRBLDPRM Process.
Figure 24A:
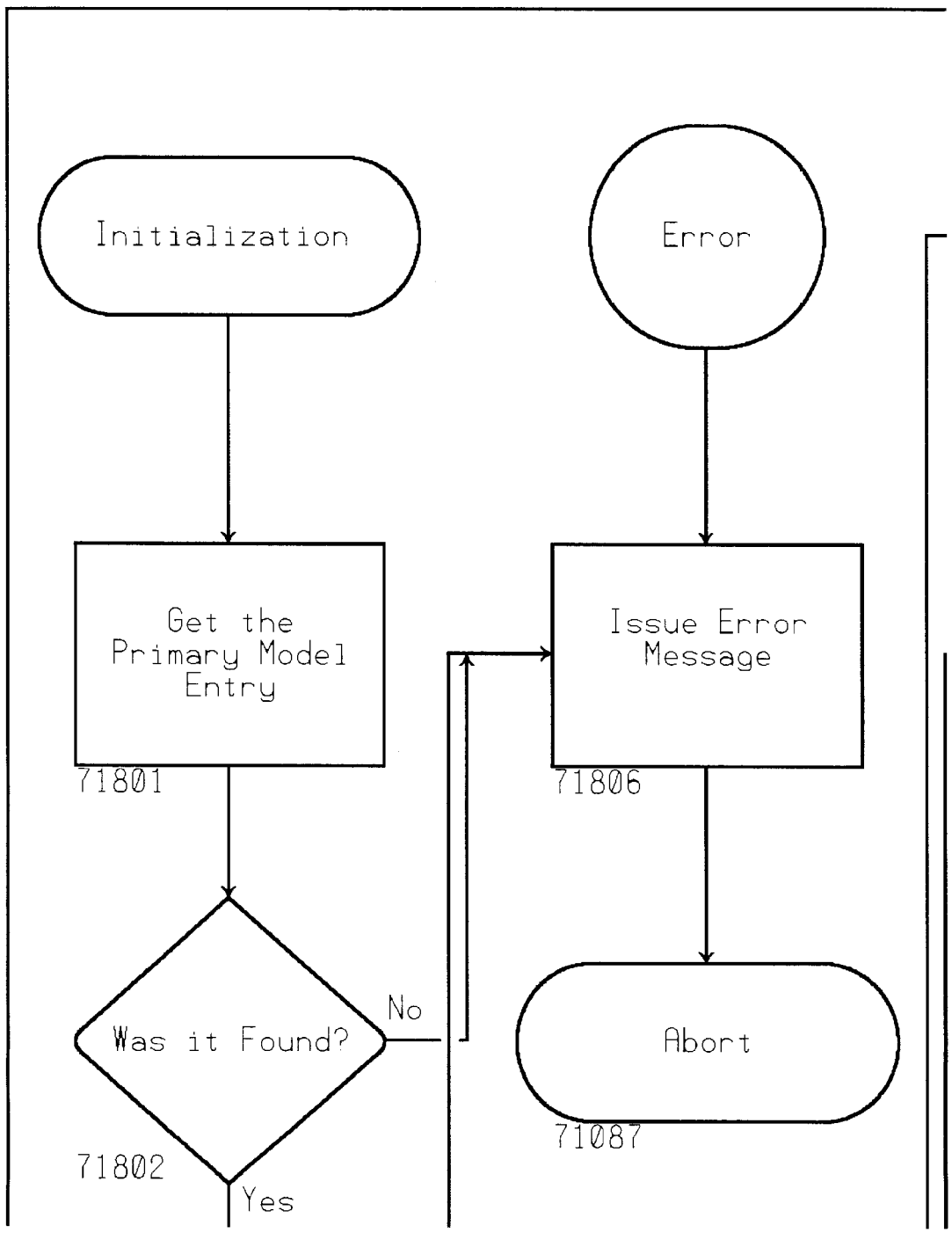
Figure 24B:
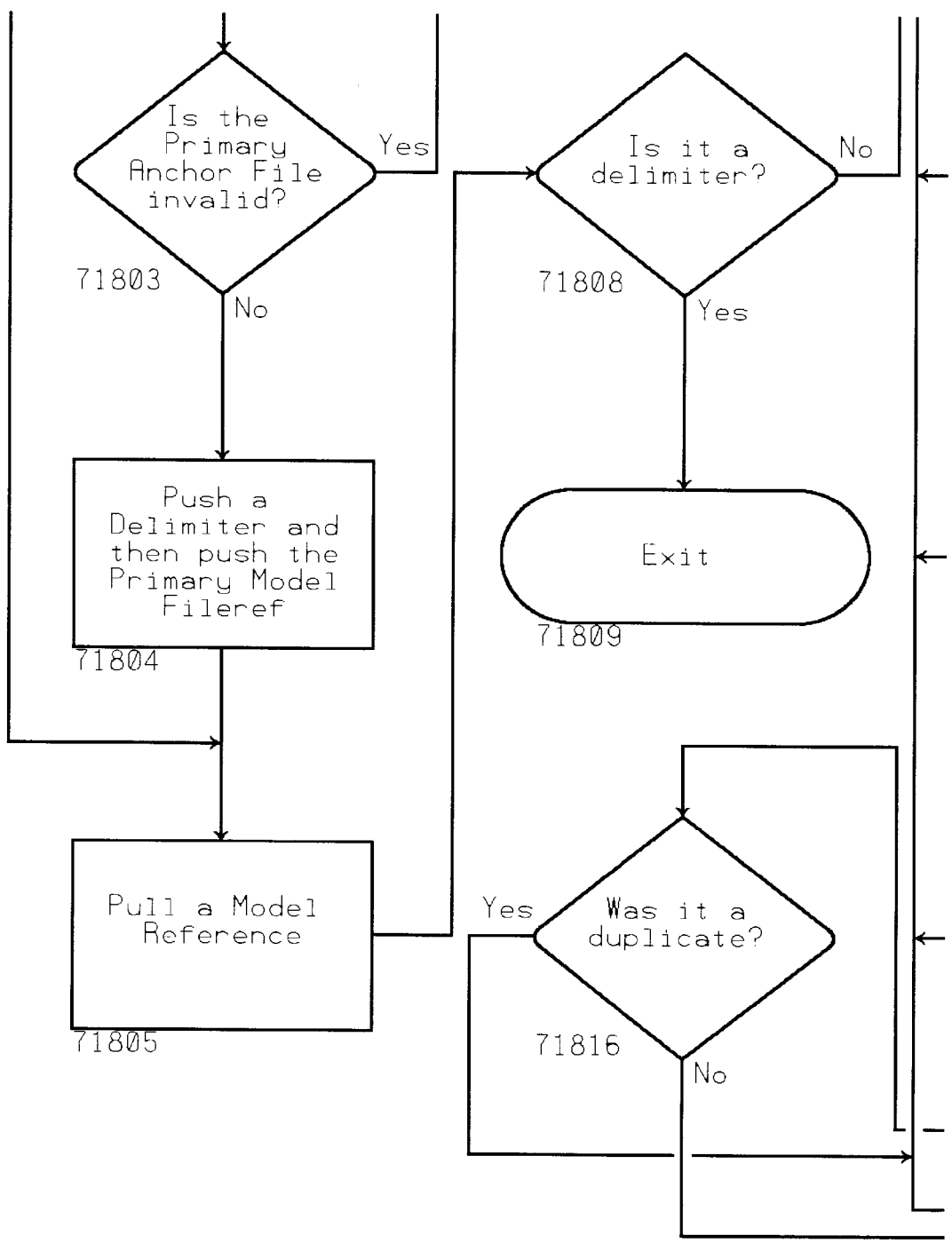
Figure 24C:
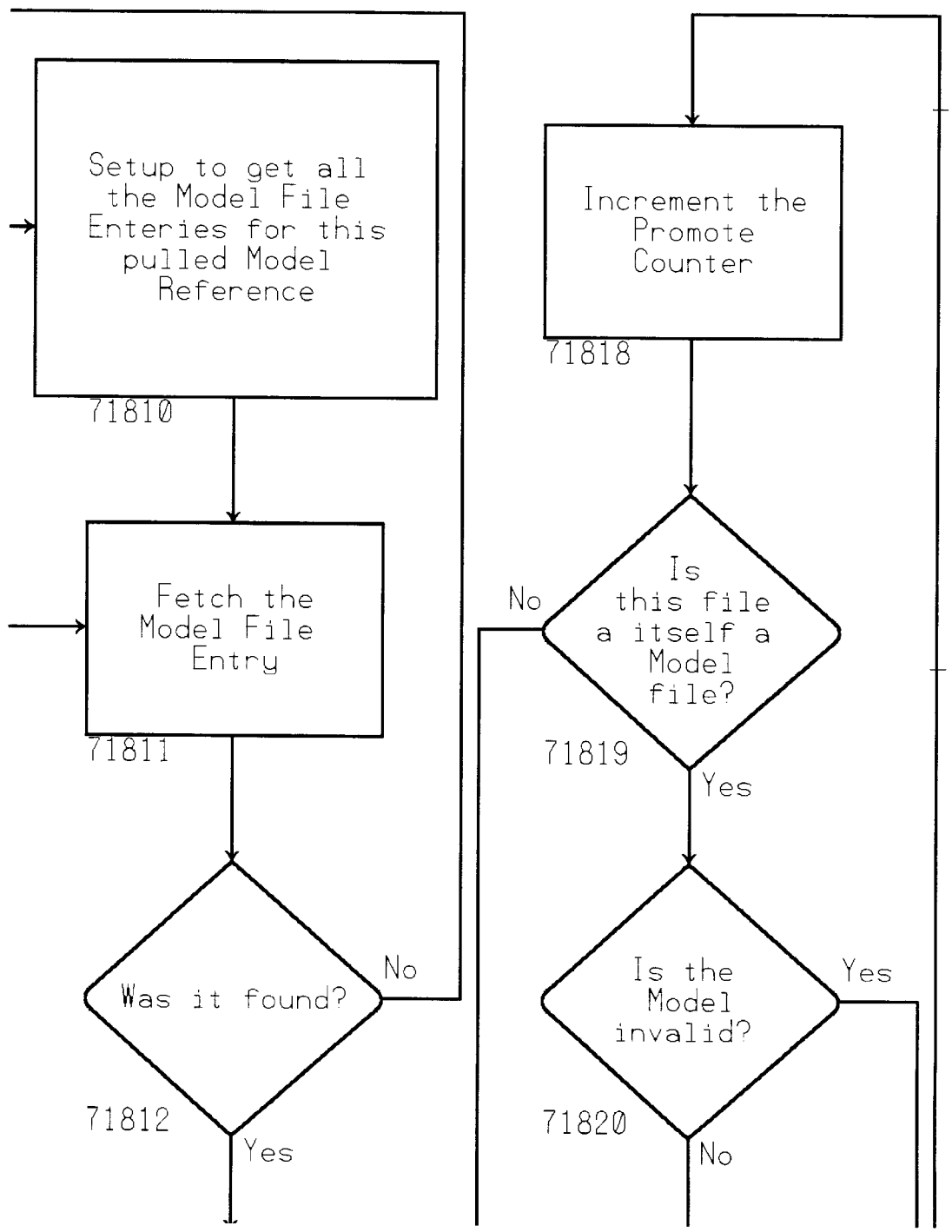
Figure 24D:
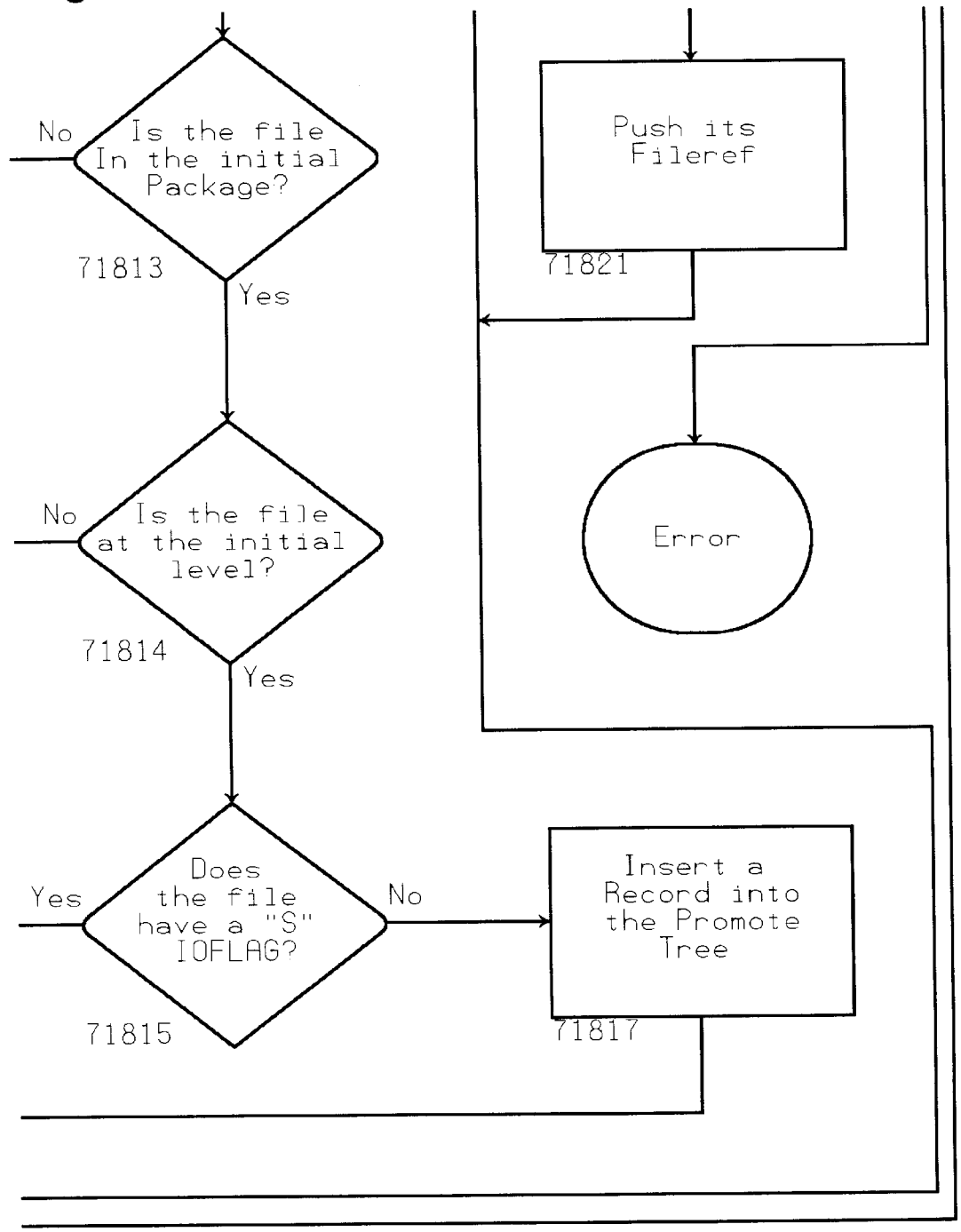

The QRMDLRES Process FIG. 22: This process is used to reset a given FILE lock on all the components of a model. After initialization, a check 71601 is made to make sure that the requester has FILE LOCK authority. If not, an Error message is issued 71609 and the process aborts 71610. Otherwise the QRBLDMDL Process described in FIG. 24 is invoked 71602. Upon return from that process, preparations are made 71603 to scan the model tree. The following steps will process each tree entry. Get 71604 a record from the tree. A check 71605 is made to determine if a record was found. If not, the model tree will be disposed 71611 and the process will return 71611. If a record was found, get 71606 the file information from the FILE_LEVEL table in the Control Repository. A check 71607 is made to determine if the information was found. If not, the model tree will be disposed 71611 and the process will return 71611. If not, an Error message is issued 71613 and the process aborts 71614. If the information was found, delete 71608 the entry from the LOCKS table in the Control Repository. The process will then flow back to 71604.

Figure 23:
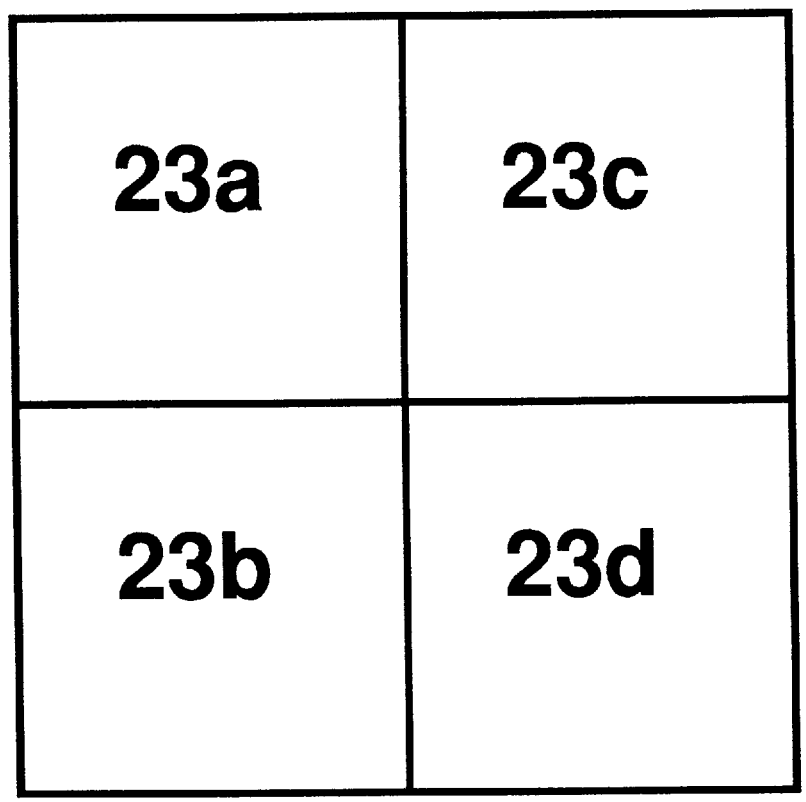
Figure 23A:
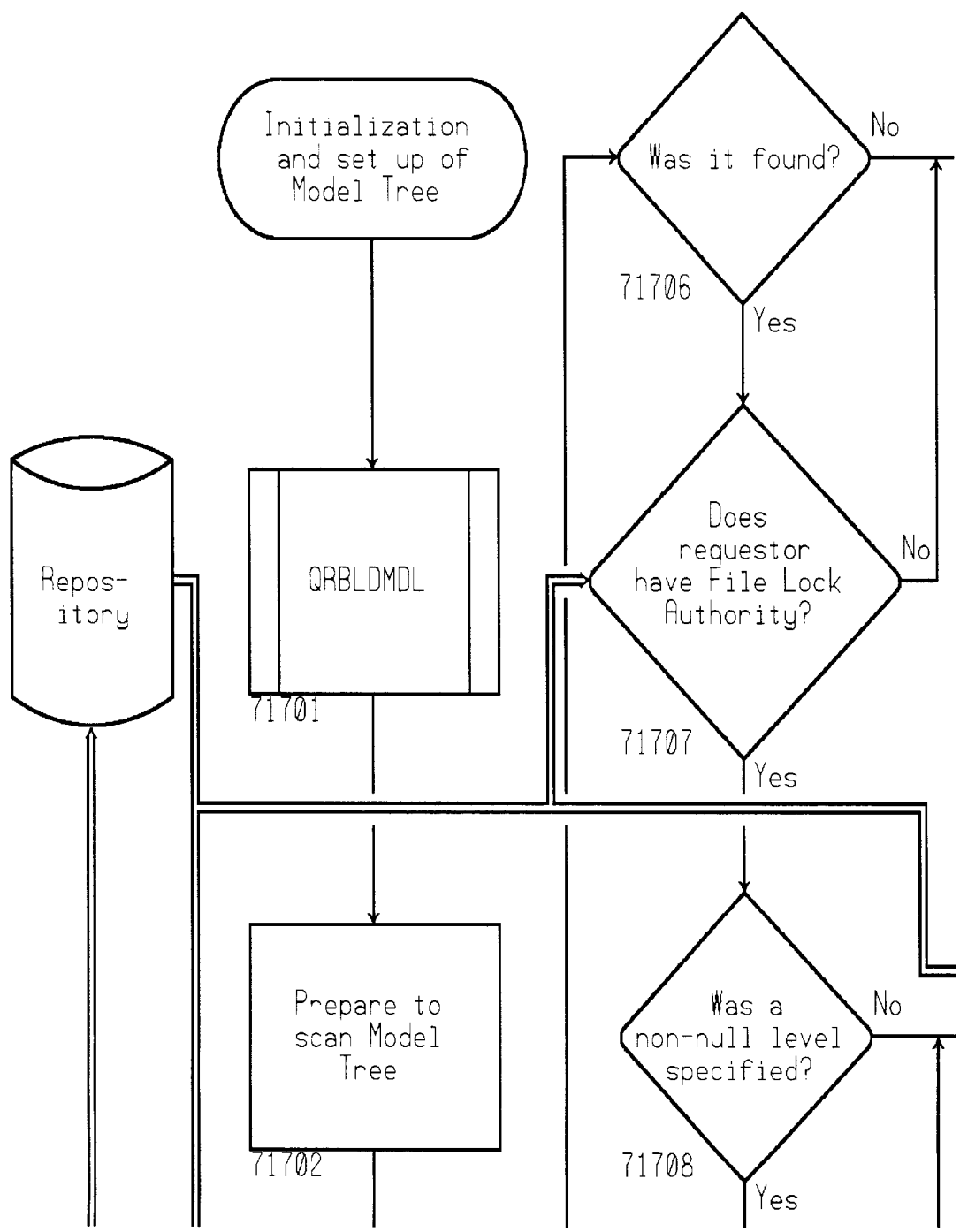
Figure 23B:
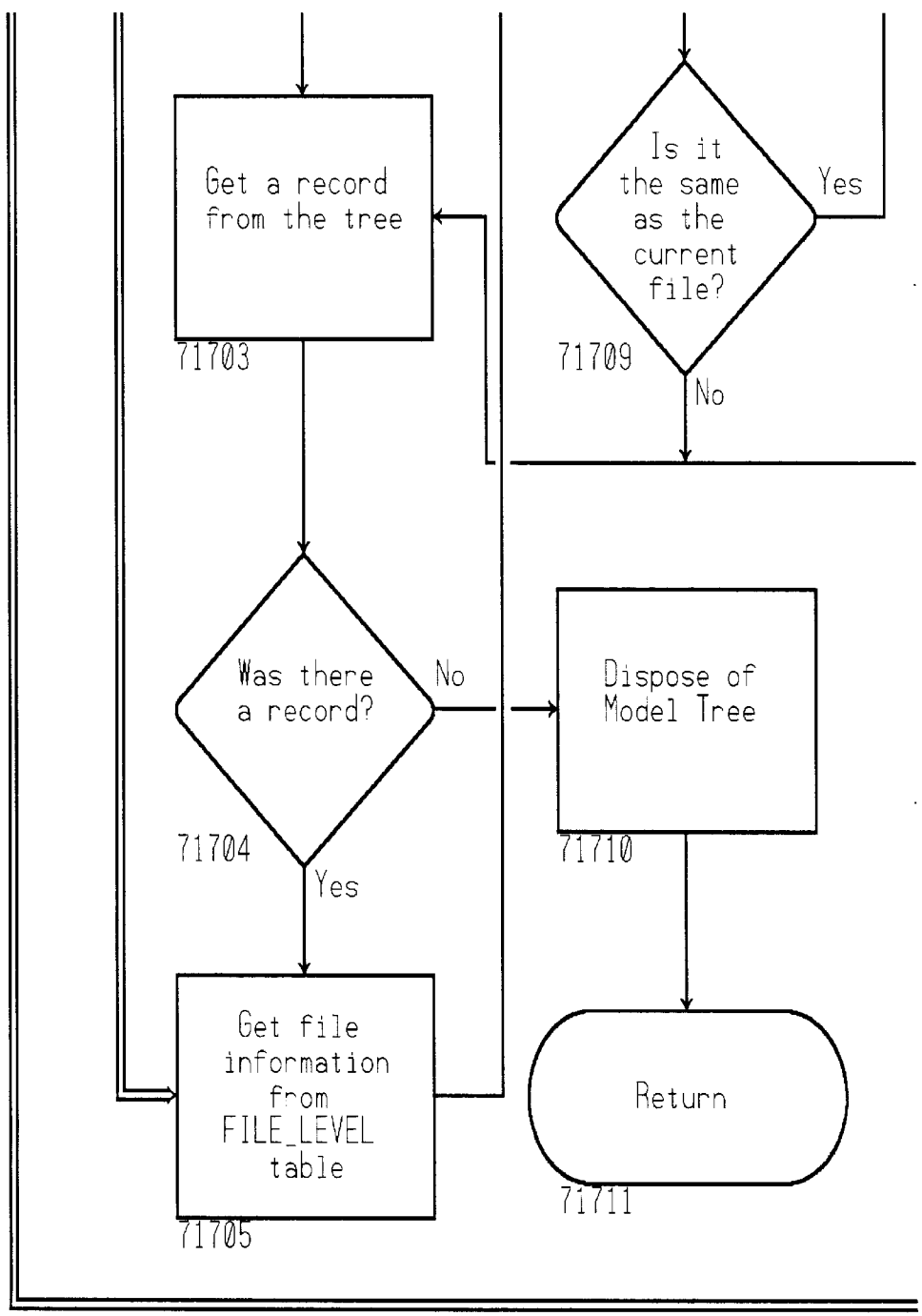
Figure 23D:
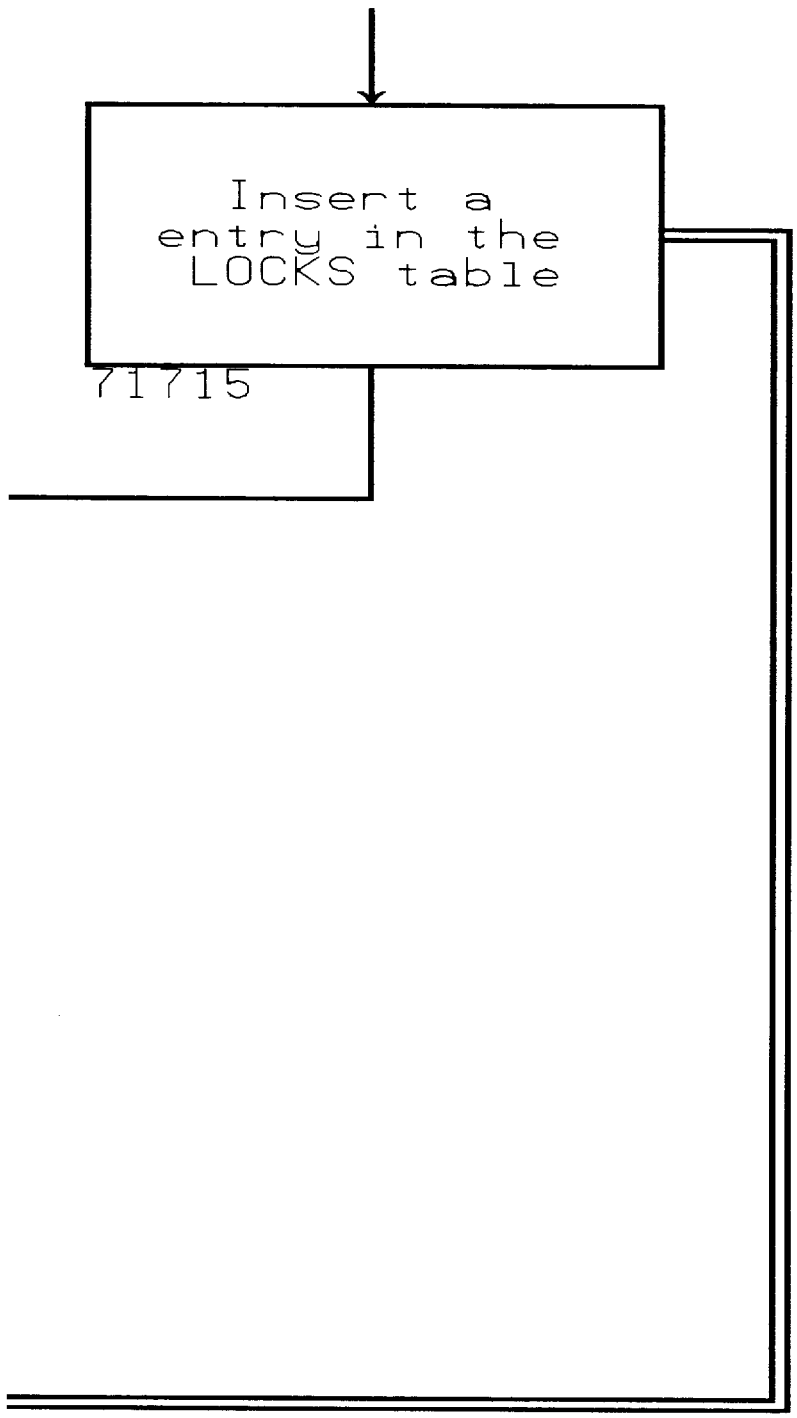

The QRMDLSET Process FIG. 23: This process is used to reset a given FILE lock on all the components of a model. After initialization, the QRBLDMDL Process described in FIG. 24 is invoked 71701. Upon return from that process, preparations are made 71702 to scan the model tree.

The following steps will process each tree entry: Get 71703 a record from the tree. Then, a check 71704 is made to determine if a record was found. If not, the model tree will be disposed 71710 and the process will return 71711. If a record was found, get 71705 the file information from the FILE_LEVEL table in the Control Repository. Next, a check 71706 is made to determine if the information was found. If not, an Error message is issued 71712 and the process aborts 71713. If the information was found, a check 71707 is made to make sure that the requestor has FILE LOCK authority. If not, an Error message is issued 71712 and the process aborts 71713. Otherwise, a check 41708 is made to determine if a non-null Level was specified. If not, get 71714 a LockRef from the Control Repository. Next, insert 71715 an entry into the LOCKS table in the Control Repository. The process will then flow back to 71703. If a non-null Level was specified, a check 71709 is made to determine if it is the same as the current file. If so, the process flows forward to 71714. If not, the process flows back to 71703.

The QRBLDPRM Process FIG. 24: This process is used to build a model promote tree to support the Model Promote function of the Library Manager. After initialization, retrieve 71901 the primary model entry from the MODEL table in the Control Repository A check 71802 is made to determine if it was found. If not, issue an Error message 71806 and abort 71807 the process. Otherwise a check 71803 is made to determine if the model is valid. If not, issue an Error message 71806 and abort 71807 the process. If it is valid, push 71804 a delimiter and then the primary model file ref on the stack. The following steps will recursively examine all the nested models. and build the promote tree. First, pull 71805 a ModelRef from the stack. Next, a check 71808 is made to determine if it is a delimiter. If so, return 71809 to the caller. Otherwise, prepare 71810 to get all the model-file entries for this model. Fetch 71811 a model-file entry from the MODEL_FILES table in the Control Repository. A check 71812 is made to determine if it was found. If not, the process flows back to 71805. A check 71813 is made to determine if this model-file is in the same package as the primary model file. If not, the process flows back to fetch another model-file entry 71811. A check 71814 is made to determine if this model-file is at the same level as the primary model file. If not, the process flows back to fetch another model-file entry 71811. A check 71815 is made to determine if this model-file has an "S" IOFlag. If it does, the process flows back to fetch another model-file entry 71811. If the model-file has passed the above checks its record is inserted 71817 into the promote tree (duplicate entries are not inserted). A check 71816 is made to determine if this was a duplicate entry. If it was, the process flows back to fetch another model-file entry 71811. If not a duplicate, increment 71818 the promote counter. Next, a check 71819 is made to determine if this model-file is itself a model. If not, the process flows back to fetch another model-file entry 71811. If it is a model, a check 71820 is made to determine if the model is valid. If not, issue an Error message 71806 and abort 71807 the process. If it is valid, push 71821 its file ref on the stack. The process flows back to fetch another model-file entry 71811.

Figure 25:
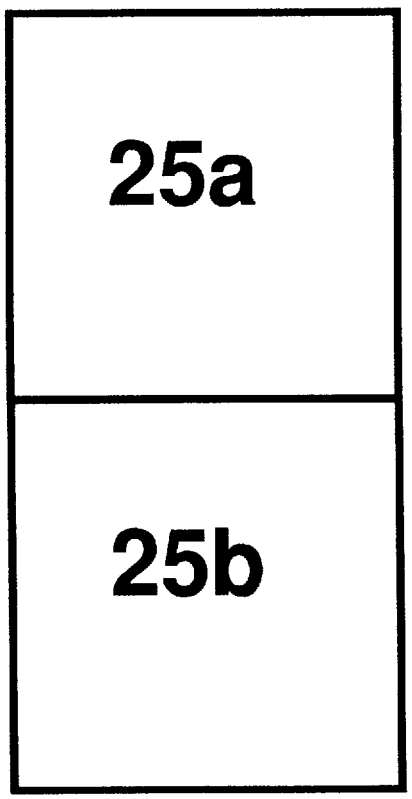
FIGS. 25 and 25a–25b describe the QRMFIADD Process.
Figure 25A:
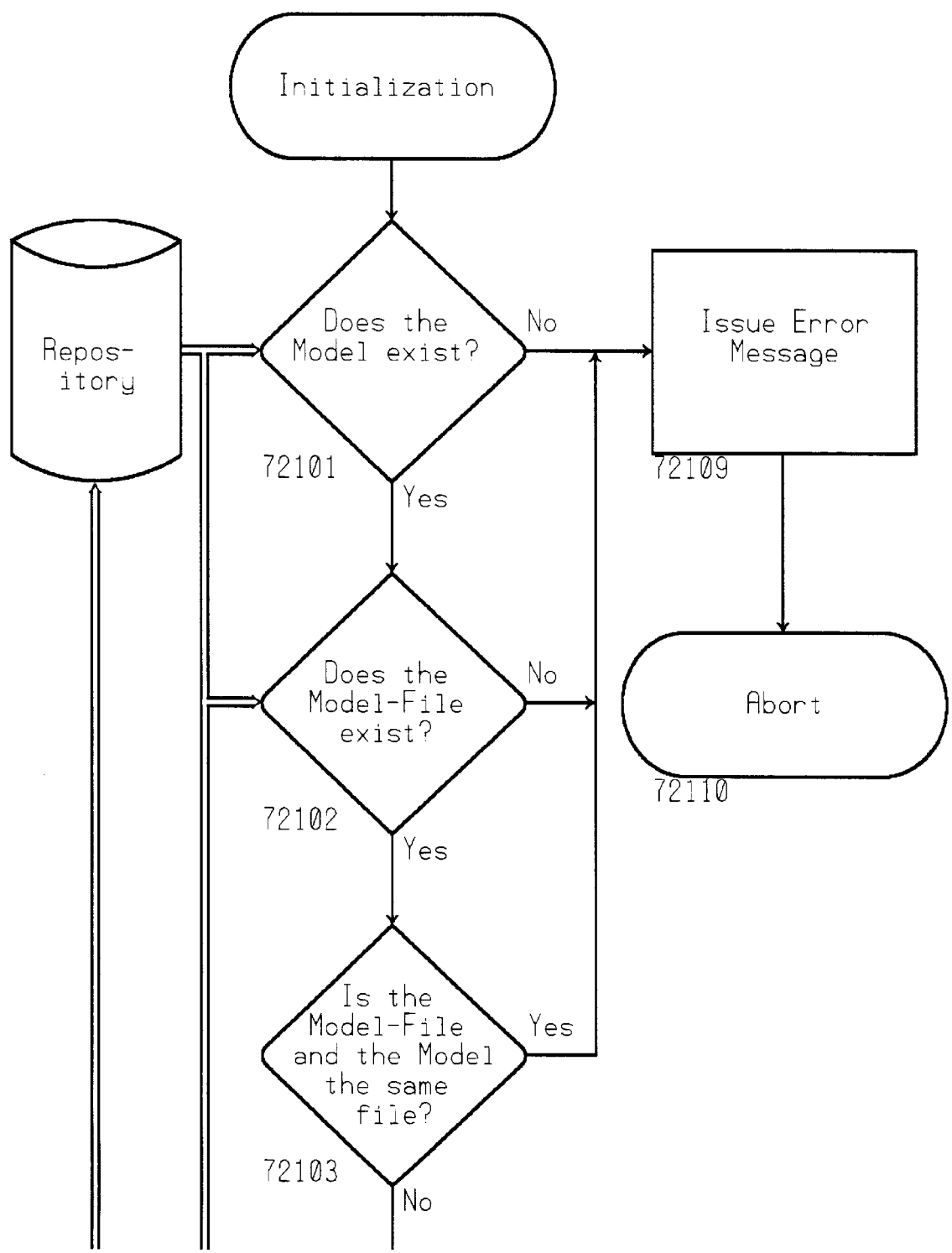
Figure 25B:
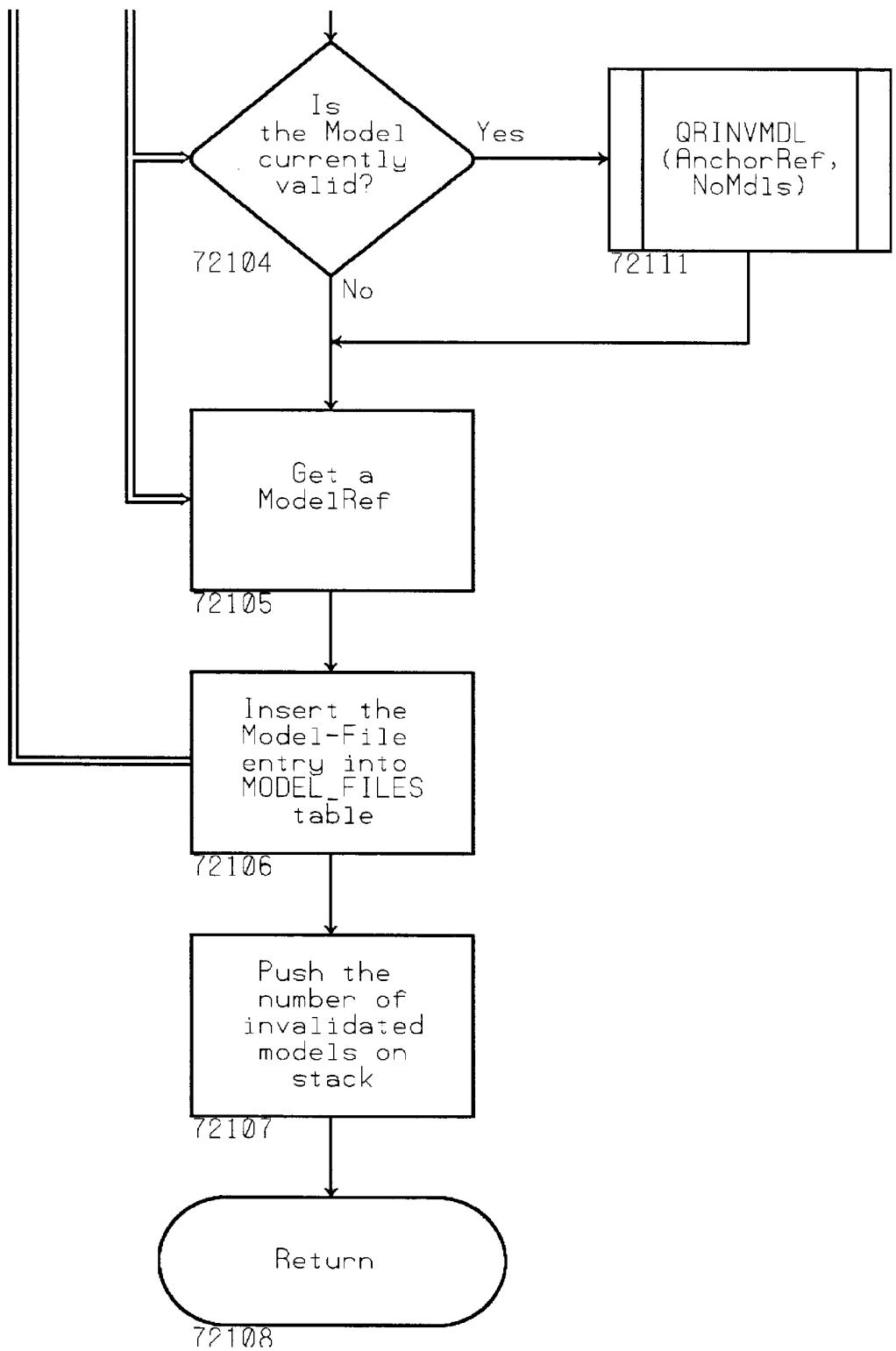

The QRMFIADD Process FIG. 25: This process is used add a file to a specified MODEL. After initialization; A check 72101 is made to determine if the model exists in the MODEL table in the Control Repository. If not, an Error message is issued 72109 and the process aborts 72110. If it does exist, A check 72102 is made to determine if the model-file exists in the FILES table in the Control Repository. If not, an Error message is issued 72109 and the process aborts 72110. Next, a check 72103 is made to determine if the model-file and the model are one and the same (which would cause a loop).

If so, an Error message is issued 72109 and the process aborts 72110. Next, a check 72104 is made to determine if the model is currently valid. If so, the QRINVMDL process described in FIG. 15 is invoked 72111. In either case, a ModelRef is obtained 72105 from the Control Repository. The model-file entry is inserted 72106 into the MODEL_FILES table in the Control Repository. Next the number of models invalidated is pushed 72107 on the stack and the process returns 72108 to the requestor.

Figure 26:
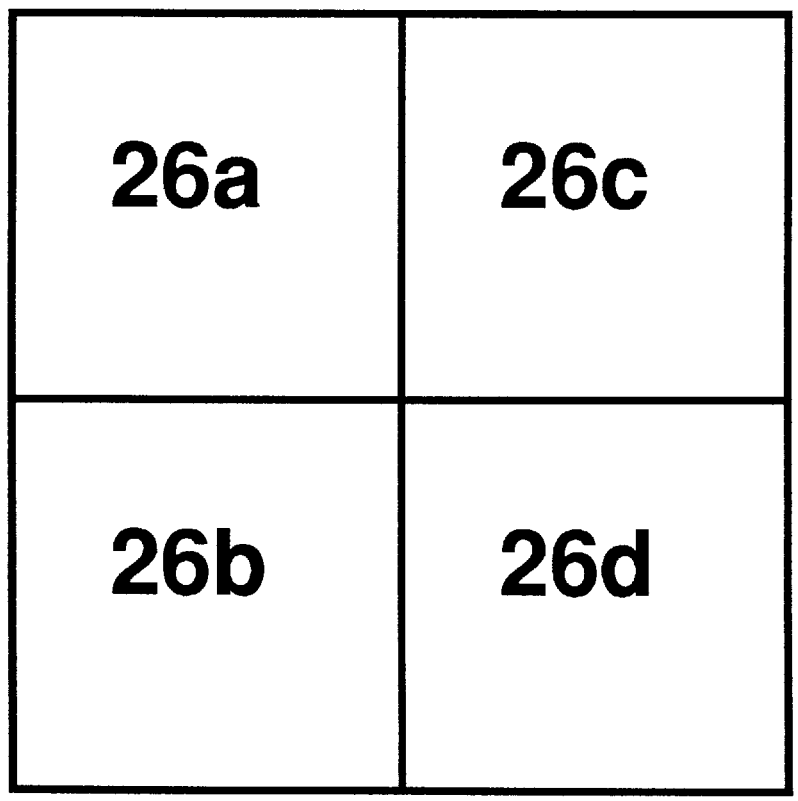
FIGS. 26 and 26a–26d describe the QRMFIDEL Process.
Figure 26A:
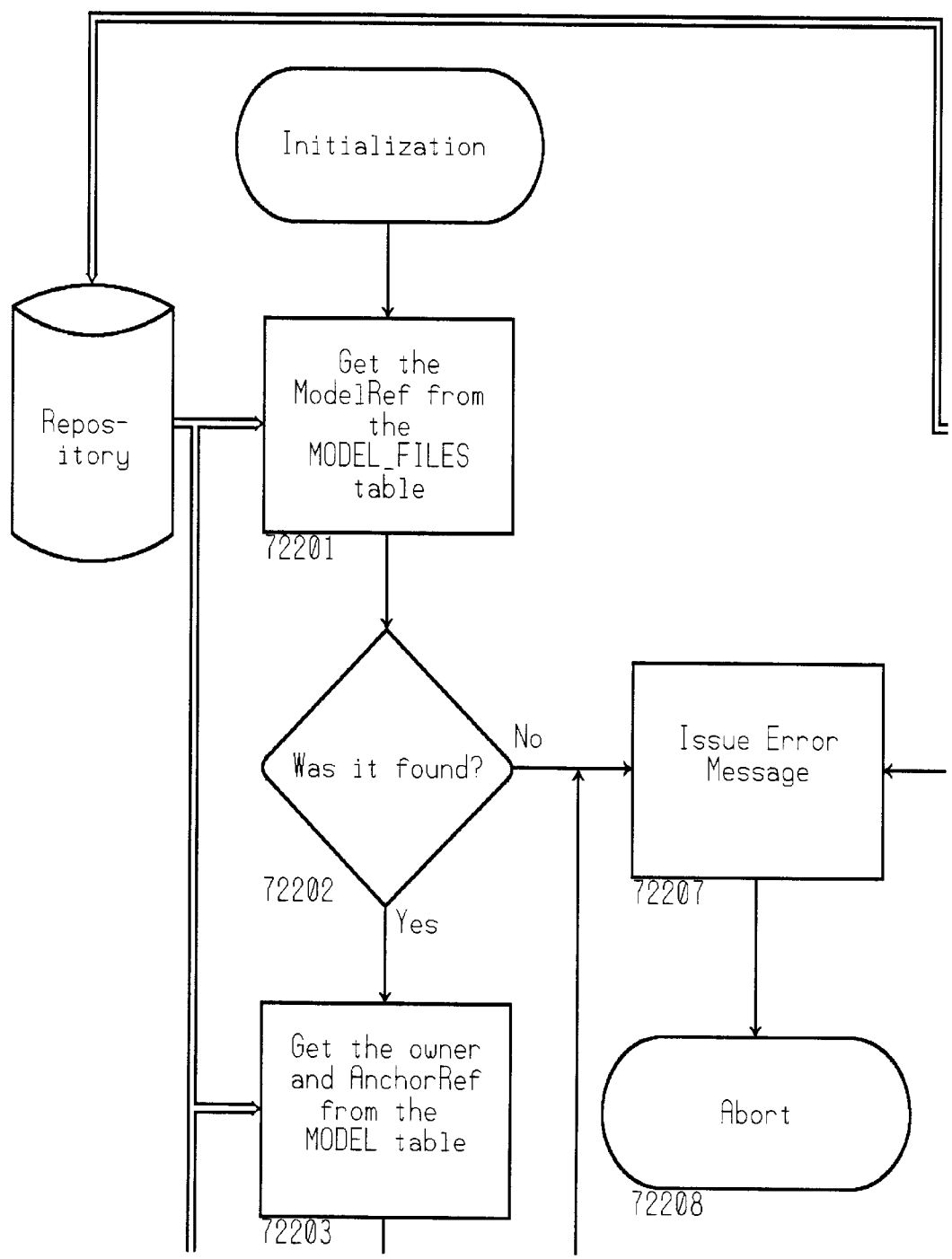
Figure 26B:
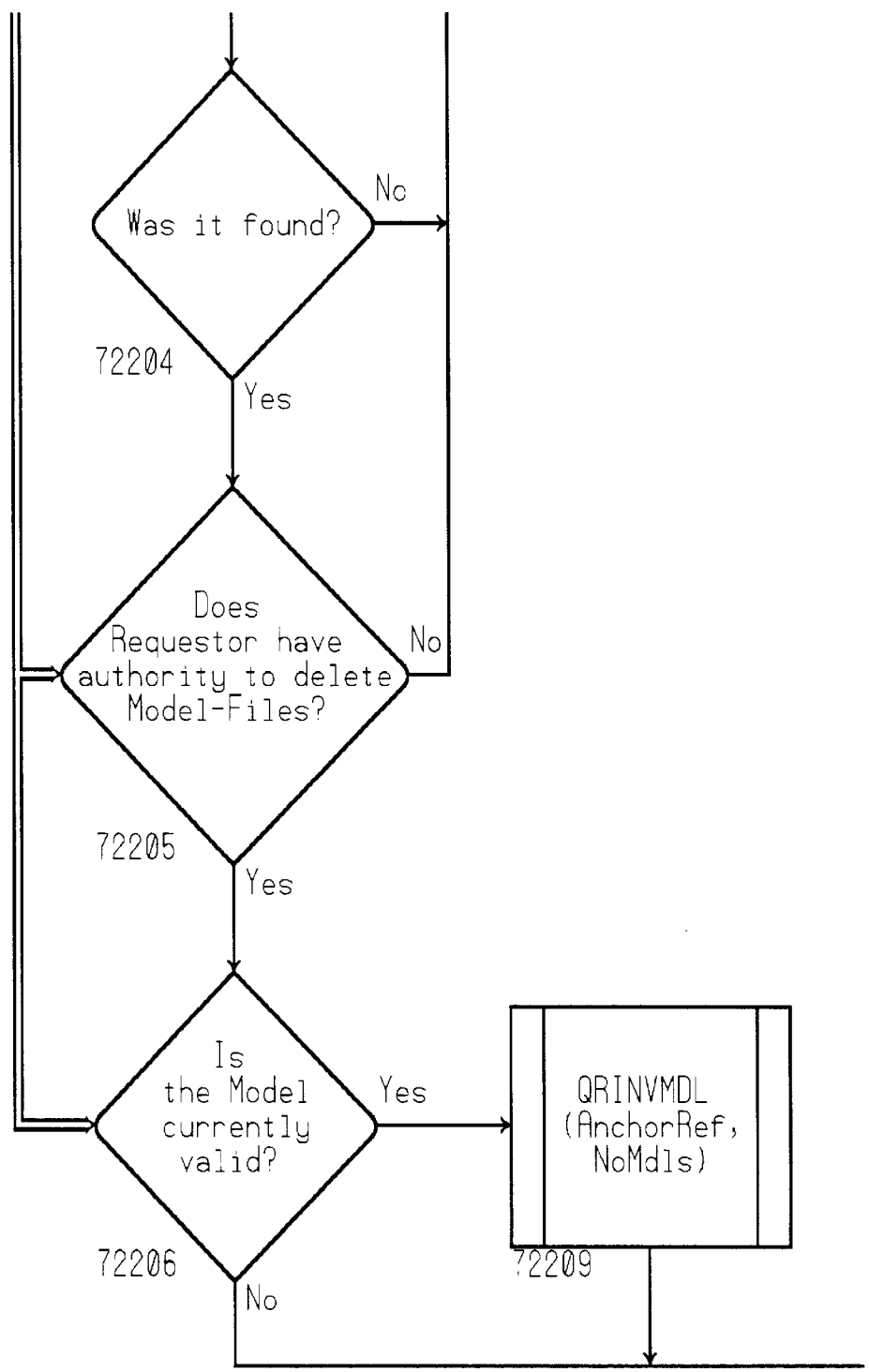
Figure 26C:
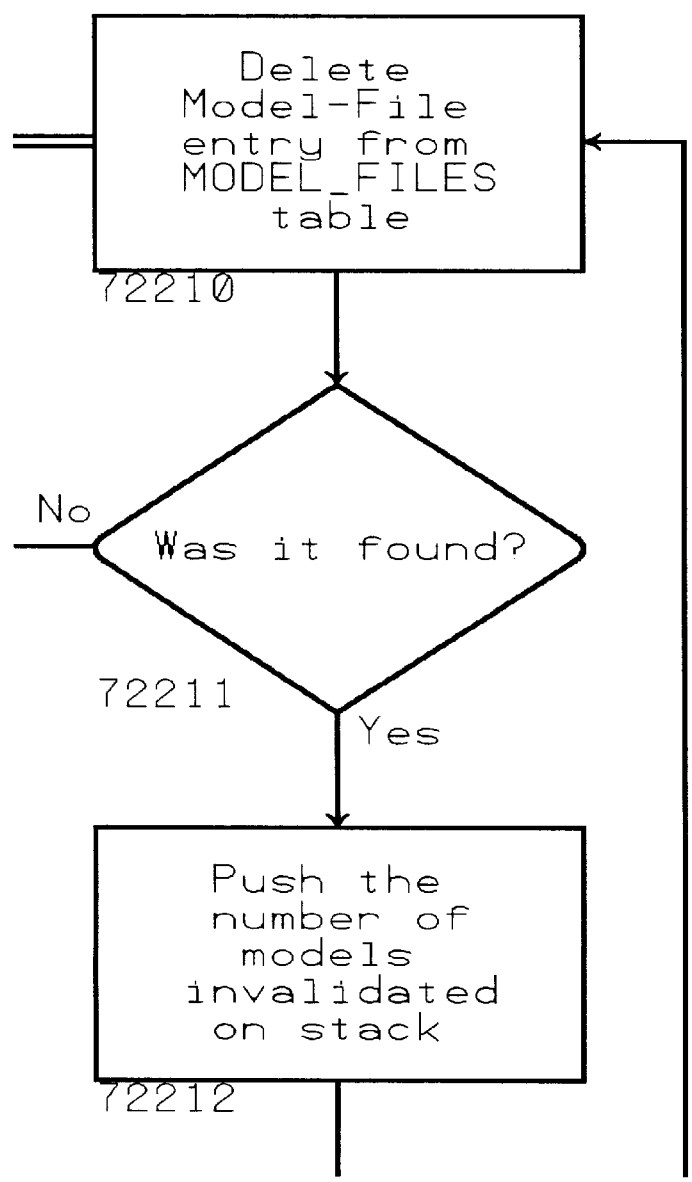
Figure 26D:
Figure 27A:
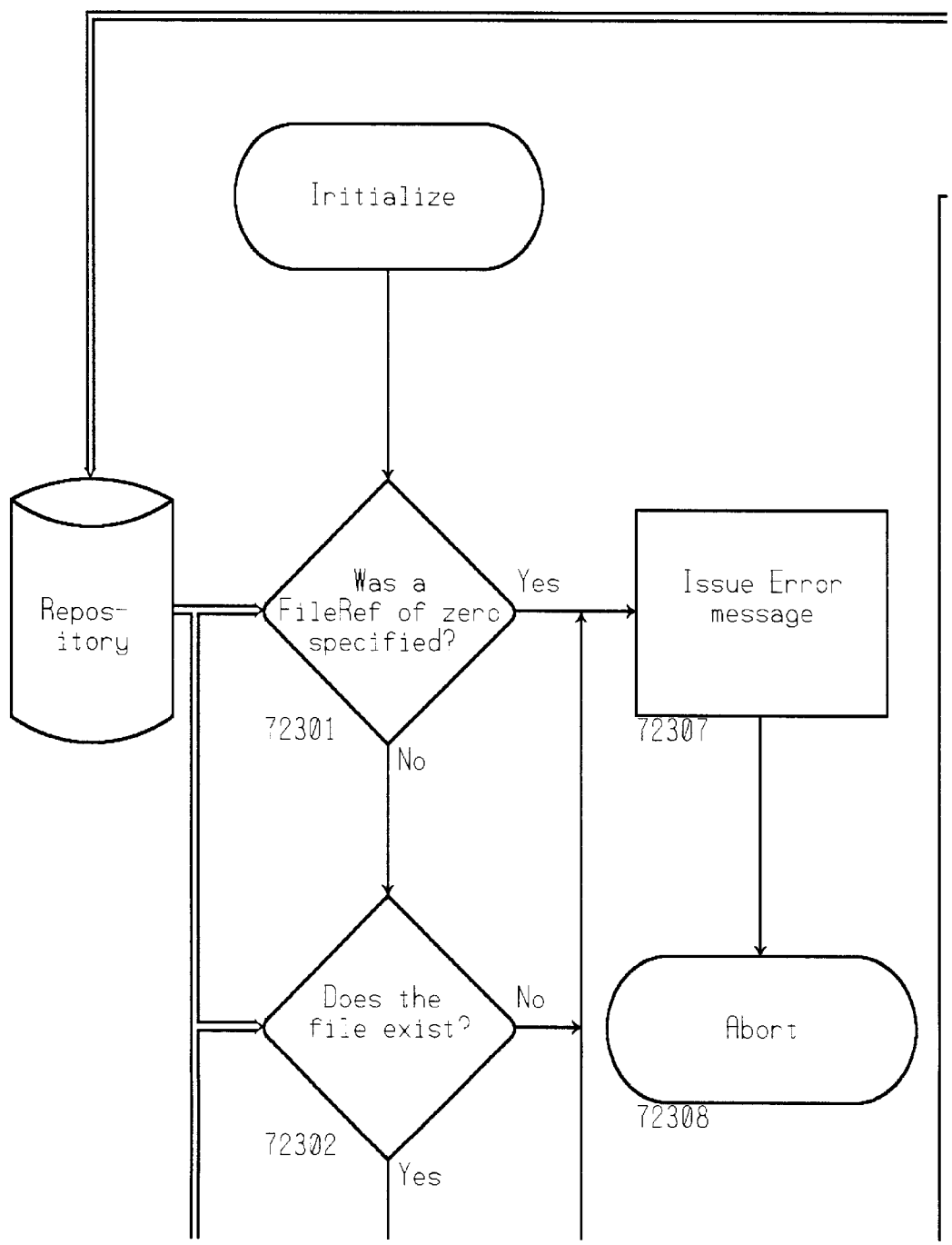
Figure 27B:
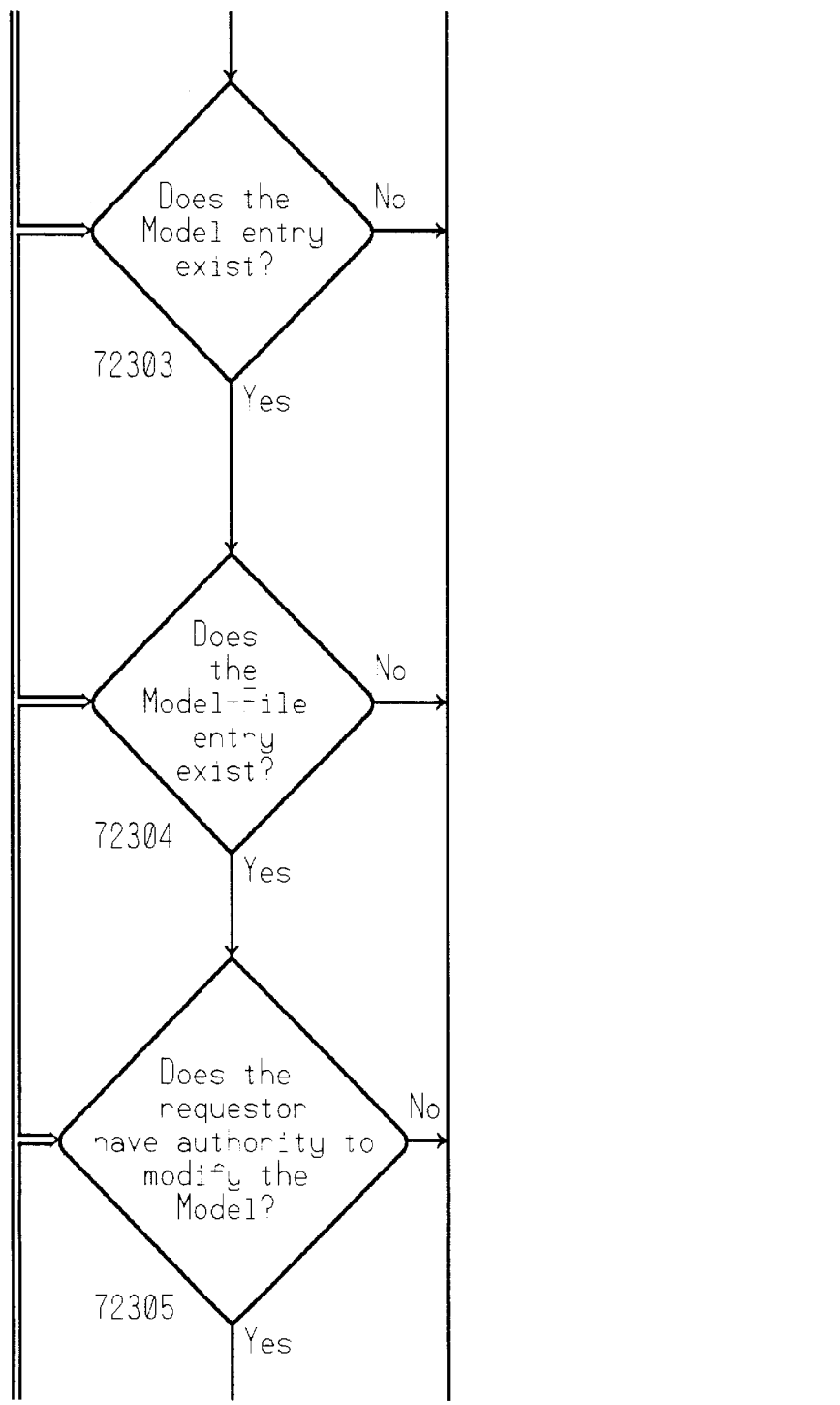
Figure 27C:
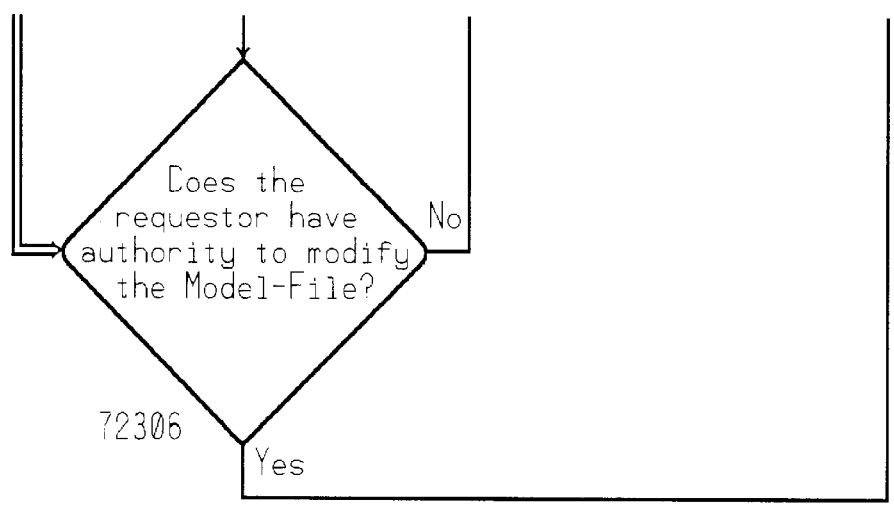
Figure 27D:
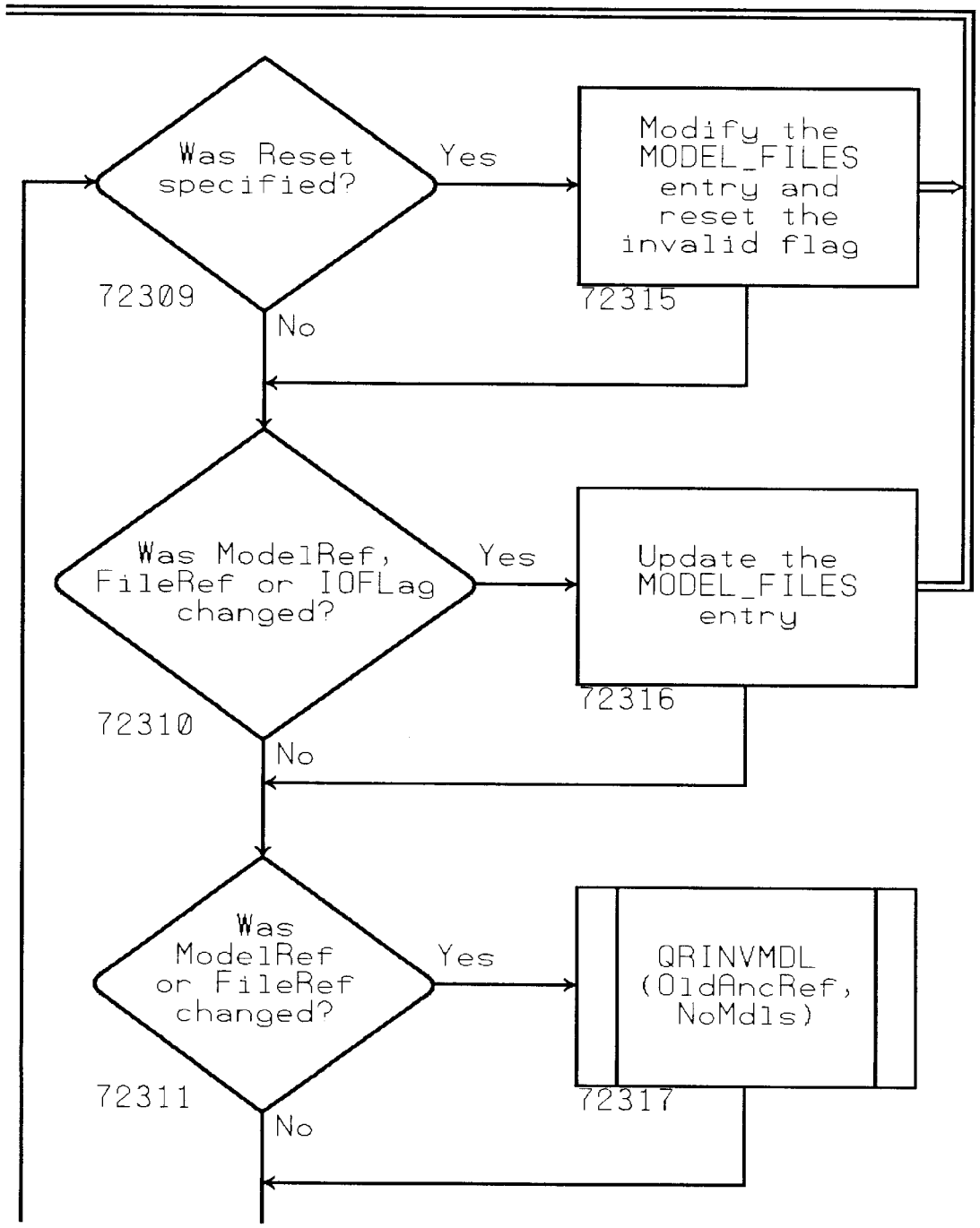
Figure 27E:
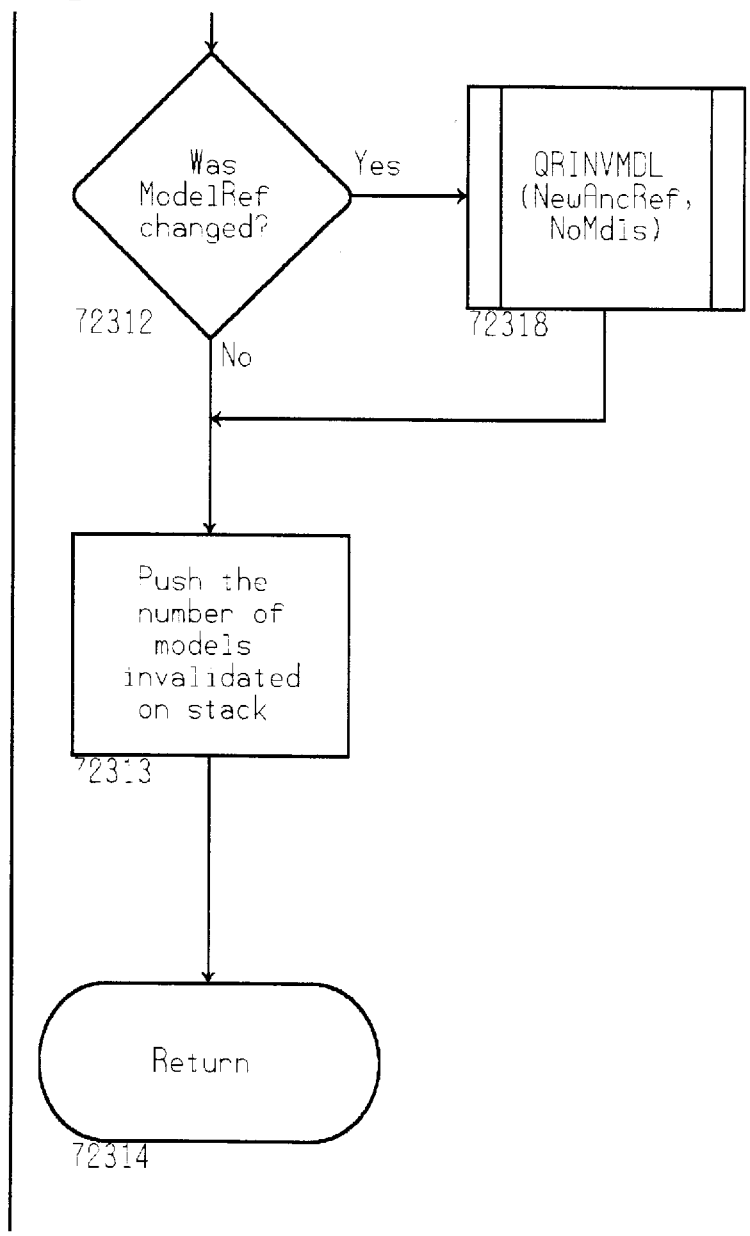

The QRMFIDEL Process FIG. 26: This process is used to delete a model-file entry from the MODEL_FILES table. After initialization, get 72201 the associated ModelRef from the MODEL_FILES table in the Control Repository. A check 72202 is made to determine if it was found. If not, an Error message is issued 72207 and the process aborts 72208. If it was found, get 72203 the owner and AnchorRef from the MODEL table in the Control Repository. Next, a check 72205 is made to determine whether the requester has MODEL DELETE authority. If not, an Error message is issued 72207 and the process aborts 72208. If so, check 72206 is made to determine if the model is currently valid. If so, the QRINVMDL process described in FIG. 15 is invoked 72209. In either case, The model-file entry is deleted 72210 from the MODEL_FILES table in the Control Repository. A check 72211 is made to determine if it was found. If not, an Error message is issued 72207 and the process aborts 72208. Next the number of models invalidated is pushed 72212 on the stack and the process returns 72213 to the requestor.

The QRMFIMOD Process FIG. 27: This process is used to modify a MODEL_FILE entry in the Control Repository After initialization, a check 72301 is made to determine if a file ref of zero was specified. If so, an Error message is issued 72307 and the process aborts 72308. If not, a check 72302 is made to determine if the file exists in the FILE table in the Control Repository. If not, an Error message is issued 72307 and the process aborts 72308. If so, a check 72302 is made to determine if the model entry exists in the MODEL table in the Control Repository. If not, an Error message is issued 72307 and the process aborts 72308. If so, a check 72304 is made to determine if the model-file entry exists in the MODEL_FILES table in the Control Repository. If not, an Error message is issued 72307 and the process aborts 72308. If so, a check 72305 is made to determine whether the requester has MODEL MODIFY authority. If so, a check 72306 is made to determine whether the requestor has MODELFILE MODIFY authority. Next, a check 72309 is made to determine whether RESET was specified. If so, Modify 72315 the MODEL_FILES entry and reset the invalid flag. Otherwise, a check 72310 is made to determine whether the ModelRef, file ref or IOFlag was changed. If so, update 72316 the MODEL_FILES entry. Next, a check 72310 is made to determine whether the ModelRef or file ref was changed. If so, the QRINVMDL Process described in FIG. 15 is invoked. Next, a check 72312 is made to determine whether the ModelRef was changed. If so, the QRINVMDL Process described in FIG. 15 is invoked. Finally, the number of models invalidated is pushed 72313 on the stack and the process returns 72314.

The QRSUPMFI Process FIG. 28: This process is used add a list of MODEL_FILES into a specified MODEL. After initialization, a check 72401 is made to determine whether the model exists in the MODEL table in the Control Repository. If not, an Error message is issued 72411 and the process aborts 72412. If it does exist, a check 72402 is made to determine if the model is currently valid and that RESET was not specified. If so, the QRINVMDL Process describe in FIG. 15 is invoked. In either case, preparations are made 72403 for the first group. The following steps will be followed for each group. First, get 72404 a group. Next, A check 72405 is made to determine if the model-file exists in the FILES table in the Control Repository. If not, an Error message is issued 72411 and the process aborts 72412. Next, a check 72406 is made to determine if the model-file and the model are one and the same (which would cause a loop). If so, an Error message is issued 72411 and the process aborts 72412. If not, a ModelRef is obtained 72407 from the Control Repository. The model-file entry is inserted 72410 into the MODEL_FILES table in the Control Repository. A check 72409 is made to determine if this is the last group. If not, the process flows back to get a group at 72404. If so, check 72413 is made to determine if the model is currently valid. If so, the QRINVMDL process described in FIG. 15 is invoked 72114. In either case, the number of models invalidated is pushed 72415 on the stack and the process returns 72416 to the requester.

The present Aggregation Manager also incorporates a special type of Model known as a File Group. These Models consist of a Master and one or more Subordinate files. These Master and Subordinates share the same Filename, Library, Version, and Level at all times. They are defined by the Data Manager using our Data Management Configuration Utility. Once defined, the File Group is automatically assembled when the Master is promoted into the DMS, and the File Group automatically moves through the DMS whenever the Master is promoted. Subordinates are either Required or Optional, with promotions automatically failing when Required Subordinates are absent. The Data Manager may also elect to have upper-level Subordinates automatically erased prior to the lower-level File Group promoting into that level. This features prohibits an optional member of a lower-level File Group from inadvertently being associated with the Master of an upper-level File Group.

While we have described our preferred embodiments of our invention, it will be understood that those skilled in the art, both now and in the future, may make various improvements and enhancements which fall within the scope of the claims which follow. These claims should be construed to maintain the proper protection for our inventions first disclosed.

What is claimed is:

1. A data management control program tangibly embodying a program of instructions executable by a supporting machine environment for performing method steps by an aggregation manager of a data management system having a library organization which receives a request of a user initiated from said displayed client screen and fulfills the request by a providing a result via said data management system's aggregation manager, said method steps comprising:

(1) displaying for creation of a model one or more control screen sections as part of a control panel input screen allowing creation of a model by interactive user activity, by importing a file listing, by searching of a library of files in said data management system and importing a located file, or by use of an application program interface with a collection of model management utilities utilities, said sections of said control screen panel including:

(a) a display screen section displaying a first field representing the name of an anchor name field of a model which is identical to the name of a data object which is serving as a named anchor;

(b) a display screen section displaying a second field representing a library where said named anchor resides;

(c) a display screen section displaying a third field representing the type of data object identified by said anchor name;

(d) a display screen section displaying a fourth field representing user entries for the version of said named anchor;

(e) a display screen section displaying a fifth field representing user entries for the level of said named anchor for use by a user or a third party tool for creating, modifying or deleting an aggregate collection of data objects, encompassing those used for items that are identified, tabulated, tracked, validated and invalidated, and promoted, as are bills of materials, by said data management system; and (f) a display screen section displaying a sixth field representing user entries for the status of said named anchor;

and wherein said model consists of one anchor and one or more associated components, each of which is a data object in said data management system, and wherein said associated components can belong to any level and version of any library in said data management system and said associated components are not restricted to the same library, level and version as the anchor, and said associated components comprise multiple data types, including data generated by tools of said data management system and third party tools, and wherein each associated component is labeled as an input or an output of its associated anchor, and wherein each one component may be an anchor to another different model, and when such a component is an anchor to another different model, said different model consists of said said such component acting as one anchor and further consisting of one or more associated components each of which is a data object in said data management system, and wherein said components can belong to any level and version of any library in said data management system and said components are not restricted to the same library, level and version as the anchor, and said components can comprise multiple data types, including data generated by tools of said data management system and third party tools, and wherein each component has field identifiers like those of said anchor and wherein each component is also labeled as an input or an output of its associated anchor, and wherein each one component may be an anchor to still another different model, with each component being labeled as an input or output in relation to its anchor file, and wherein all components of a model are either static and thus does not move through said data management system but is tracked by the system or dynamic and moves through said data management system with its associated model as part of an action of promoting a model when a model is promoted, a dynamic member being labeled as an input or an output with respect to its associated anchor; and (2) thereafter, after creation of a model, continuously tracking the created model while allowing a user to modify it by adding components, deleting components, changing the status or deleting said created model, and allowing promotion of a model in said data processing system through the libraries of said data processing system.

2. A data management control program according to claim 1 wherein said aggregation manager includes for said tracking step a Bill of Materials (BOM) tracker for facilitating tracking many design components for large projects in which certain of said design components are grouped by a symbol for a project for promotion an tracking synchronization.

3. A data management control program according to claim 2 wherein said aggregation manager includes support for automatic data grouping, based on the design component name, with the notion of required and optional data types.

4. A data management control program according to claim 1 wherein said aggregation manager includes support for automatic data grouping based on a graphical symbol.

5. A data management control program according to claim 1 wherein said program includes for use when a promote is initiated to a public library, or between levels of a public library, a program check for determining whether a data grouping is defined for the data type being promoted.

6. A data management control program according to claim 1 wherein said program includes checks of all required and optional data types to determine existence and said promote is of the entire grouping to a target level, but when a required data type does not exist, the promotion fails.

7. A data management control program according to claim 1 wherein said program methods include tracking, invalidation and promotion exist for the members of a design control system as a group treated by the rules of a bill of materials, whereby tracking, invalidation and promotion exist for the members of a group providing for grouping of many smaller pieces of data into larger more manageable chunks to facilitate movement through the library and increase data integrity by reducing the risk of data getting out of synchronization.

8. A data management control program according to claim 1 wherein said program methods includes a user interface for creating Bills of Materials (BOMs) whereby a user can manually create BOMs by selecting pieces of design interactively, filling in search criteria and initiating a library search, or importing a simple text list.

9. A data management control program according to claim 1 wherein said program methods includes an API exists for point tools to create a Bill of Materials listing and pass it into the data management system.

10. A data management control program according to claim 1 wherein said program methods includes an automatic invalidation routine for a bill of materials (BOMs) created by the user.

11. A data management control program according to claim 10 wherein once a BOM is created, the program constantly monitors for a change to the BOM.

12. A data management control program according to claim 11 wherein if any member is overlaid or deleted, a notification is sent to the owner of the BOM indicating that the BOM is no longer valid.

13. A data management control program according to claim 11 wherein when said BOM is no longer valid, an owner can continue to work with his model, but by notification he is made aware that he's no longer using valid data.

14. A data management control program according to claim 11 wherein when said BOM is no longer valid, it can still be moved through the library so as to accommodate an event where a piece of a model had a relatively insignificant change, allowing a model builder to deem it unnecessary to rebuild the model, and to allows continuing work and movement through the library even in the even of invalidity.

15. A data management control program according to claim 10 wherein the status of a Bill of Materials, including one no longer valid, is accessible by automatic notification to the owner as soon as a BOM is invalidated, and by display of the BOM either interactively or in report form to list the overall status of the BOM, and all members of the BOM with their individual status.

16. A data management control program according to claim 10 wherein said tracking of a model member includes tracking for a support object that can be tracked with a BOM but not promoted or moved with the BOM.

17. A data management control program according to claim 10 wherein BOMs are hierarchical and a BOM can be nested within a larger BOM, and when a piece of data is overlaid or deleted, the program determines whether that piece belonged to a BOM, and if so, it immediately checks to see if the BOM belongs to other BOMs, and it recursively check all BOMs it encounters until it's at the top of the hierarchy, and all BOMs found which are currently valid will be invalidated and the owners notified.

18. A data management control program according to claim 10 wherein BOMs are hierarchical and a BOM can be nested within BOMs support move and overlay locks. The user can set a move or overlay lock on a BOM, and the program will set individual locks on all the members; if a member is a BOM, all of its members will receive individual locks which can be removed by using a main lock utility and specifying the top-level BOM or filling in the desired fields to individually reset locks.

19. A data management control program according to claim 10 wherein the program supports a BOM promote whereby a user can request that all the contents of the BOM be promoted simultaneously, and when a matching set of design data traverse through the library in sync. BOMs contain members who reside at different levels, different versions and even different libraries, the program will only promote those members which exist in the current library, and reside in an Engineering Level below the target level, but if a member exists in a different version and is also below the target level, it will also be promoted.

20. A data management control program according to claim 10 wherein the program has separate authorizations for creating and promoting BOMs set up by a data manager who has complete flexibility in controlling who can create and move BOMs.

21. A data management control program according to claim 1 wherein anchors are always dynamic and they themselves can be dynamic members (input or output of another anchor) or a hierarchical BOM, while components may be dynamic or static, and if they are dynamic they are classified as input or output files and they move with the BOM during a promote, while if they are static they don't move.

22. A data management control program according to claim 21 wherein all components (dynamic or static) cause BOM invalidation if they are modified or deleted.

\* \* \* \* \*